United States Patent
Takata

(10) Patent No.: US 8,303,128 B2
(45) Date of Patent: Nov. 6, 2012

(54) LIGHTING DEVICE, DISPLAY DEVICE AND TELEVISION RECEIVER

(75) Inventor: Yoshiki Takata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 717 days.

(21) Appl. No.: 12/525,736

(22) PCT Filed: Oct. 24, 2007

(86) PCT No.: PCT/JP2007/070714
§ 371 (c)(1),
(2), (4) Date: Aug. 4, 2009

(87) PCT Pub. No.: WO2008/096482
PCT Pub. Date: Aug. 14, 2008

(65) Prior Publication Data
US 2009/0310061 A1  Dec. 17, 2009

(30) Foreign Application Priority Data
Feb. 6, 2007  (JP) .................................. 2007-027209

(51) Int. Cl.
*G09F 13/08* (2006.01)

(52) U.S. Cl. ............. 362/97.2; 362/217.09; 362/217.11; 362/217.14; 313/491

(58) Field of Classification Search ................ 362/97.2, 362/613, 614, 632–634, 217.01, 217.02, 362/217.12, 217.13, 217.08, 217.09; 313/491, 313/493; 349/58
See application file for complete search history.

(56) References Cited

U.S. PATENT DOCUMENTS

| | | | | |
|---|---|---|---|---|
| 1,975,496 | A * | 10/1934 | Barrett, Jr. | 362/161 |
| 2,699,514 | A * | 1/1955 | Cox et al. | 313/492 |
| 7,350,935 | B2 * | 4/2008 | Kwon | 362/225 |
| 7,378,786 | B2 * | 5/2008 | Park et al. | 313/491 |
| 7,441,921 | B2 * | 10/2008 | Park | 362/221 |
| 7,452,117 | B2 * | 11/2008 | Chen et al. | 362/581 |
| 7,585,100 | B2 * | 9/2009 | Aoki et al. | 362/634 |
| D603,086 | S * | 10/2009 | Zayas | D26/113 |
| 7,686,498 | B2 * | 3/2010 | Ogura et al. | 362/634 |
| D616,822 | S * | 6/2010 | Zayas | D13/134 |
| 2004/0027049 | A1 * | 2/2004 | Lee et al. | 313/486 |
| 2005/0226002 | A1 | 10/2005 | Aoki et al. | |

FOREIGN PATENT DOCUMENTS

| | | | |
|---|---|---|---|
| JP | 6-196088 | A | 7/1994 |
| JP | 7-218729 | A | 8/1995 |
| JP | 8-241614 | A | 9/1996 |
| JP | 9-17329 | A | 1/1997 |
| JP | 2004-288406 | A | 10/2004 |
| JP | 2005-302533 | A | 10/2005 |
| RU | 2 077 088 | C1 | 10/1997 |

* cited by examiner

*Primary Examiner* — John A Ward
(74) *Attorney, Agent, or Firm* — Birch, Stewart, Kolasch & Birch, LLP

(57) ABSTRACT

A cold cathode tube 15 includes an elongated glass tube 18, which has a primary-seal-side end portion 31 as one end portion thereof and a secondary-seal-side end portion 33 as the other end portion thereof. An electrode 19 is enclosed in each end portion 31, 33 of the glass tube 18. A ferrule 20 is attached to the outer side of each end portion 31, 33, and is connected to the corresponding electrode 19. The ferrule 20A-1 attached to the primary-seal-side end portion 31 and the ferrule 20B-1 attached to the secondary-seal-side end portion 33 differ in color of the entire surface from each other. A plurality of cold cathode tubes are arranged and mounted in a chassis 12, so that adjacent cold cathode tubes 15 lie in the opposite orientation to each other.

23 Claims, 57 Drawing Sheets

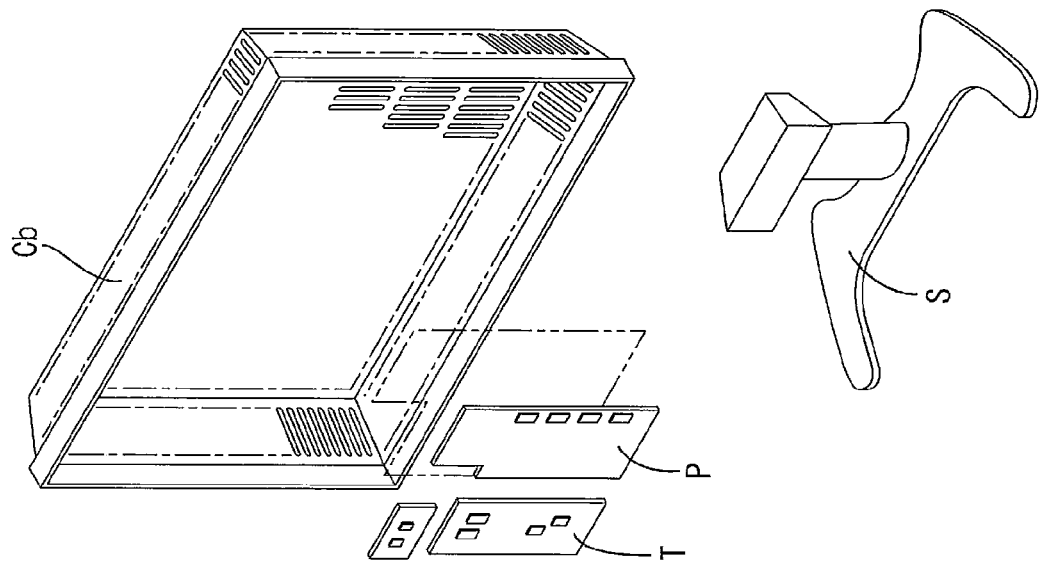
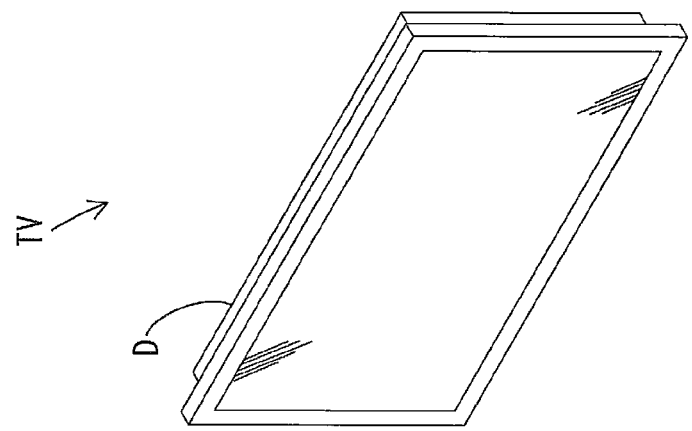
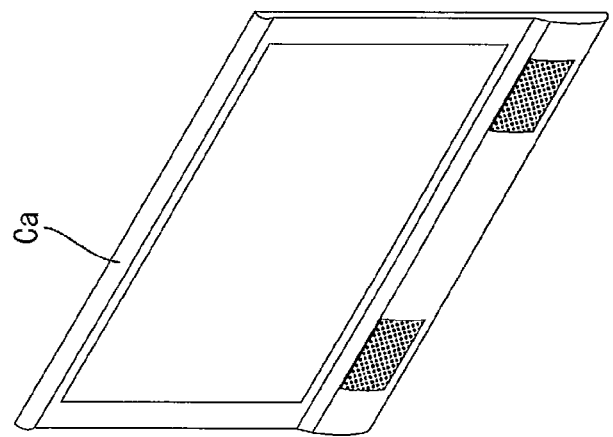
FIG.1

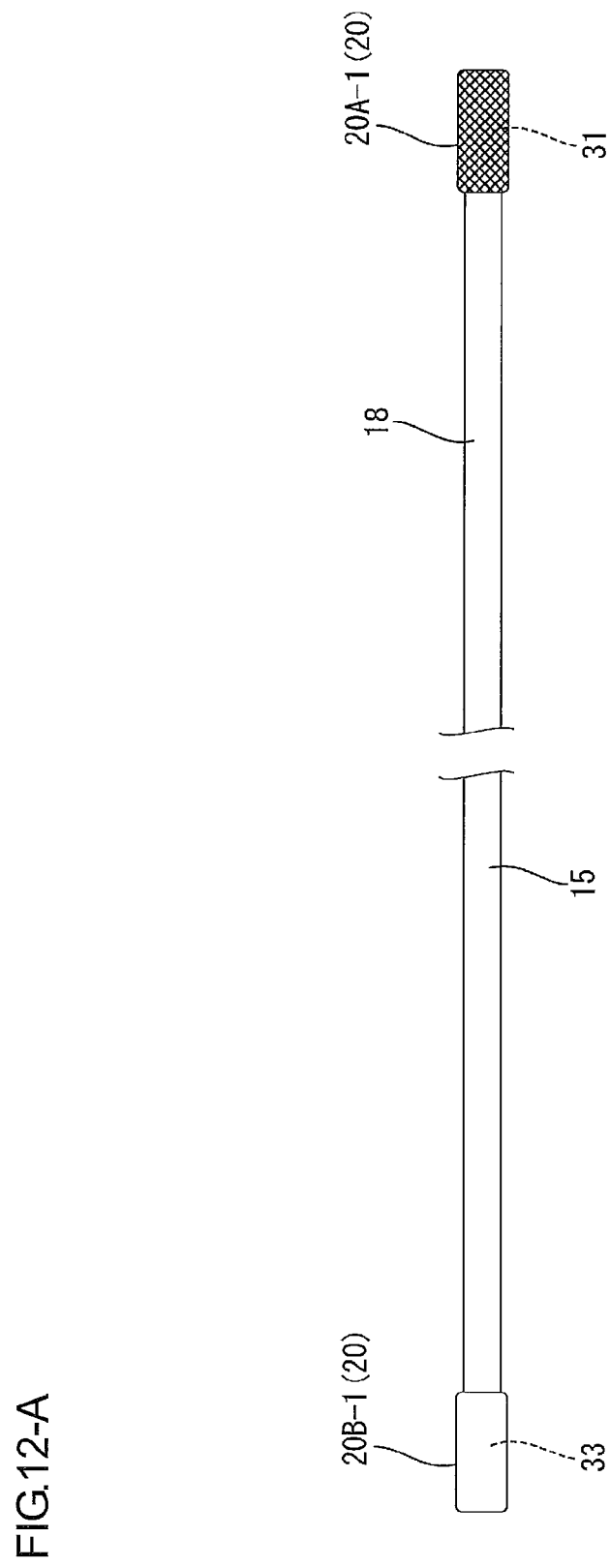
FIG.12-A

FIG.12-B
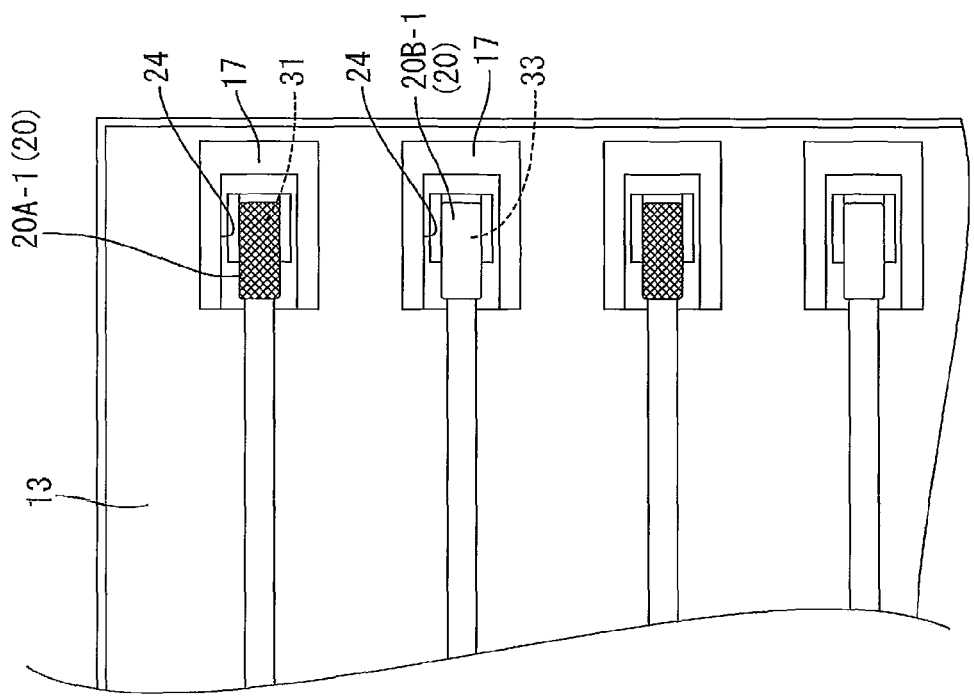
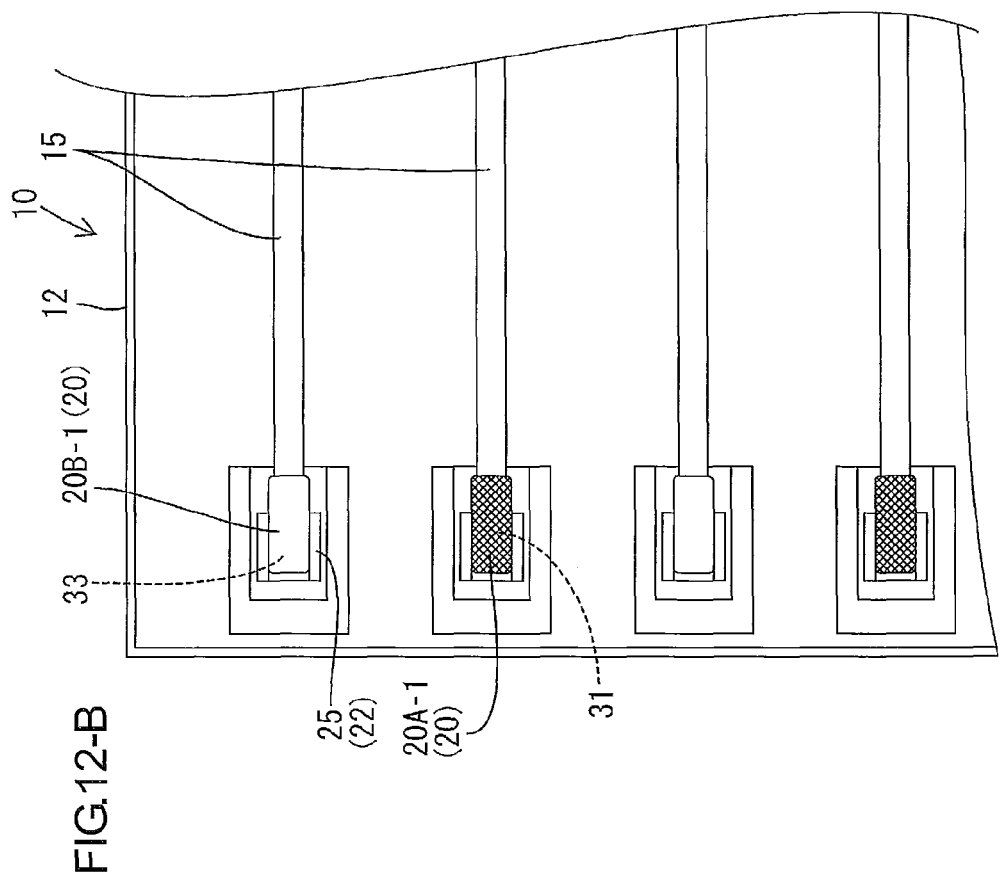

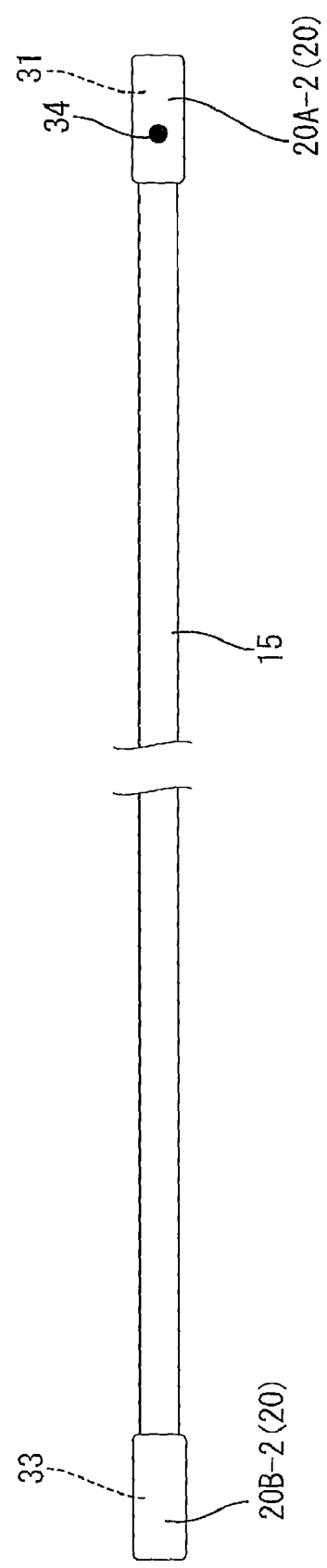

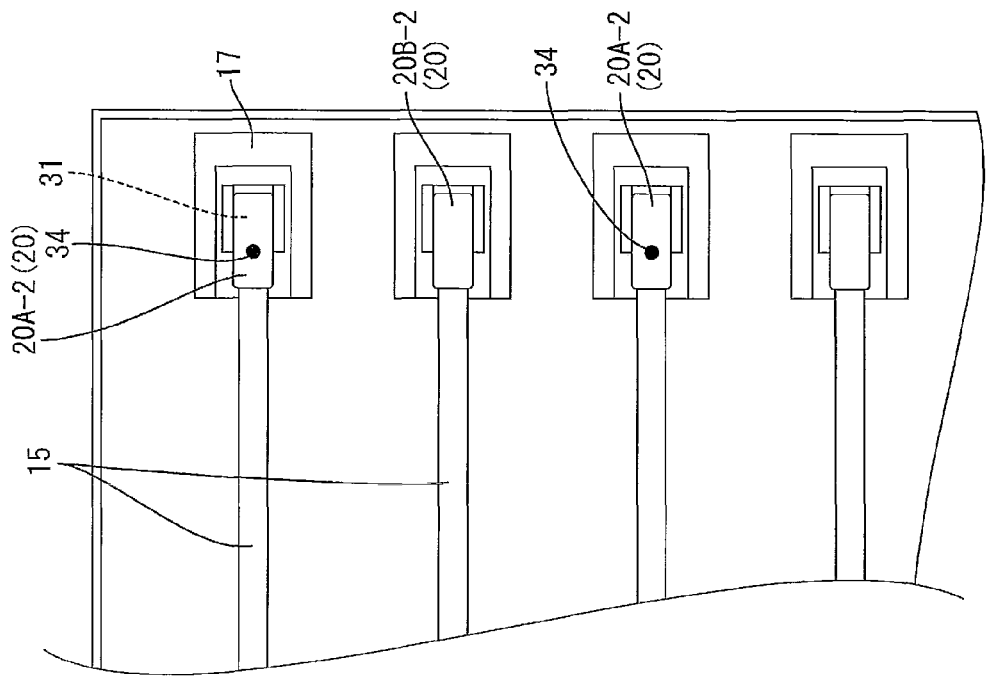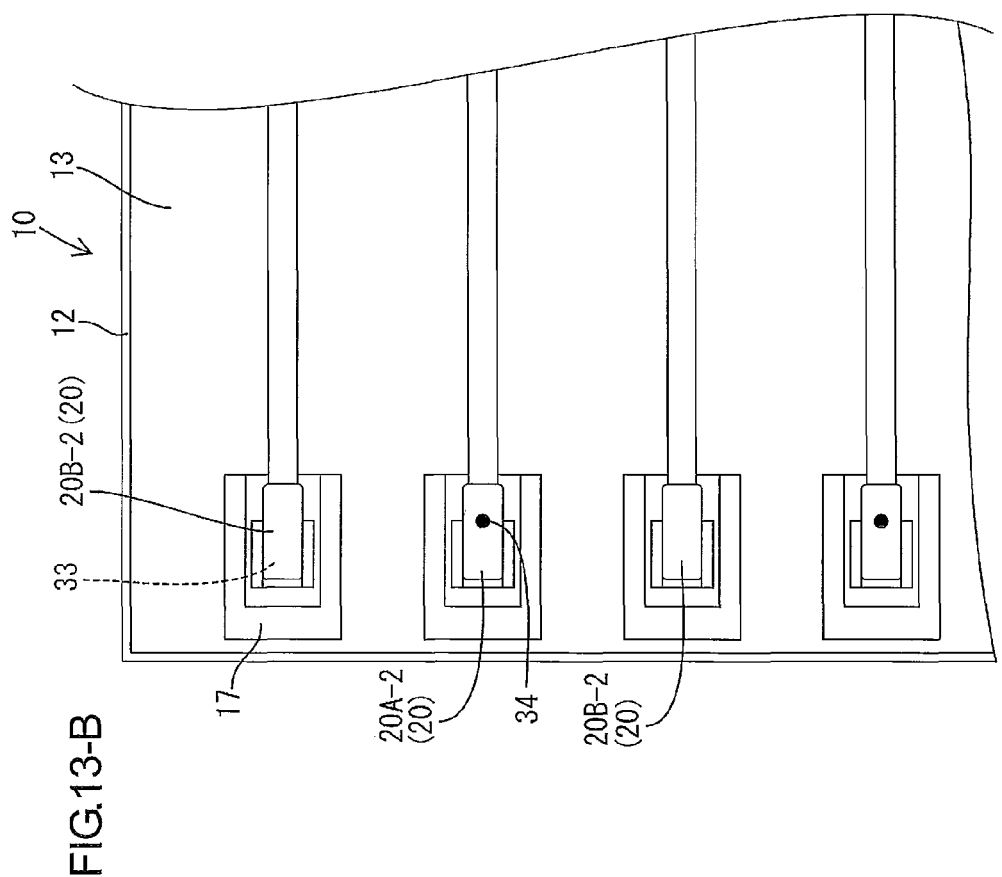
FIG.13-B

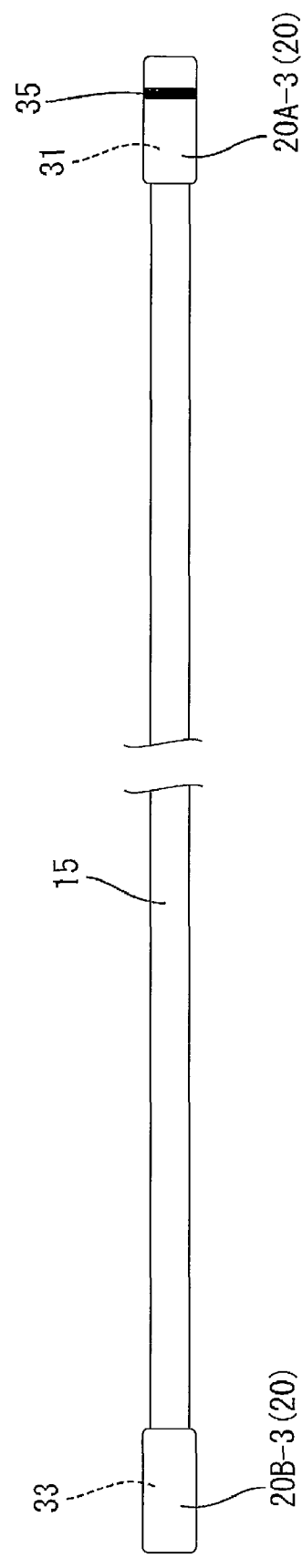
FIG.14-A

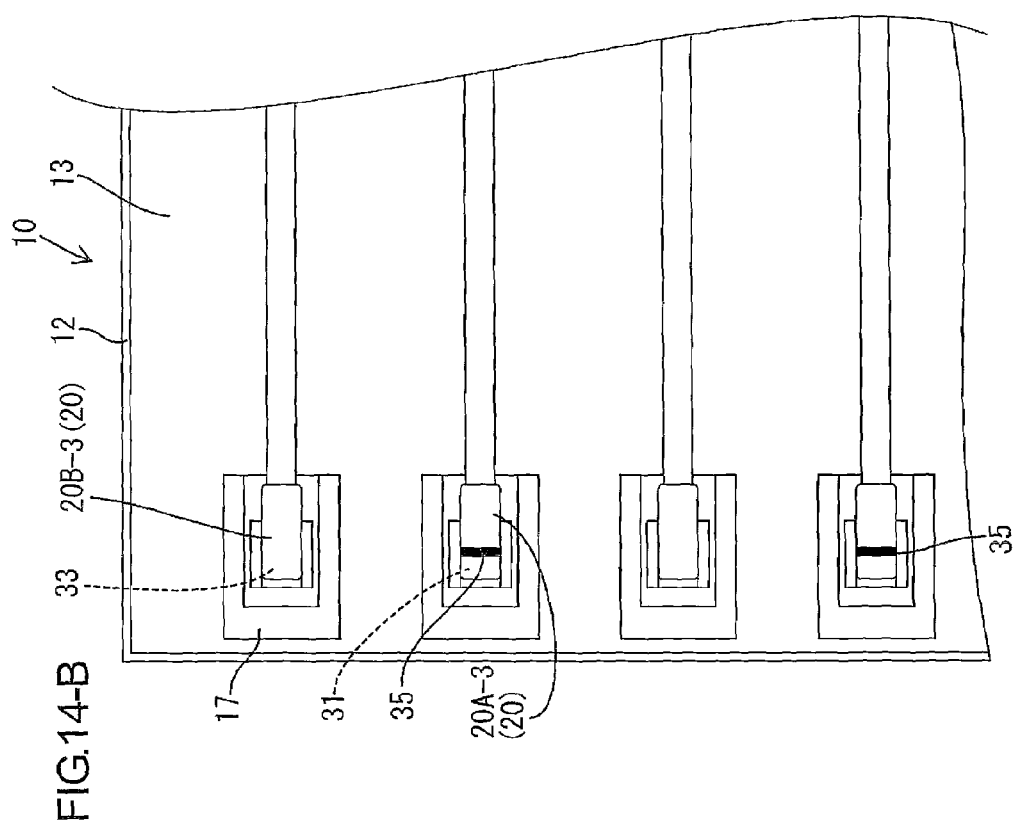
FIG.14-B

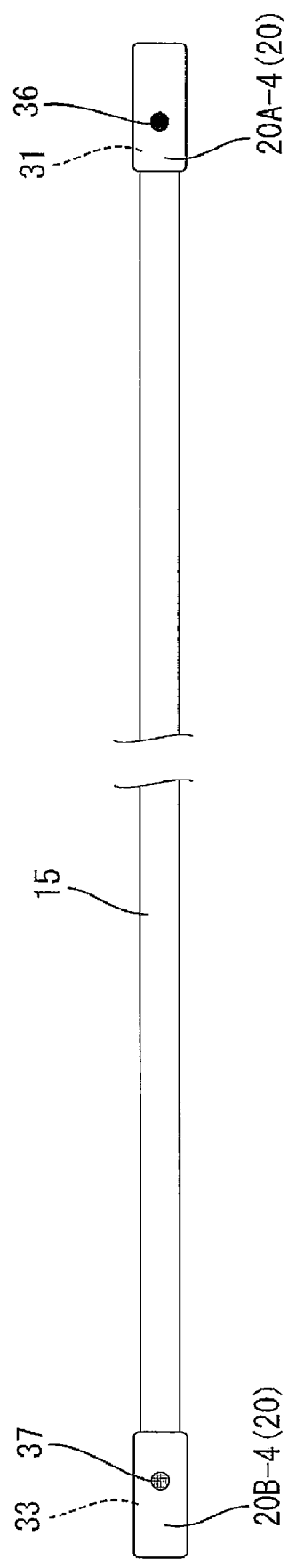
FIG.15-A

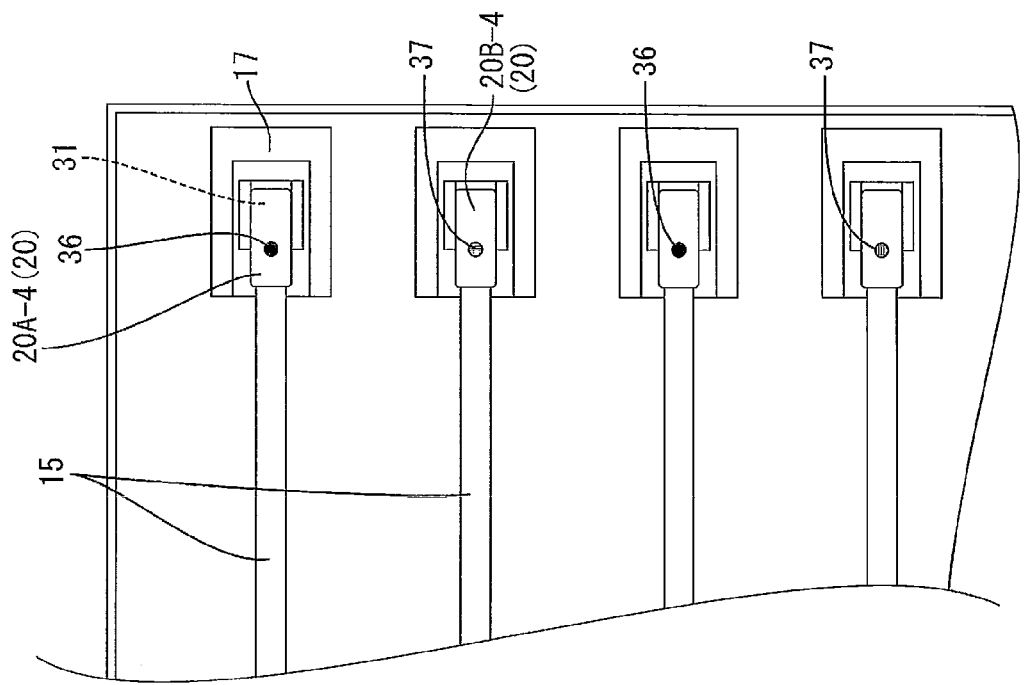
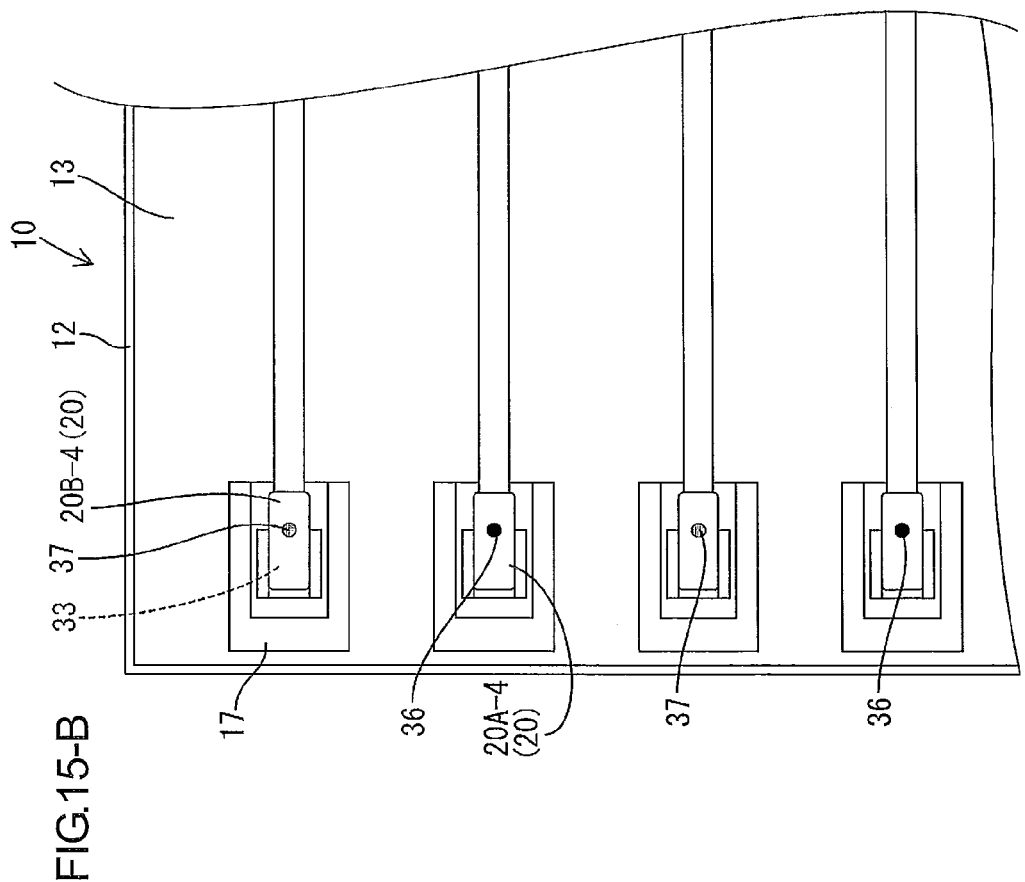
FIG.15-B

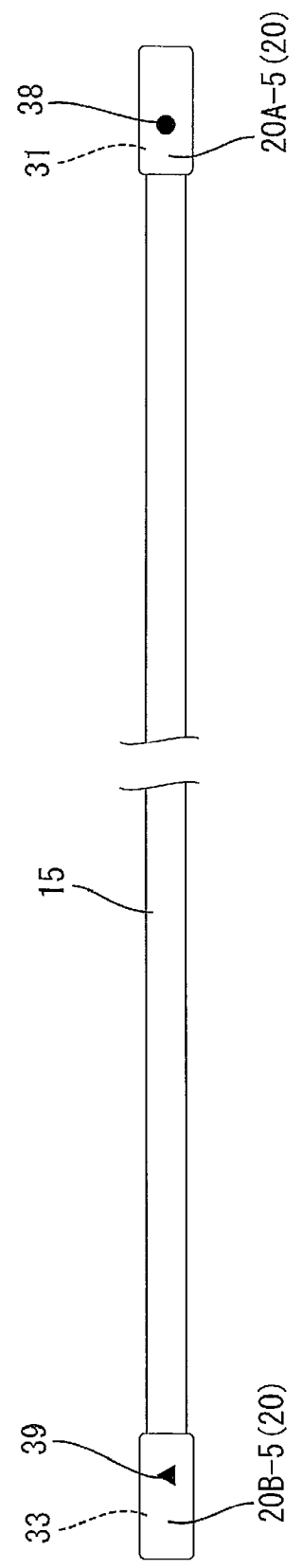
FIG.16-A

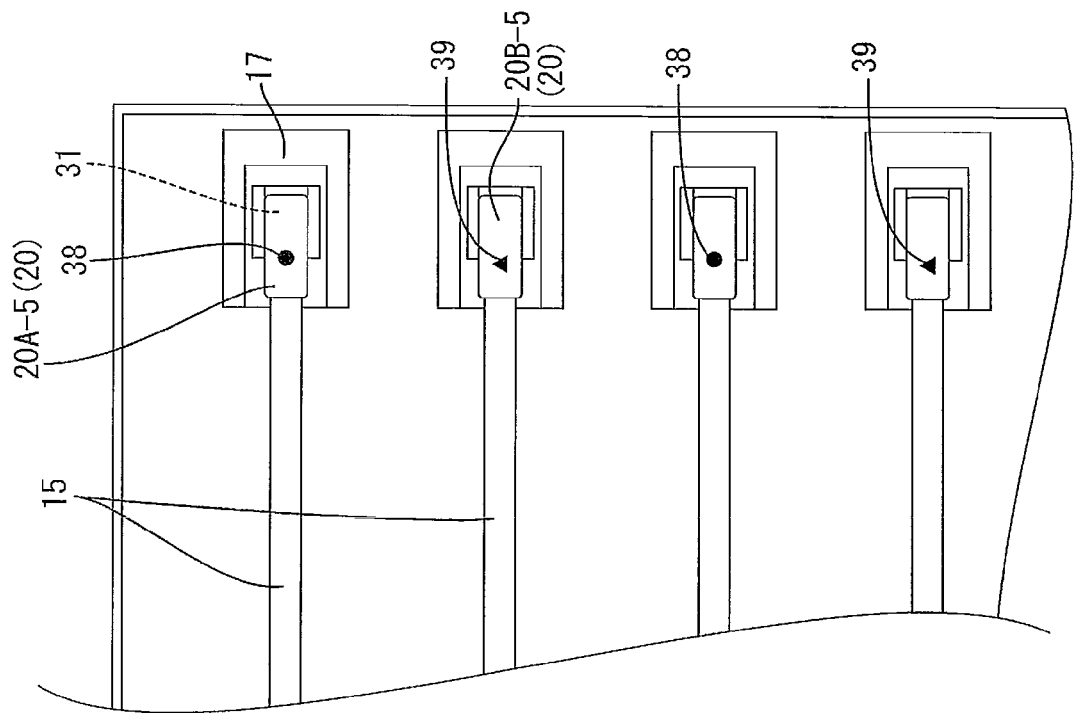
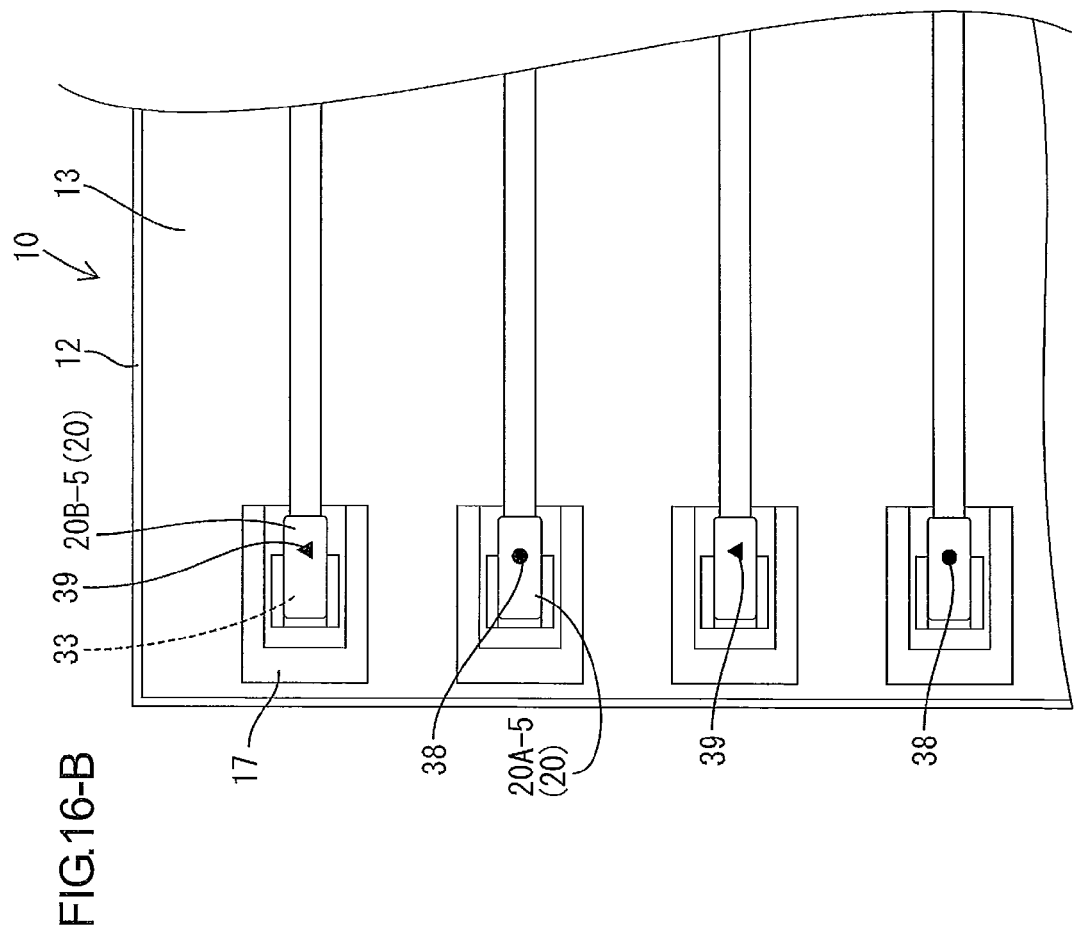
FIG.16-B

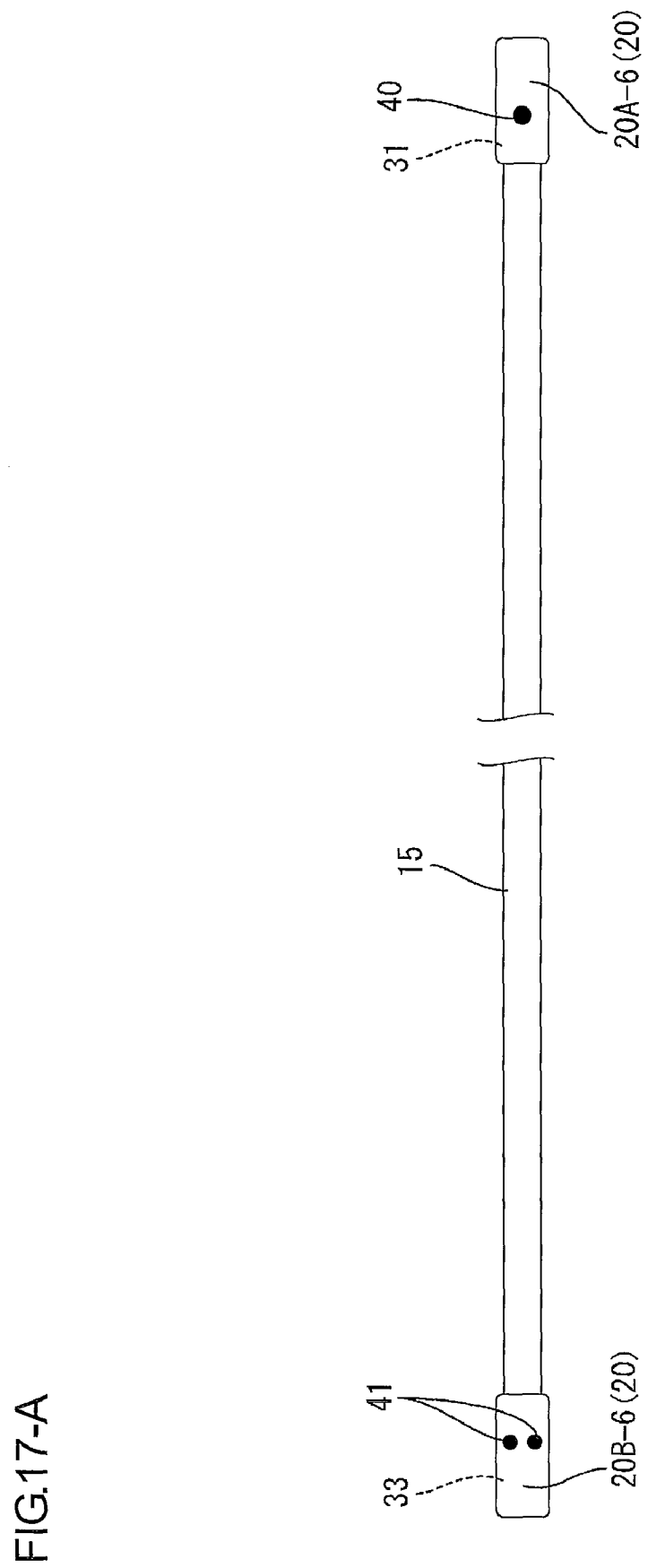
FIG.17-A

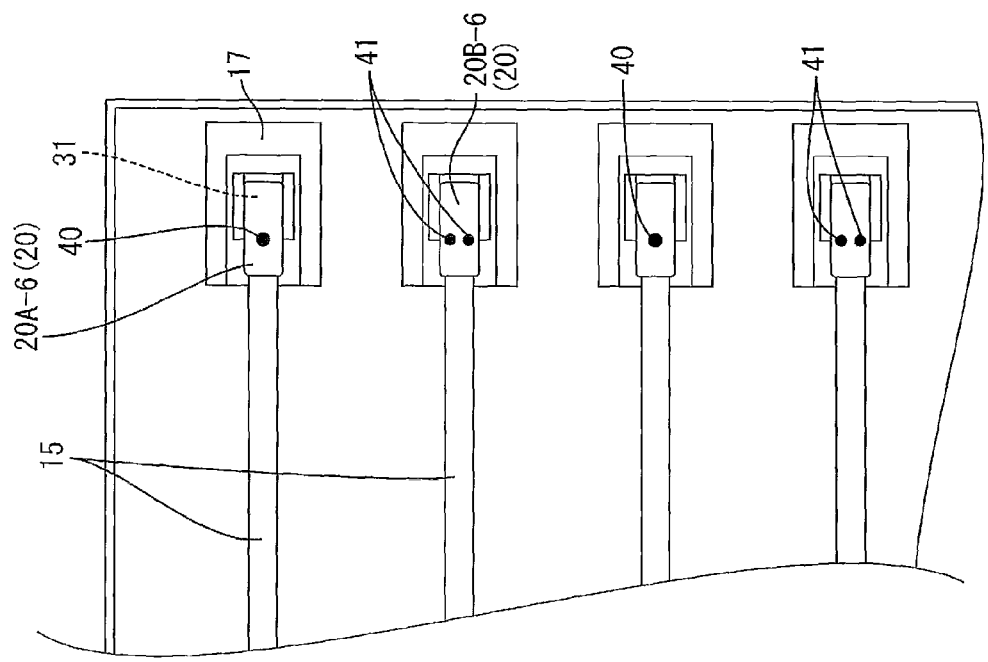
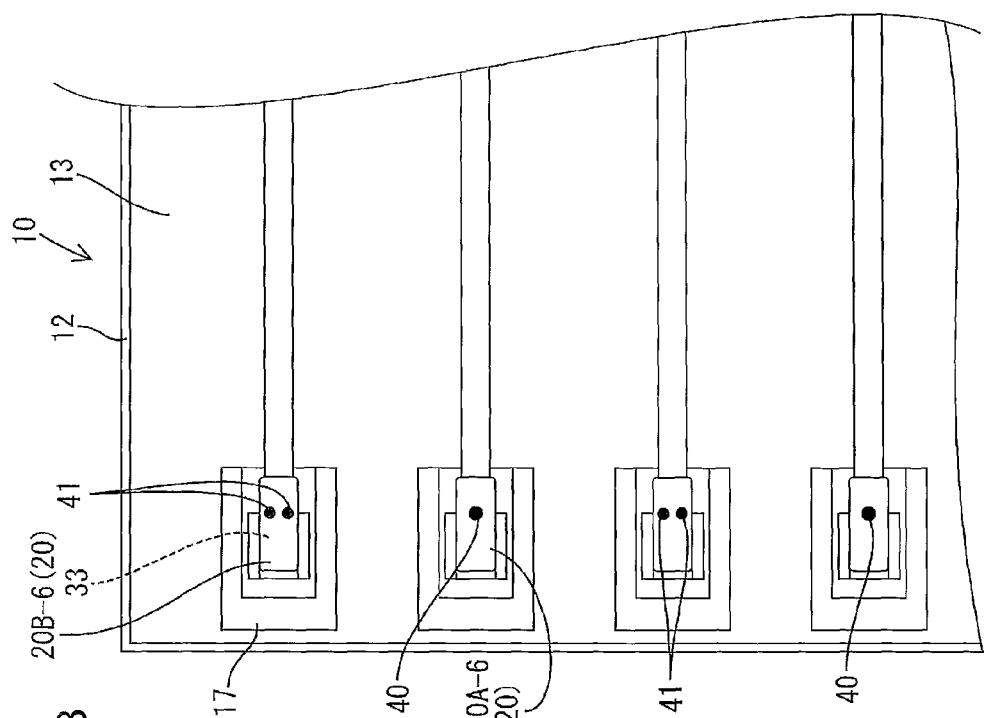
FIG.17-B

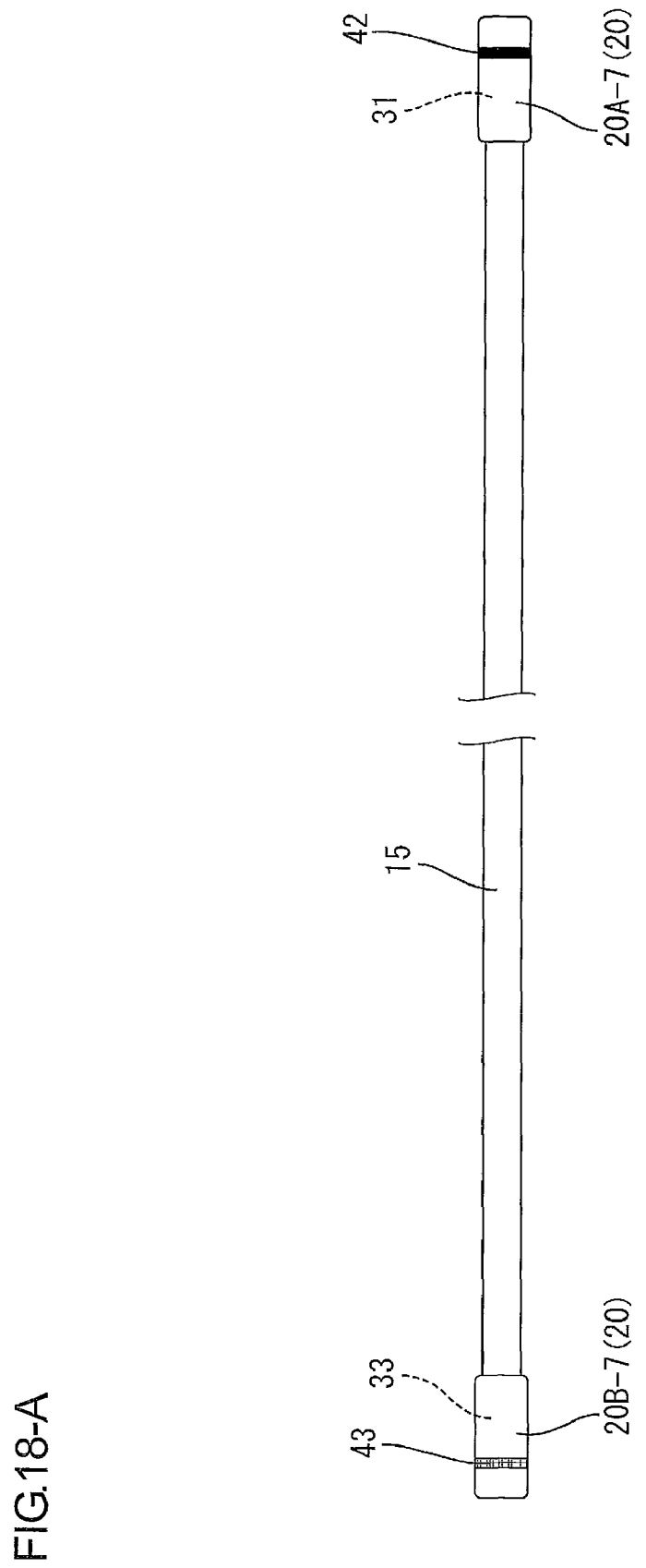
FIG.18-A

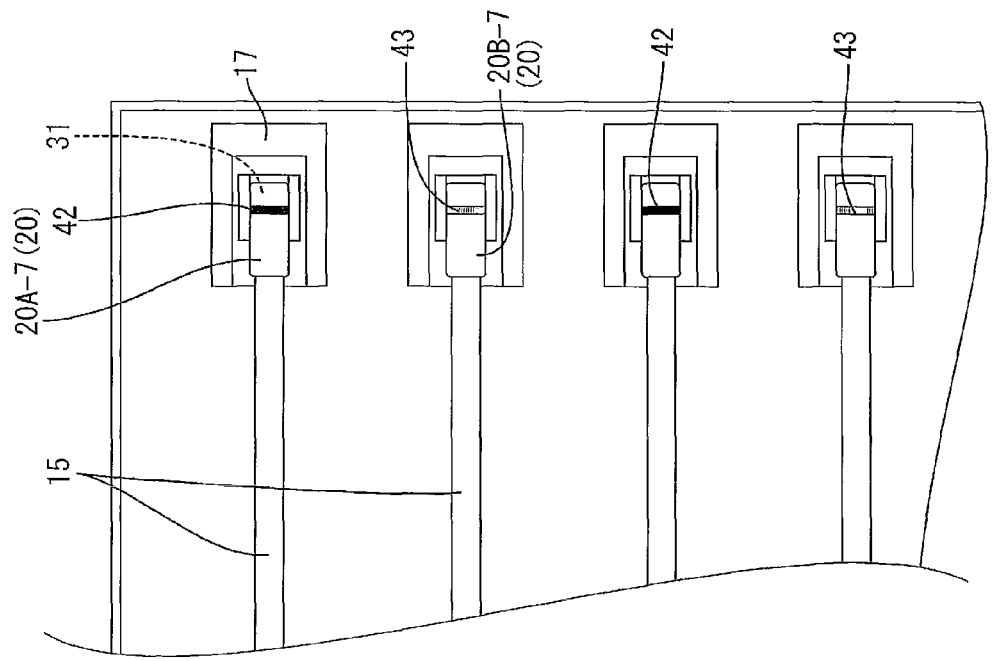
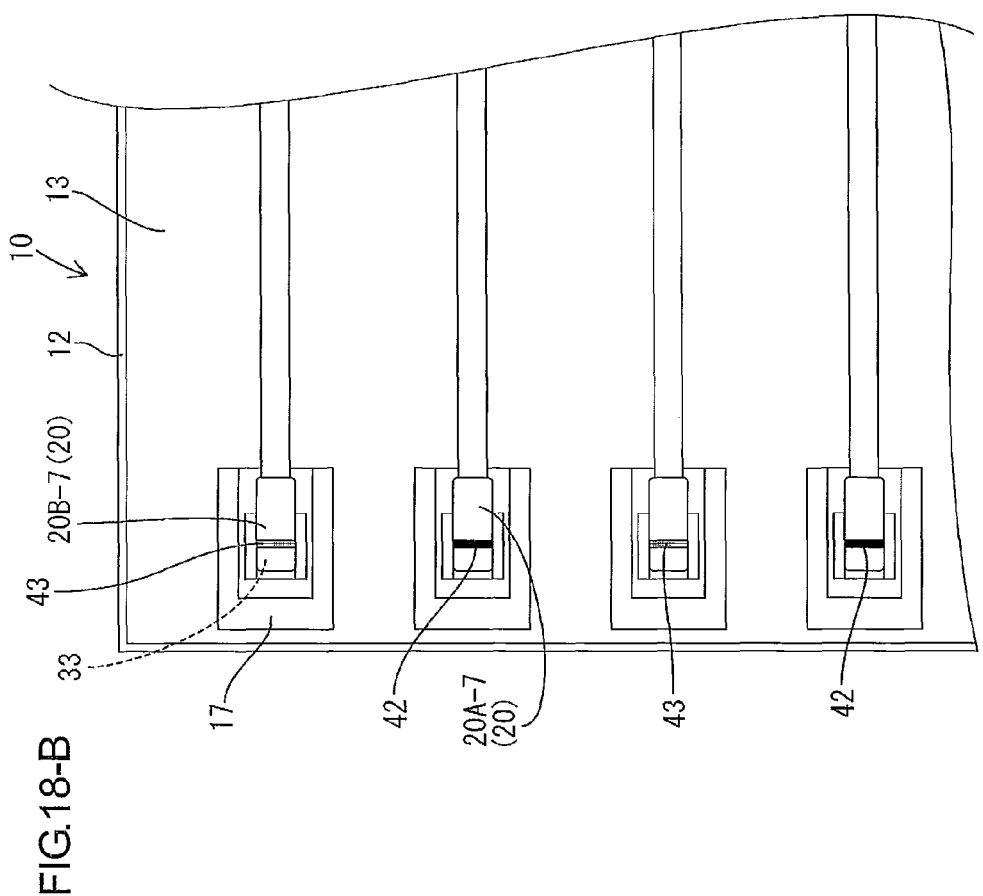
FIG.18-B

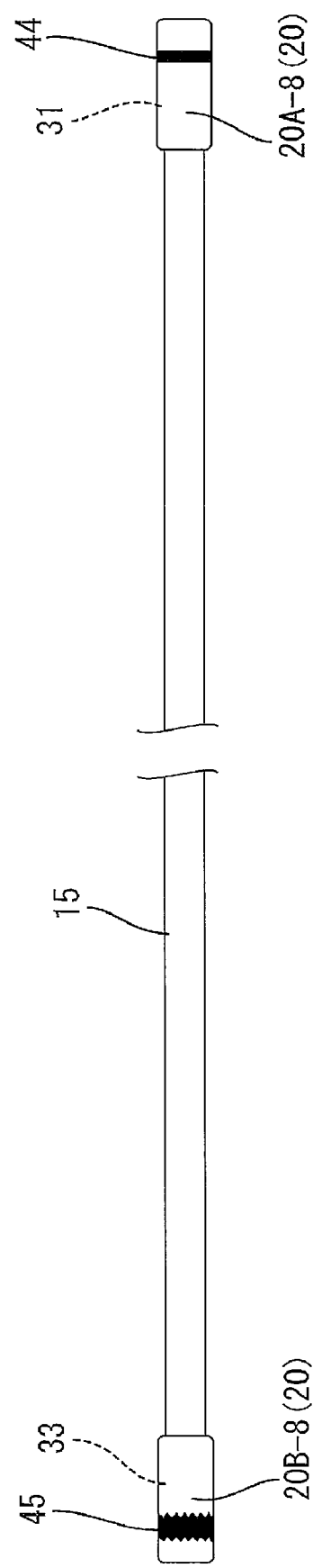
FIG.19-A

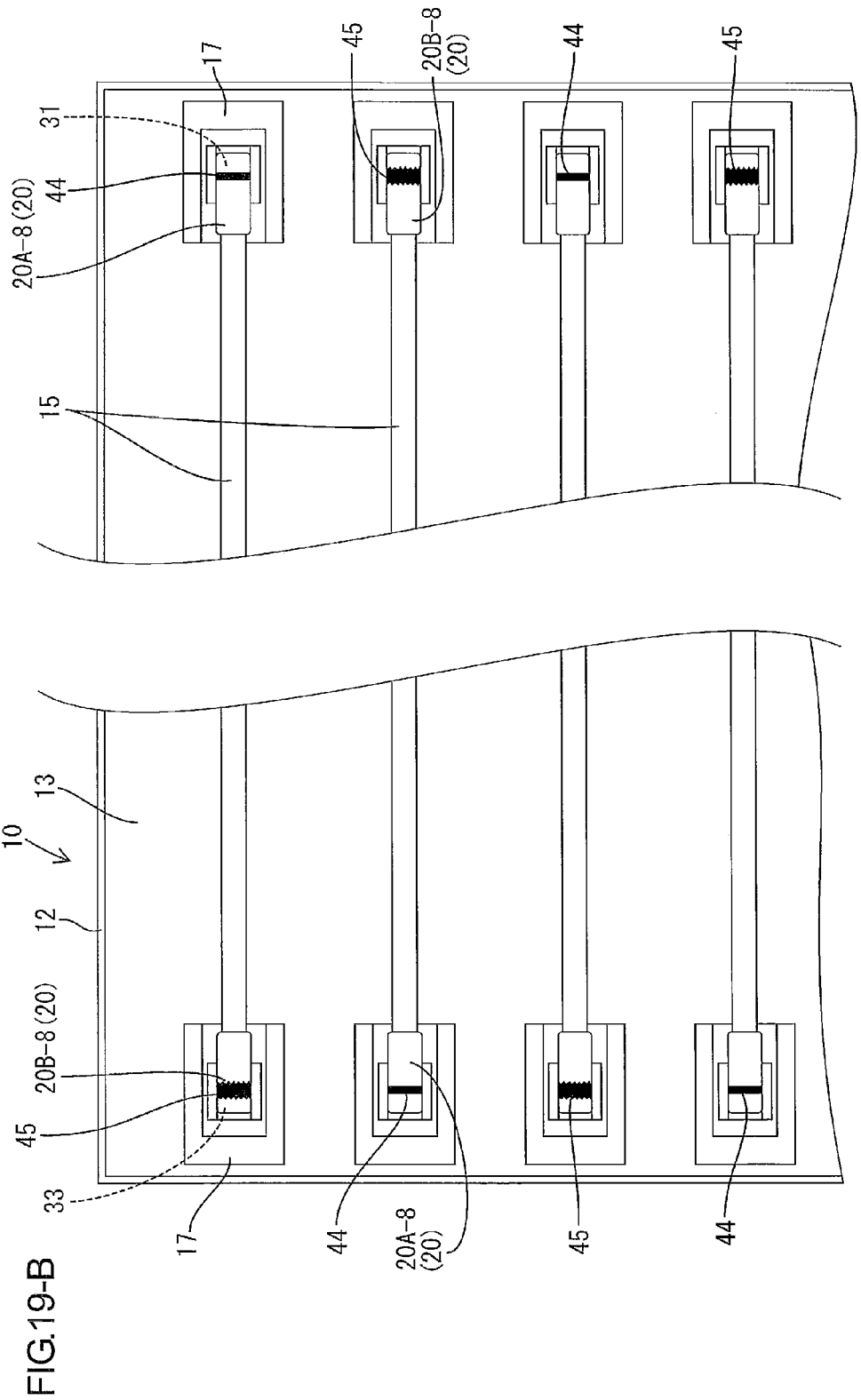

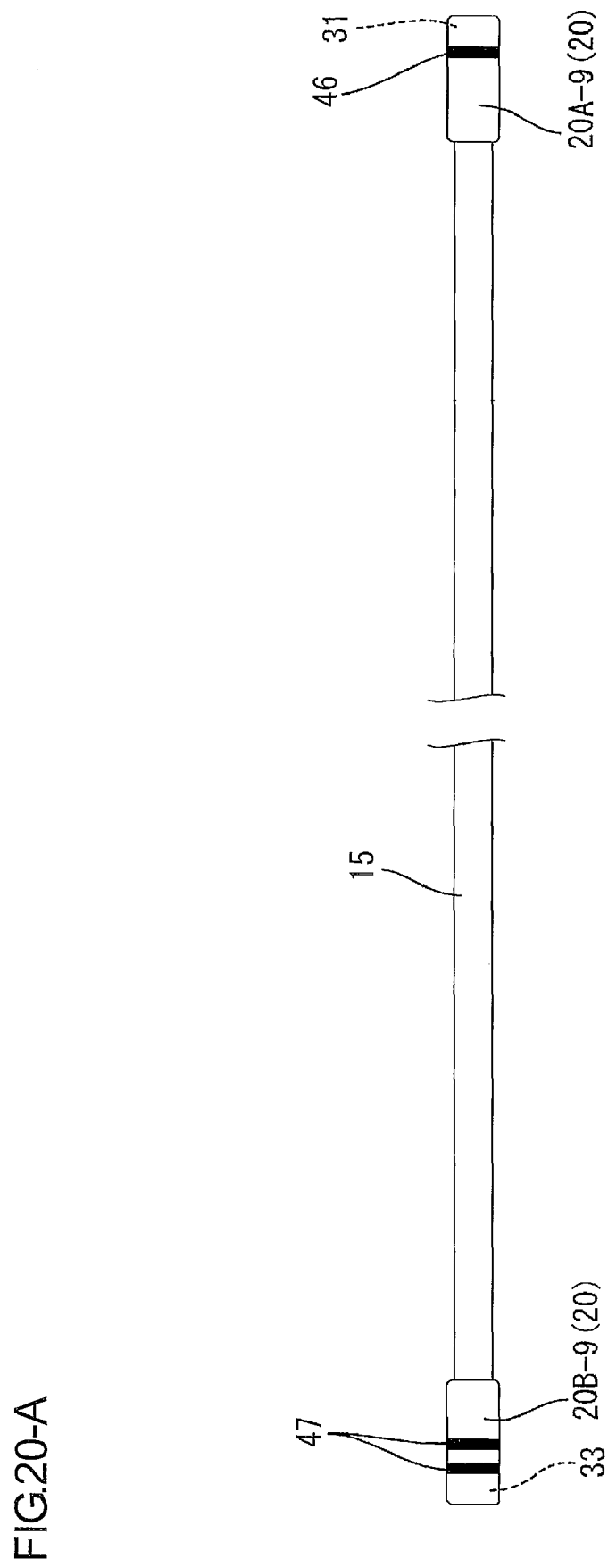

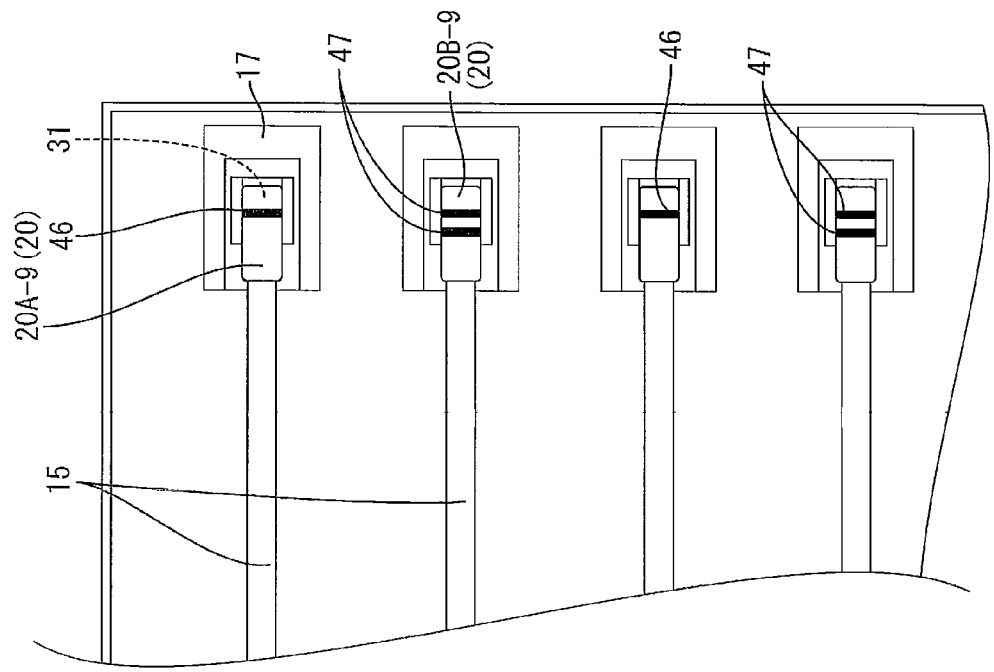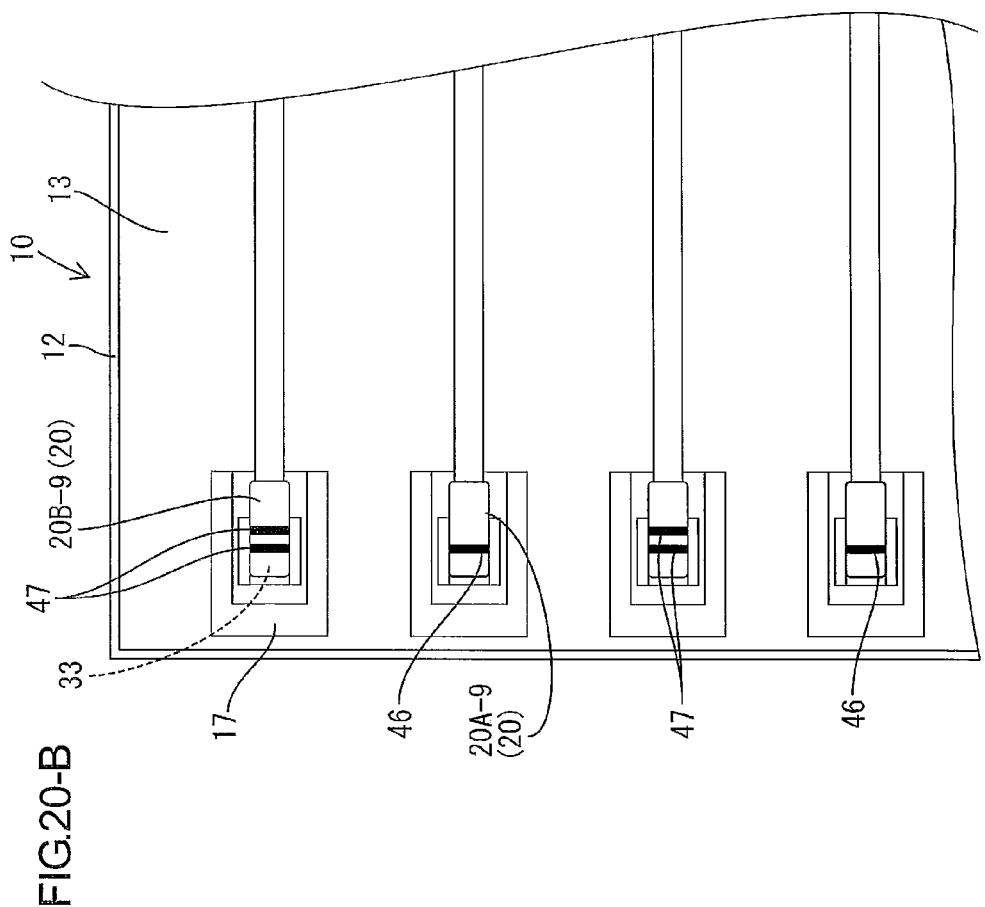
FIG.20-B

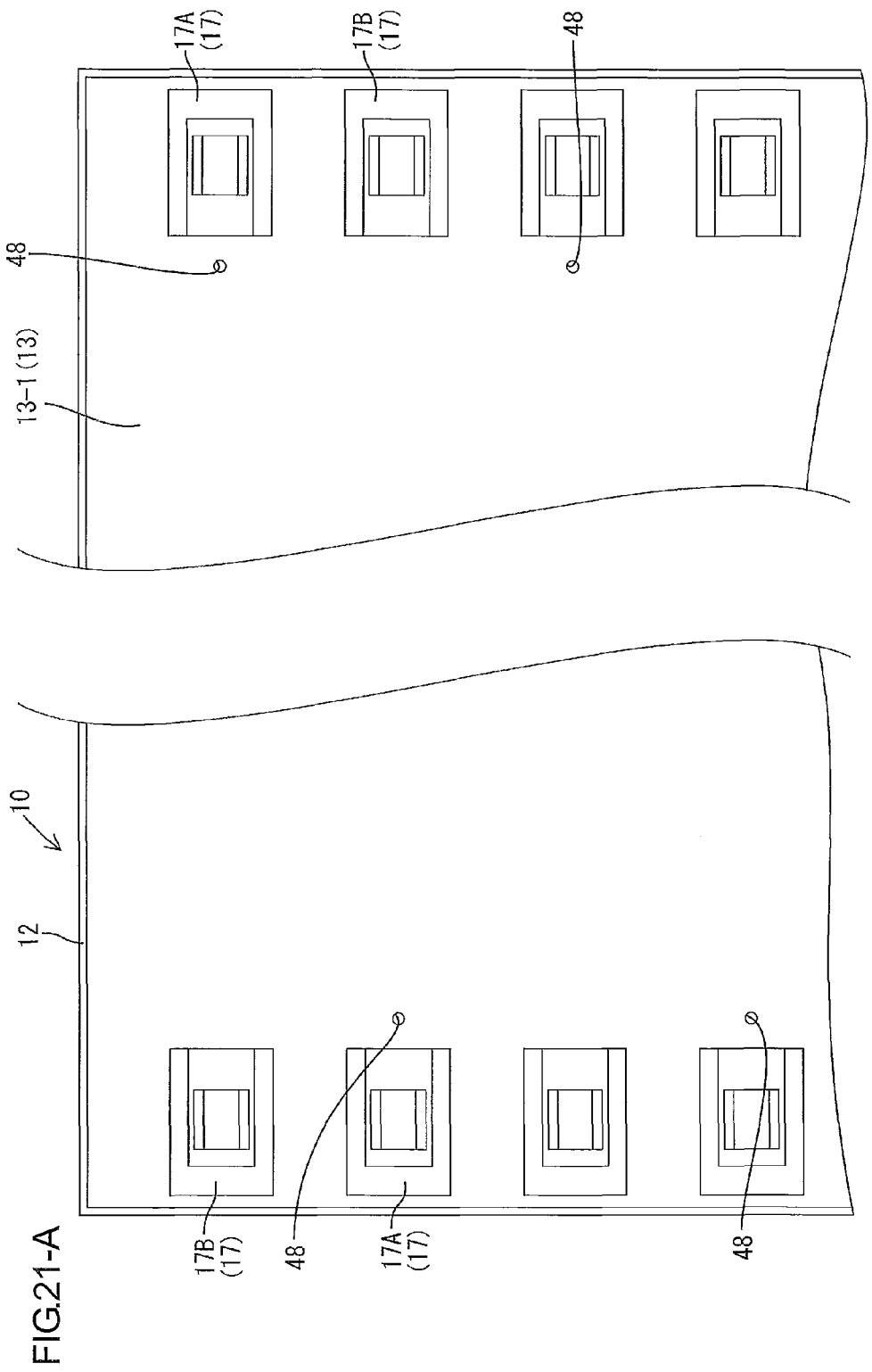

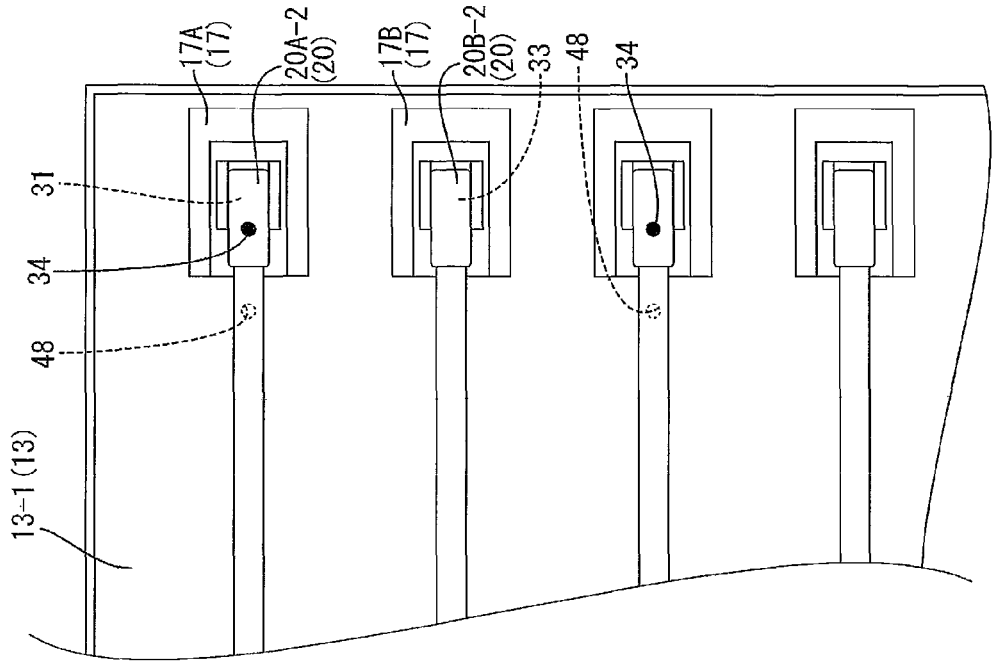
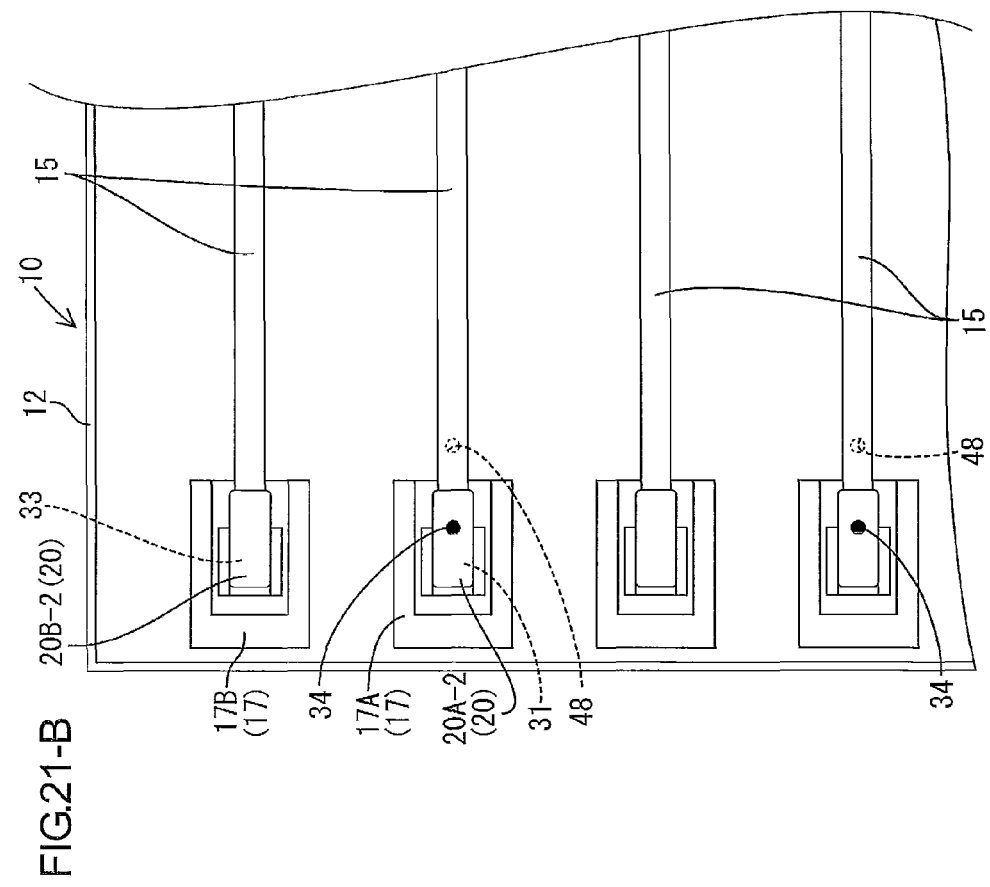
FIG.21-B

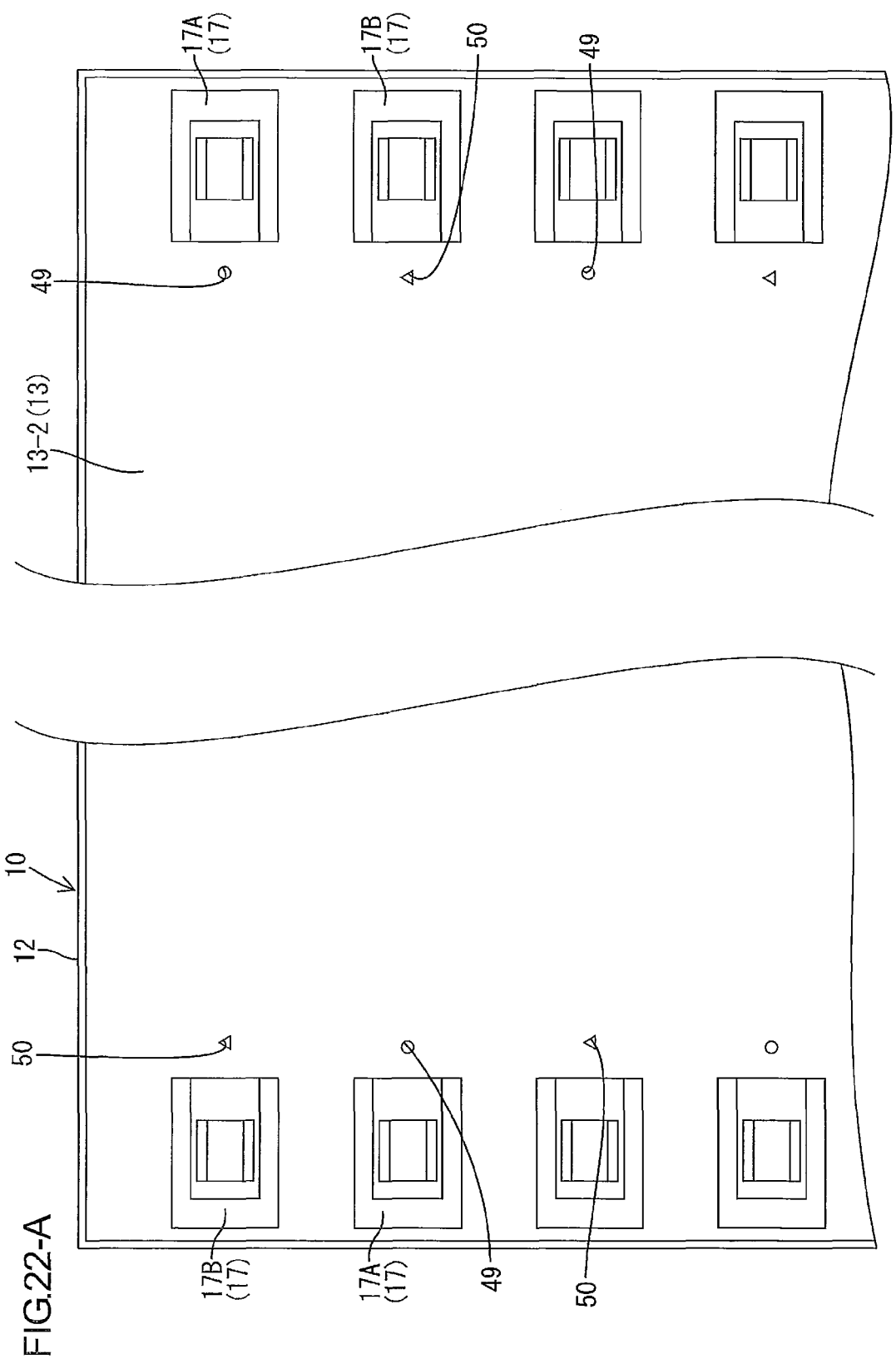

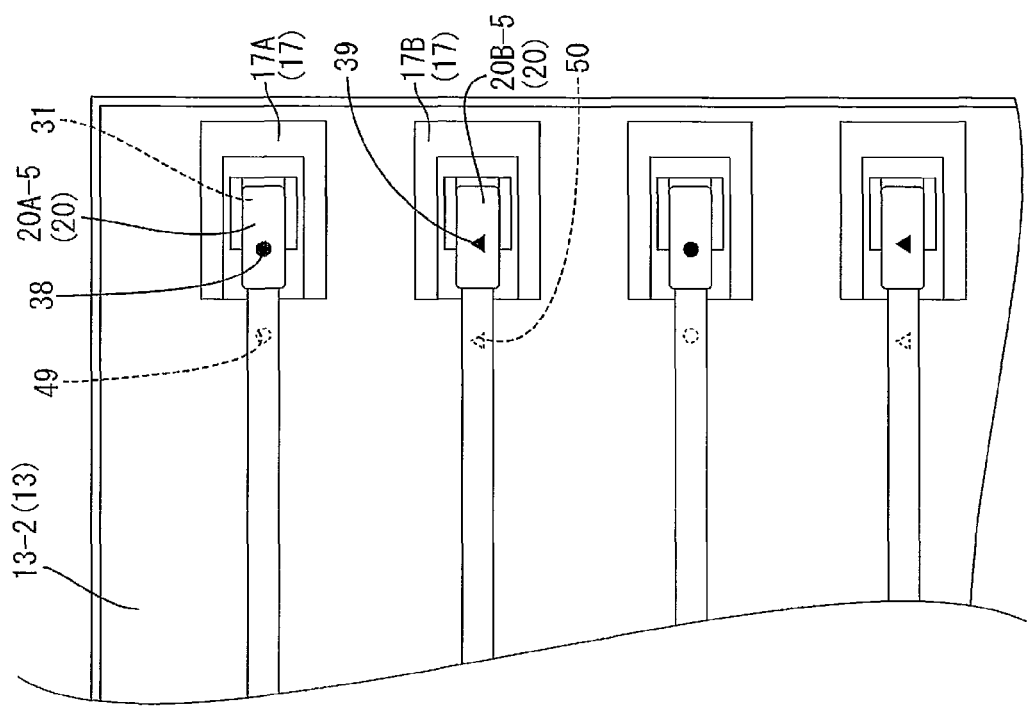
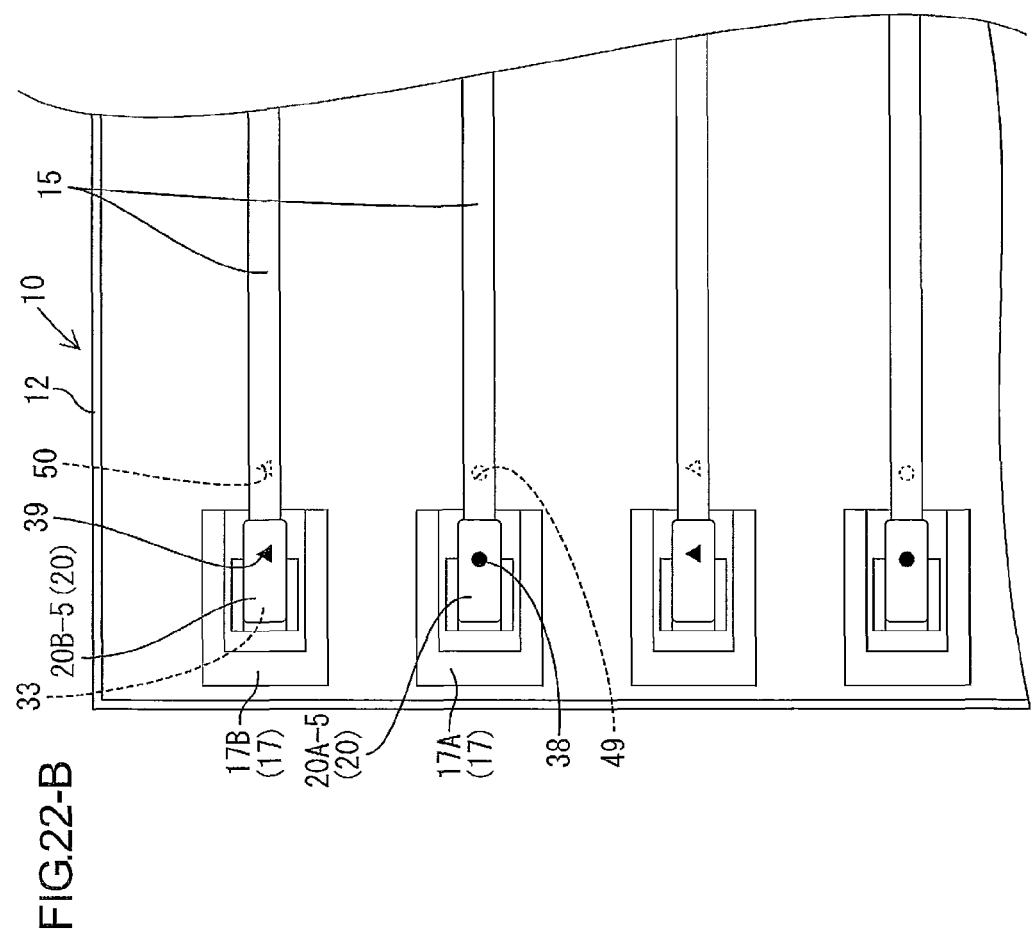
FIG.22-B

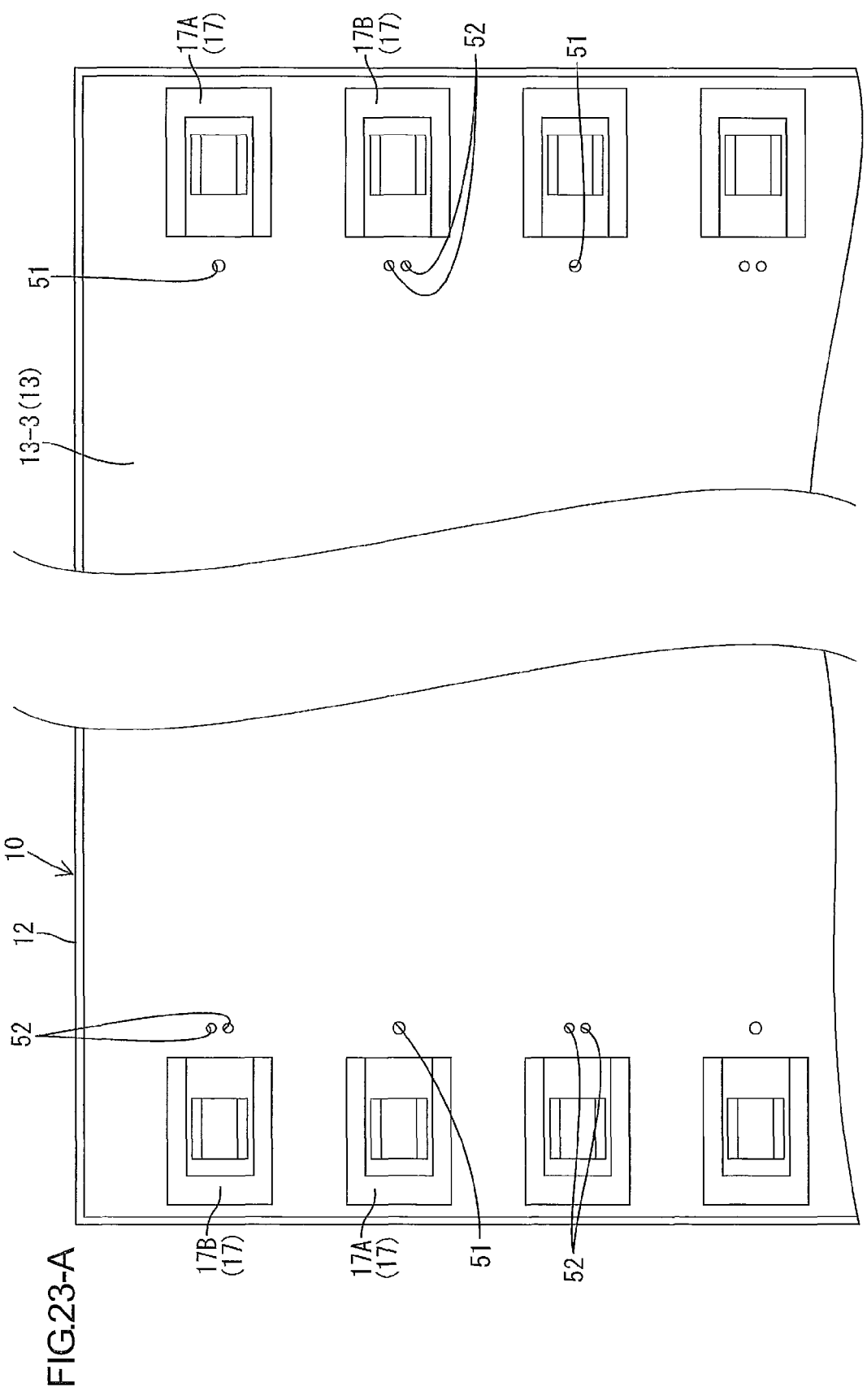
FIG.23-A

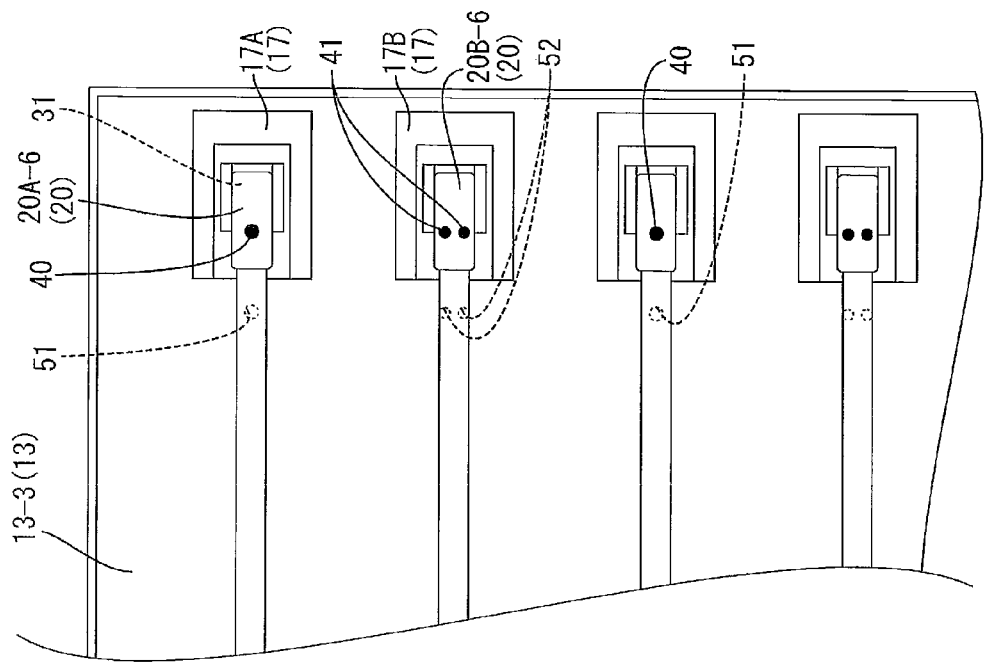
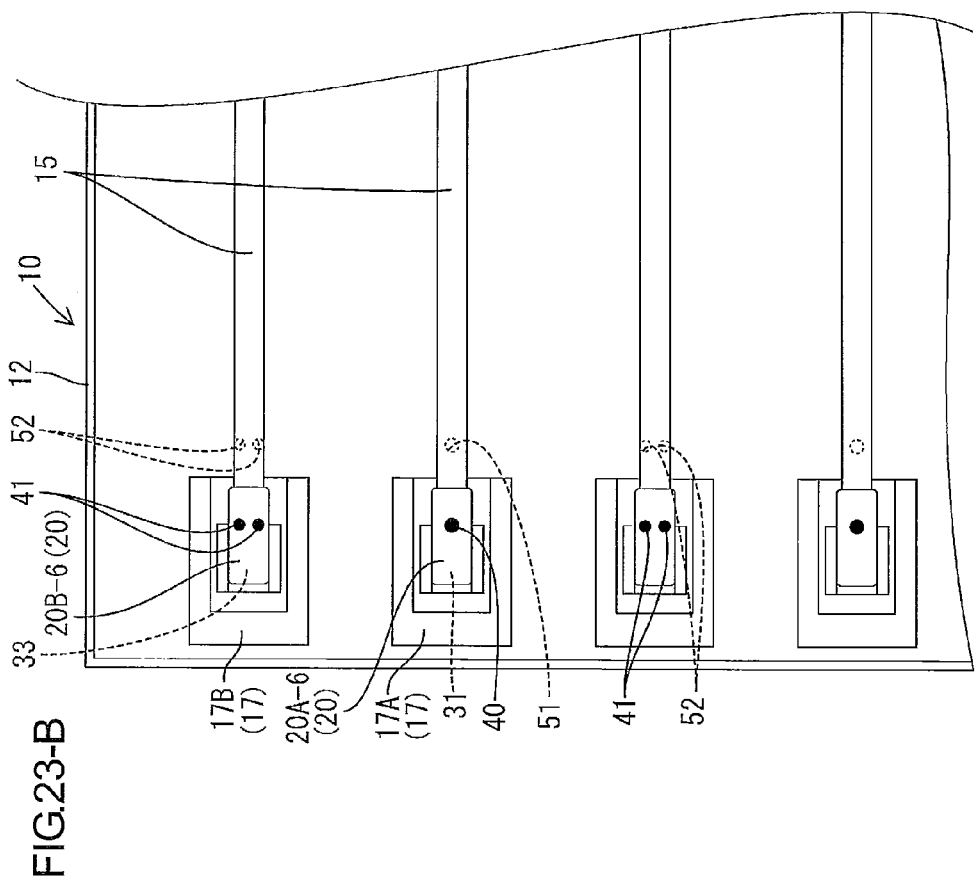
FIG.23-B

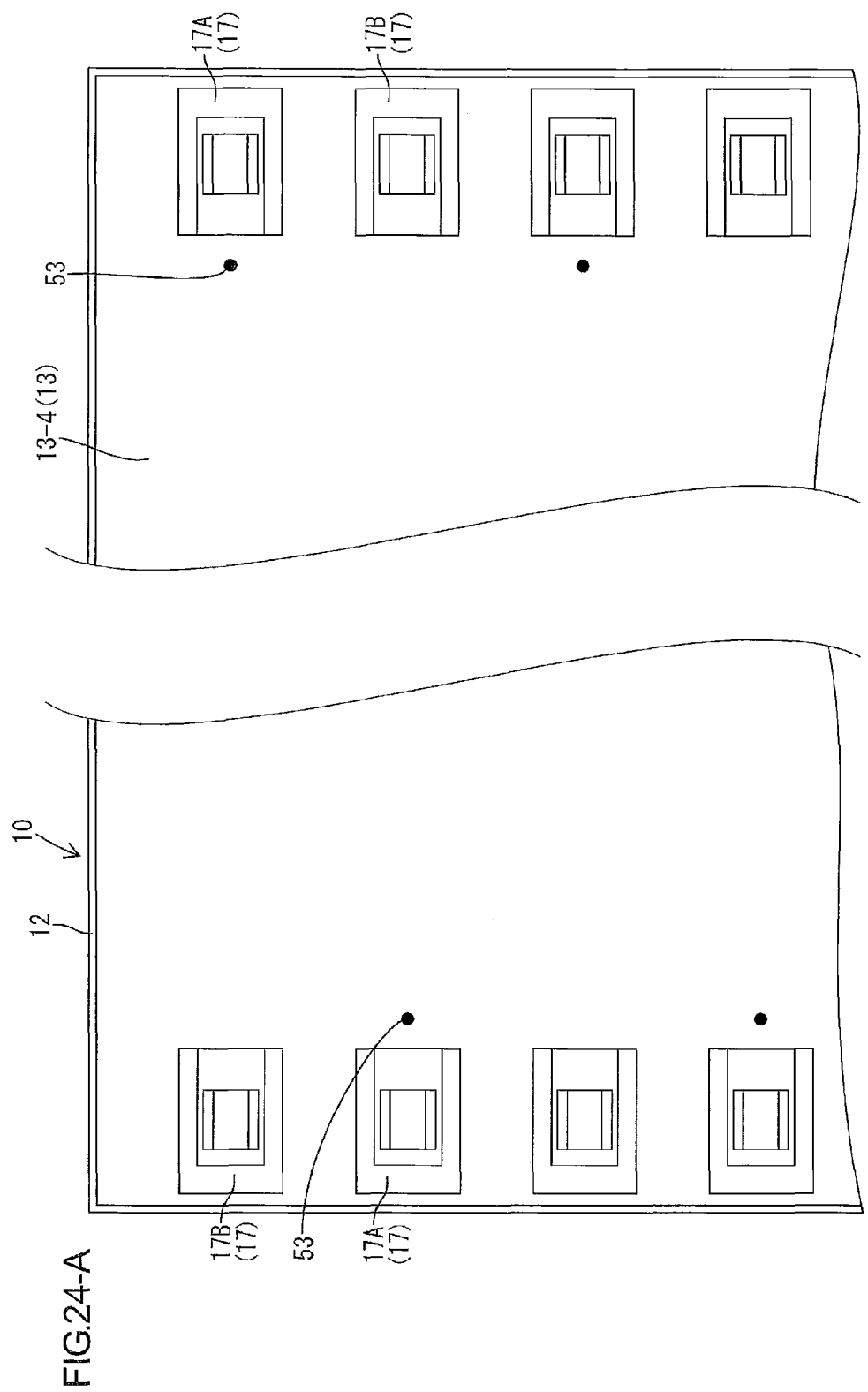

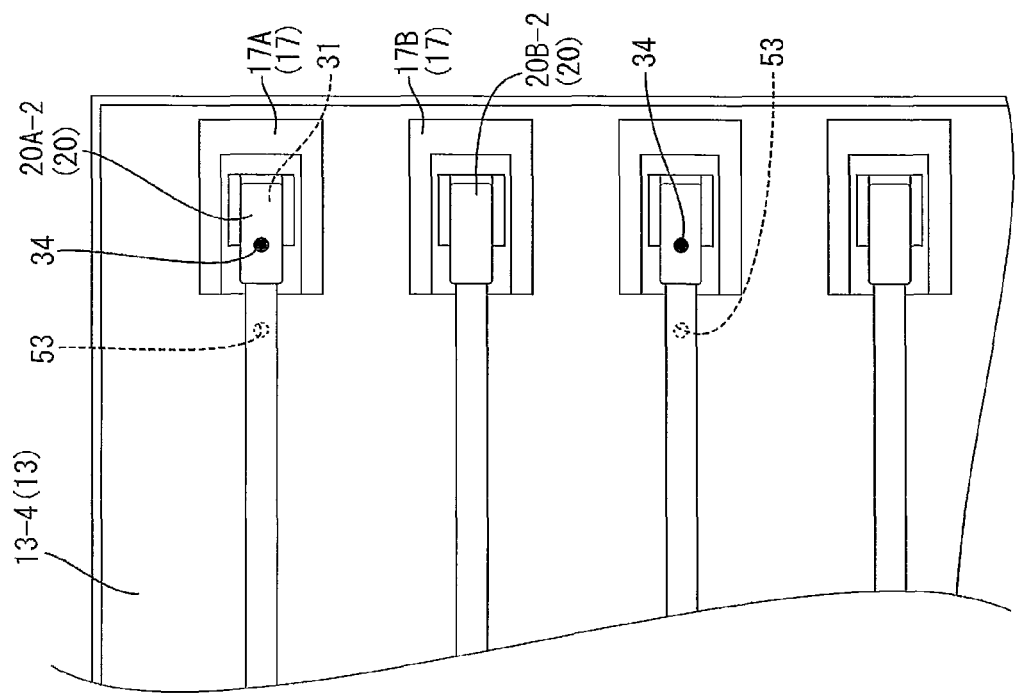
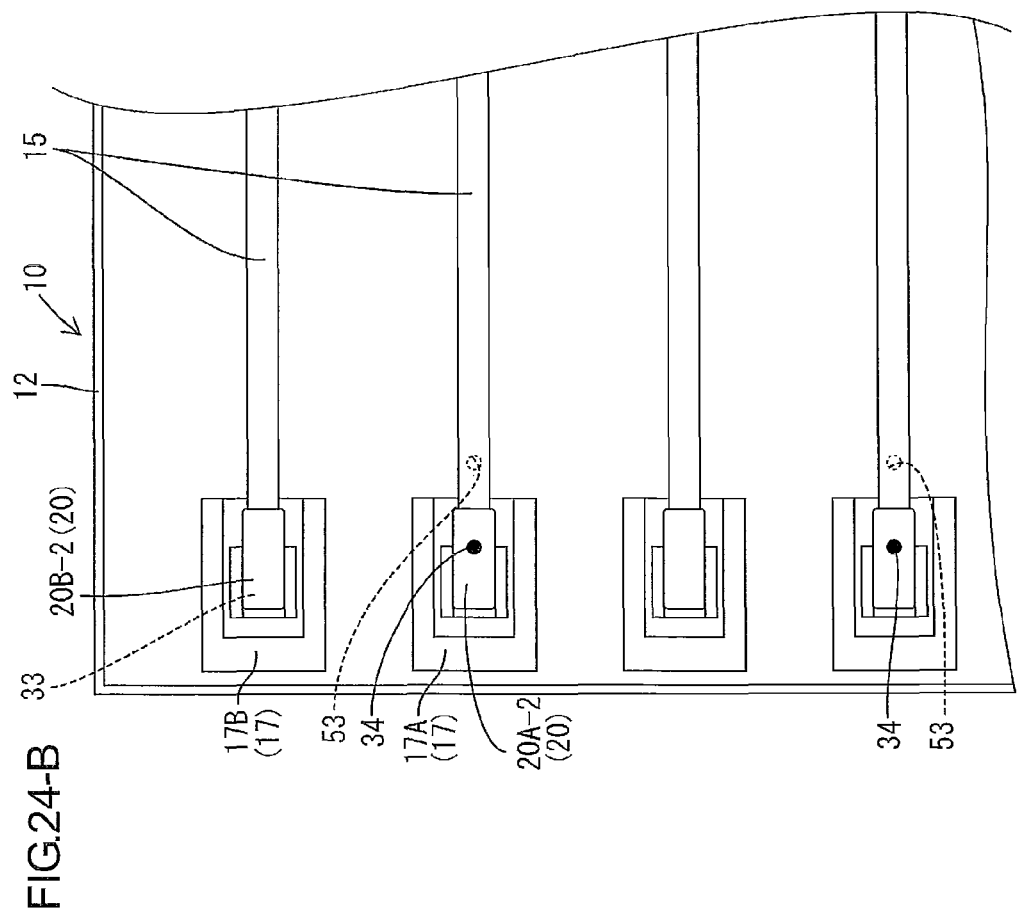
FIG.24-B

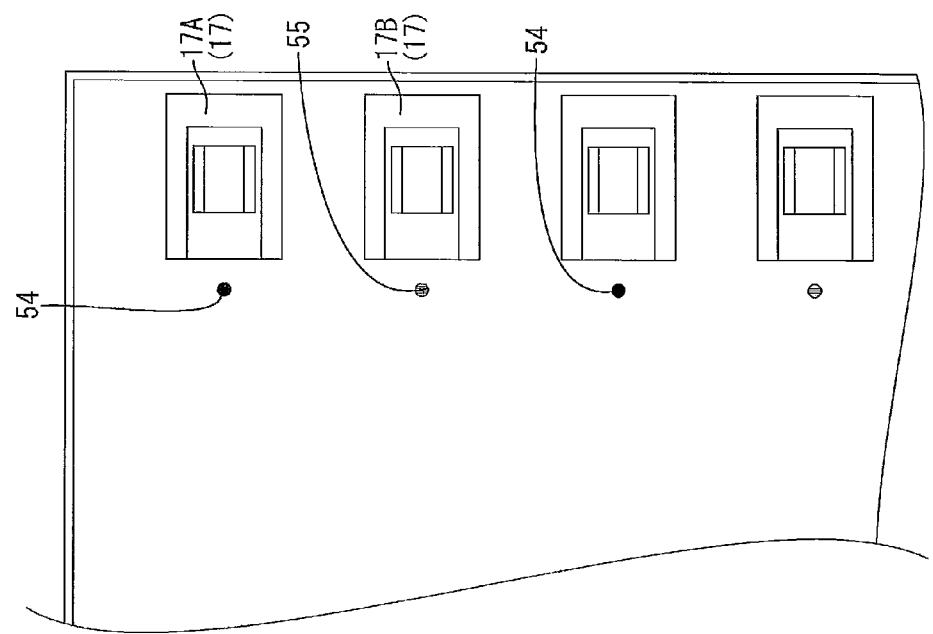
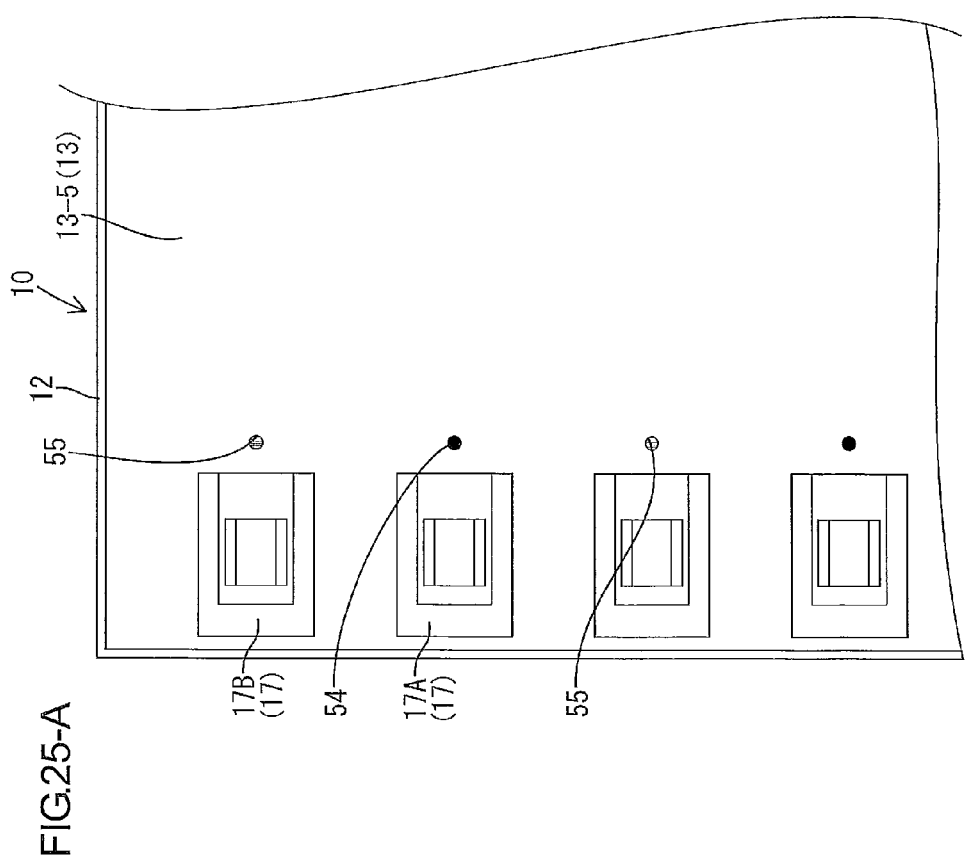
FIG.25-A

FIG.25-B
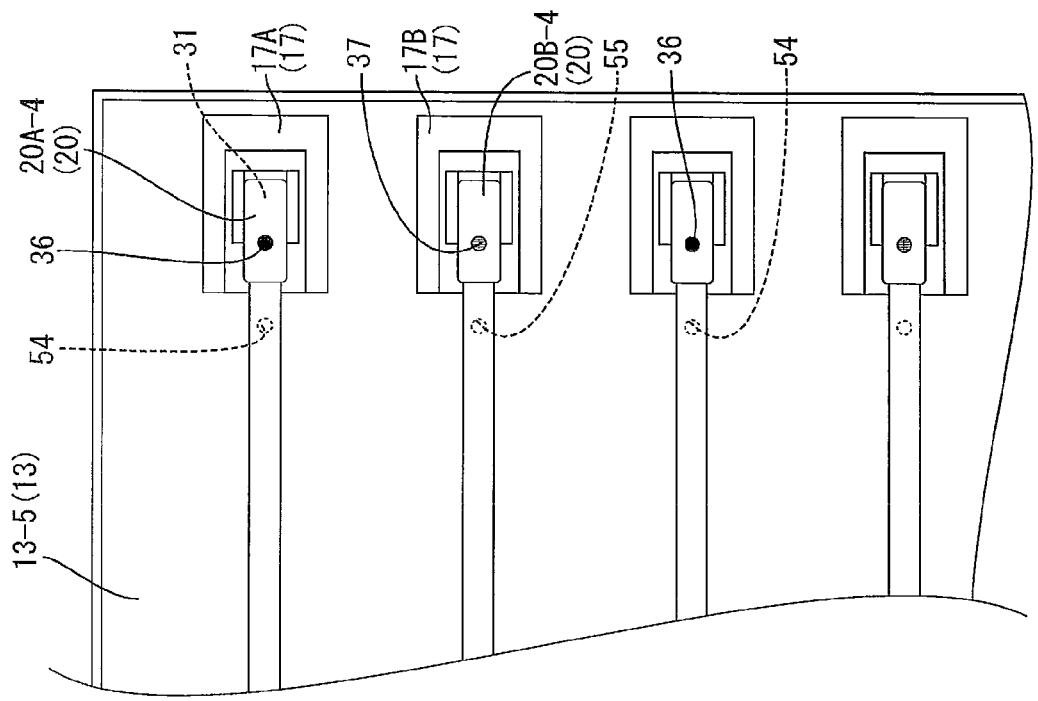
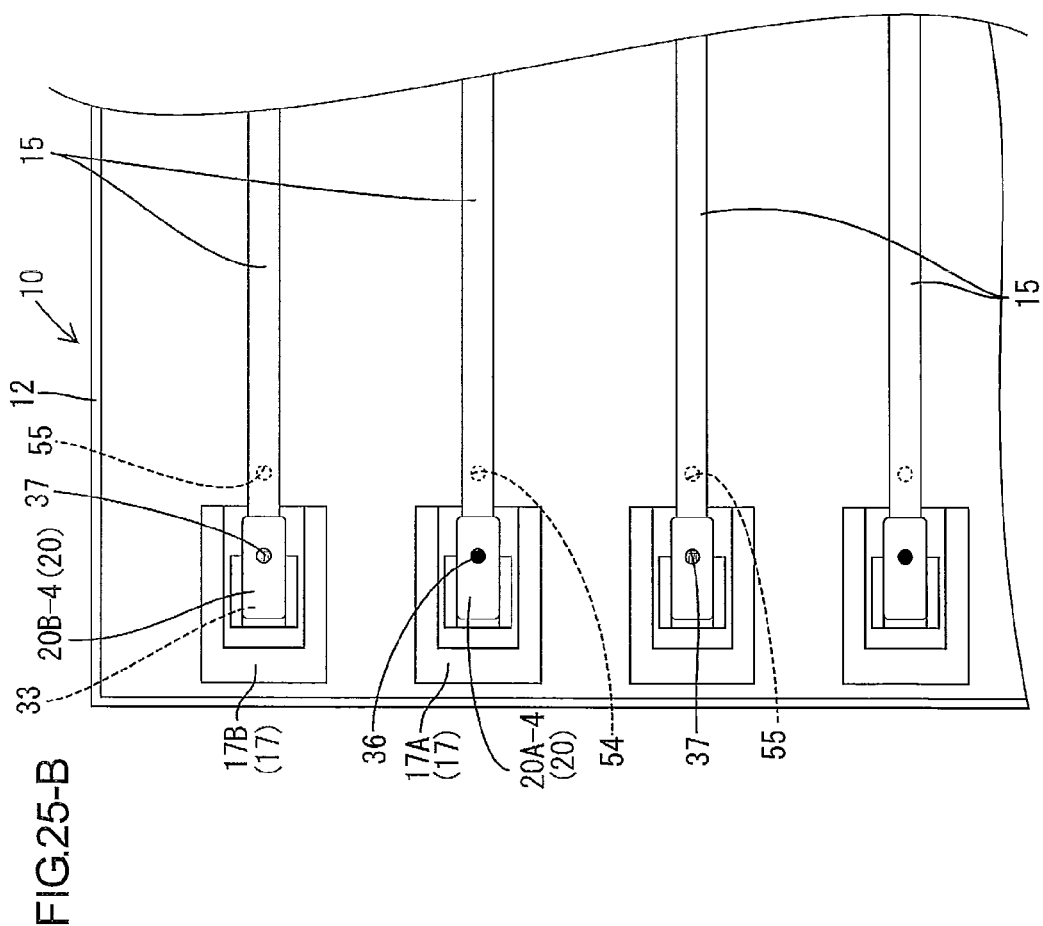

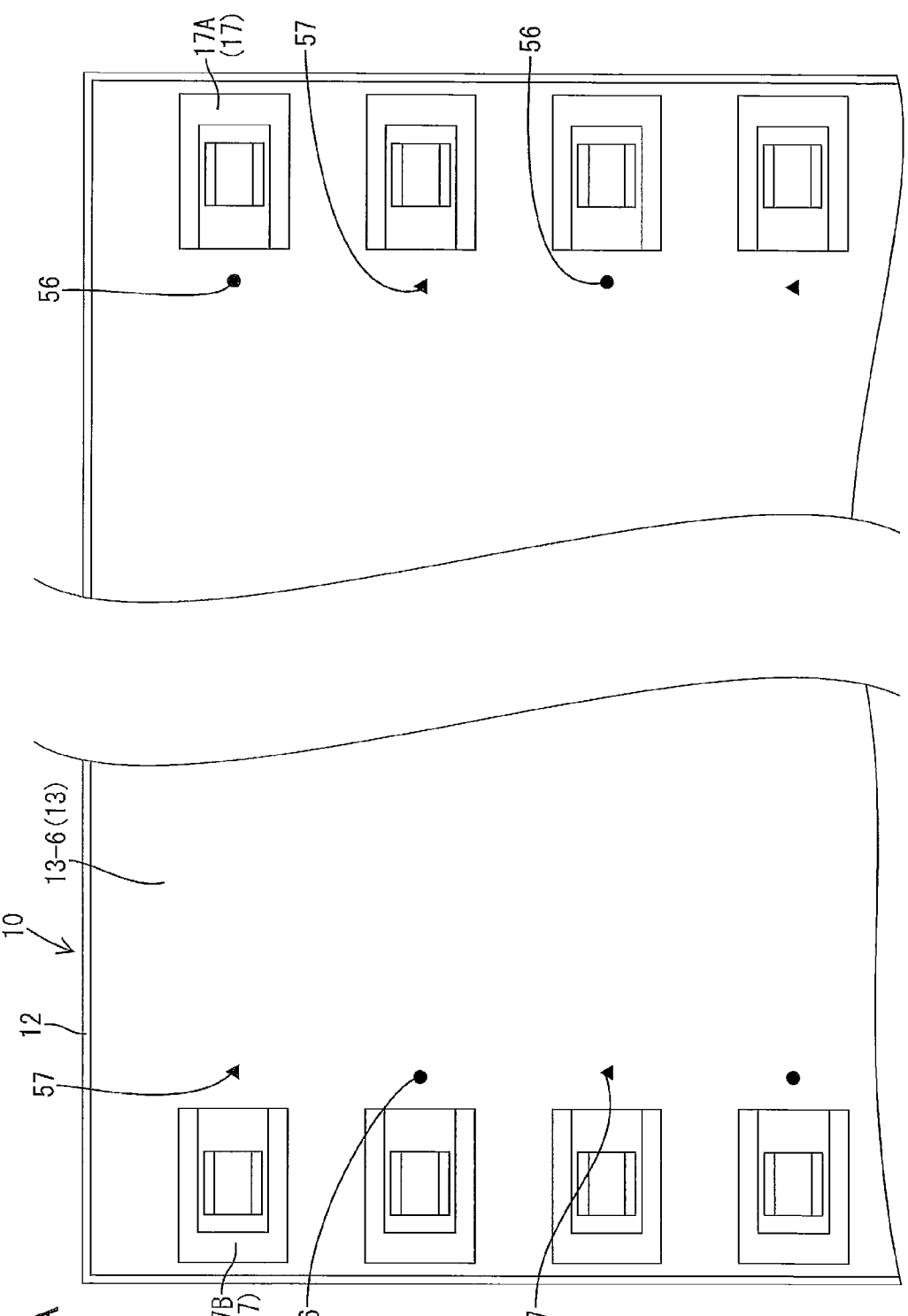

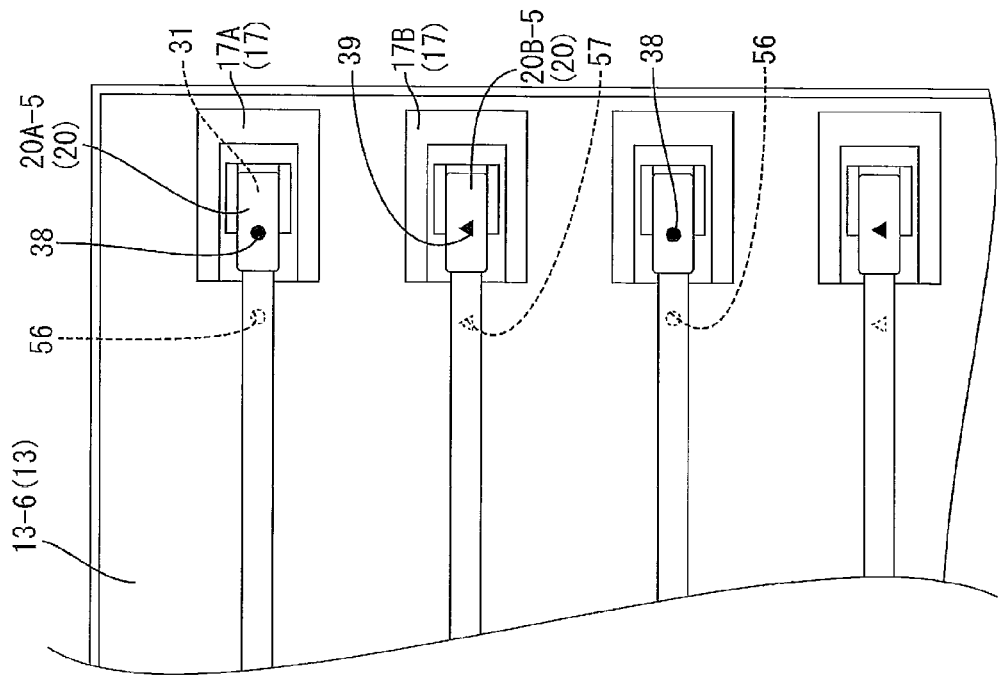
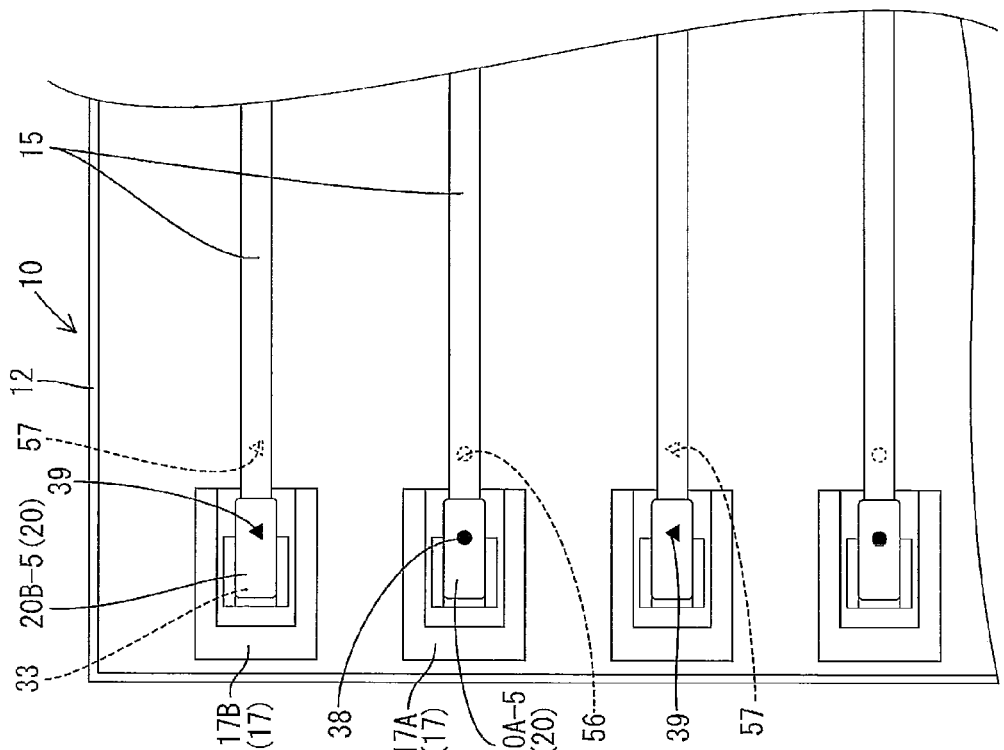
FIG.26-B

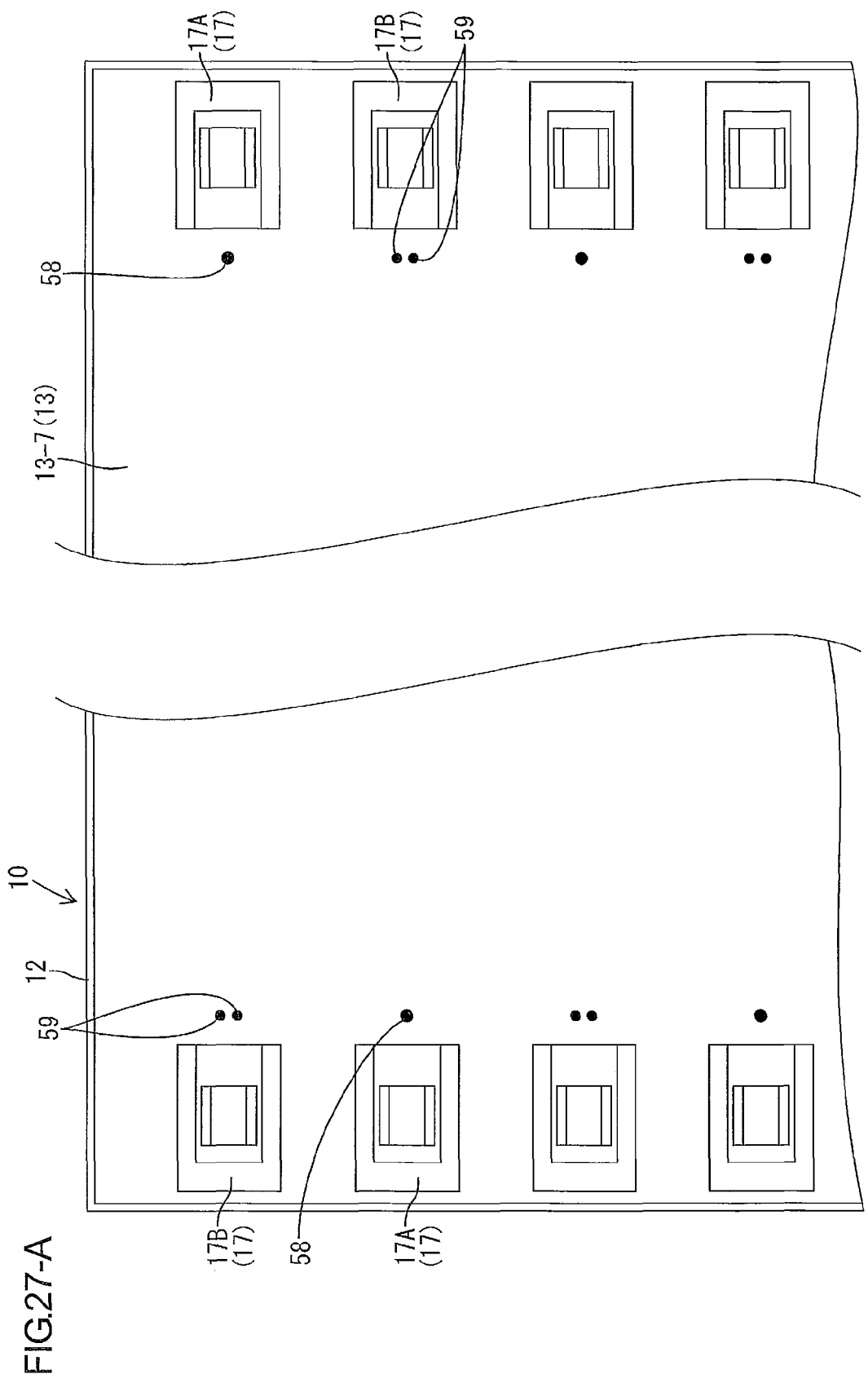
FIG.27-A

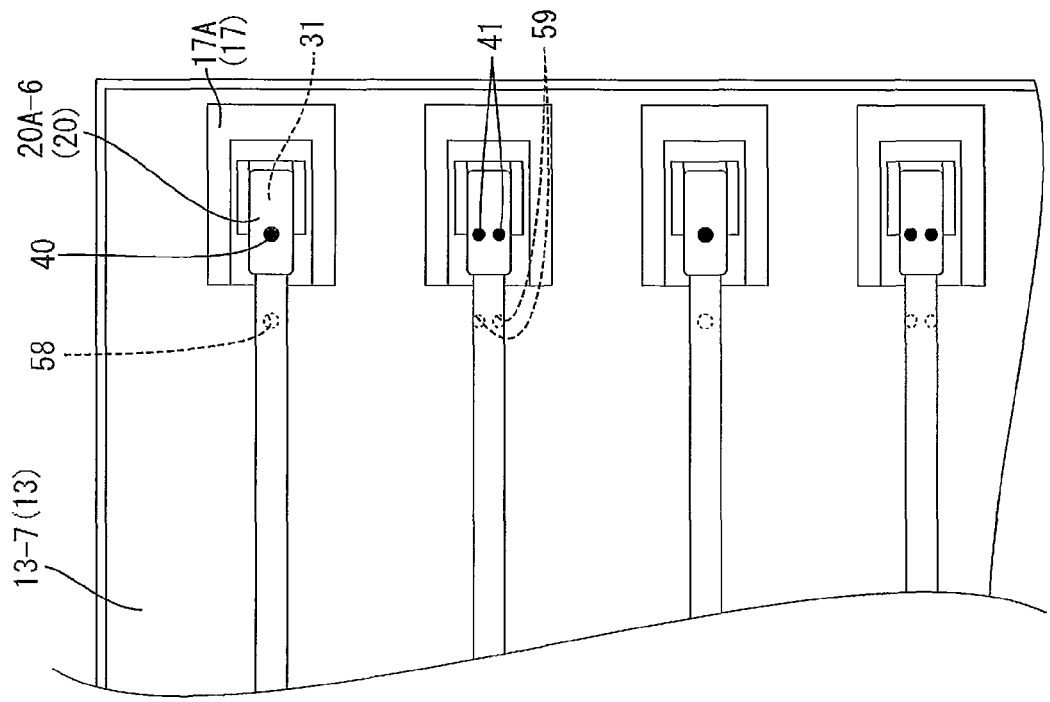
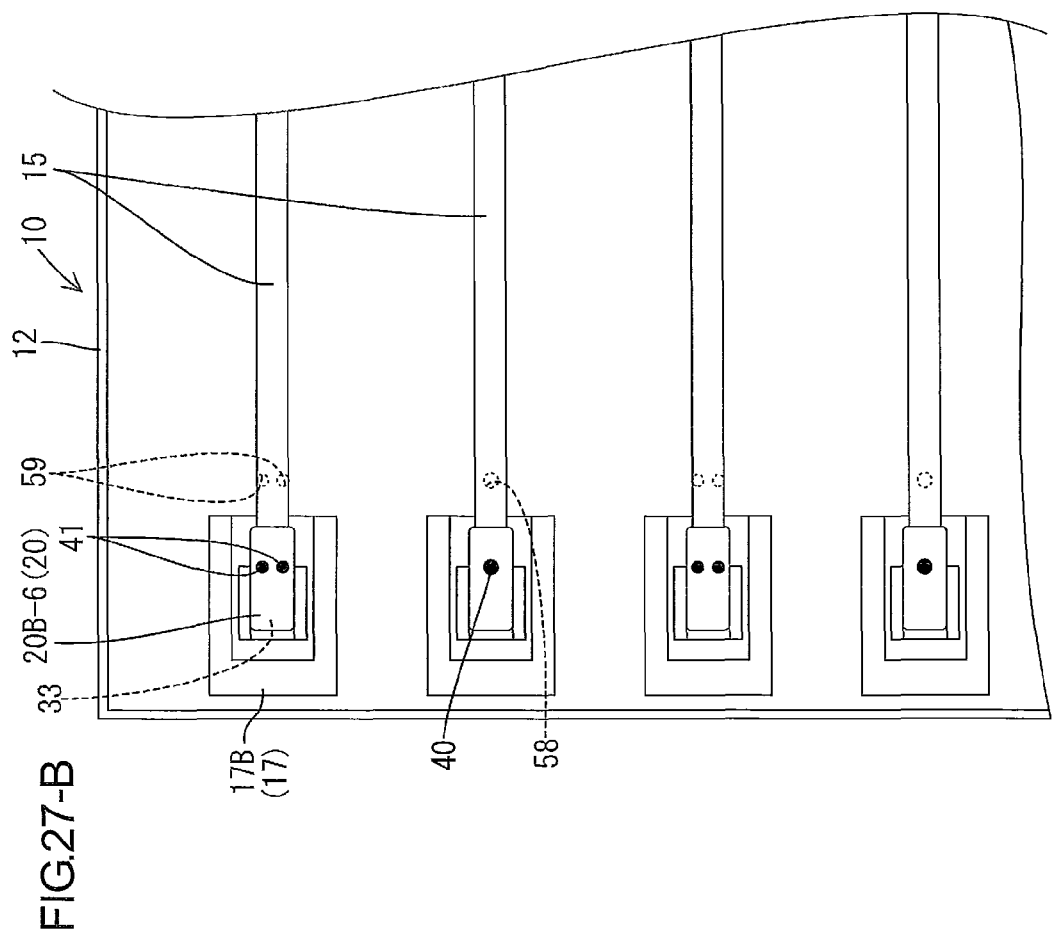
FIG.27-B

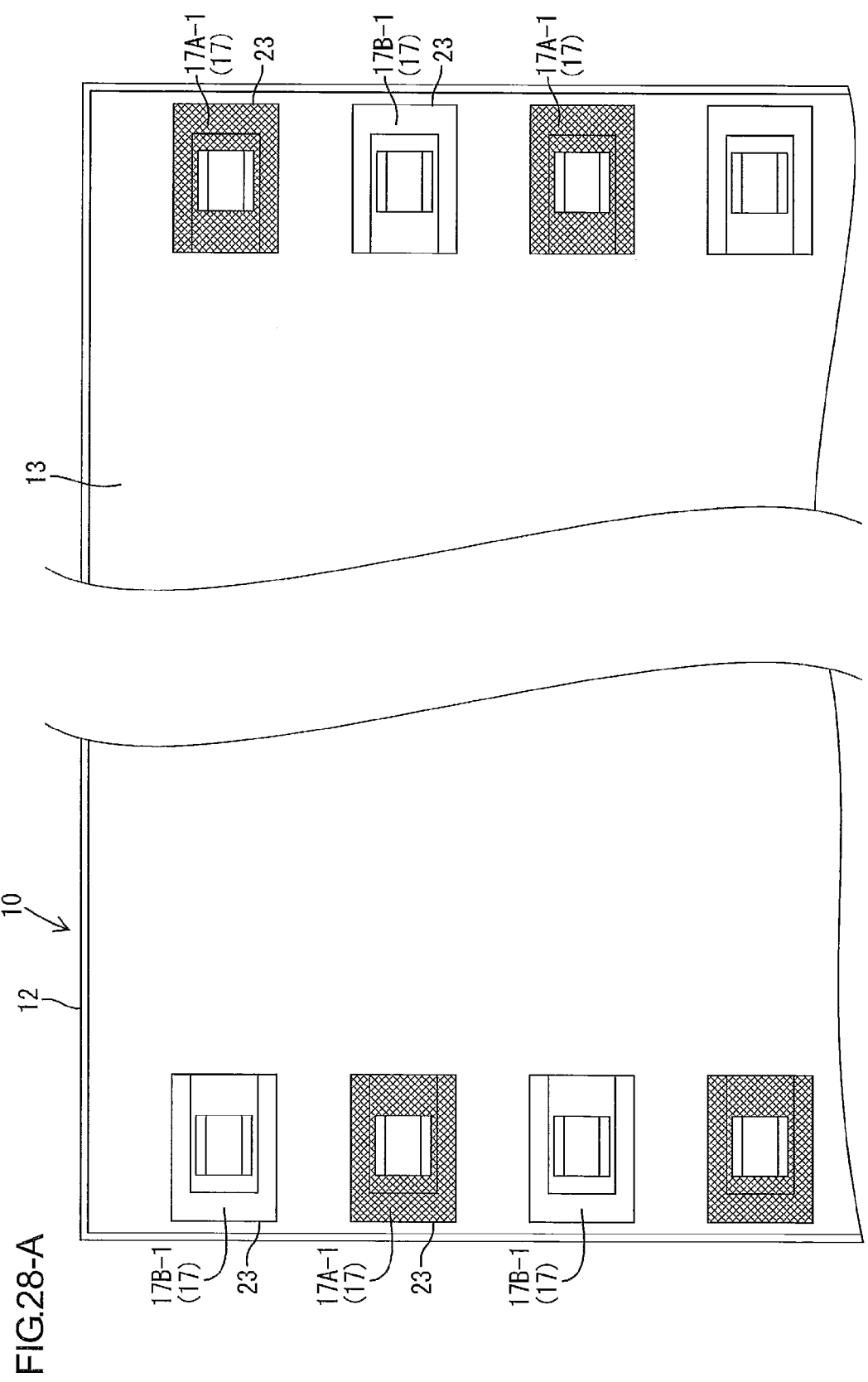

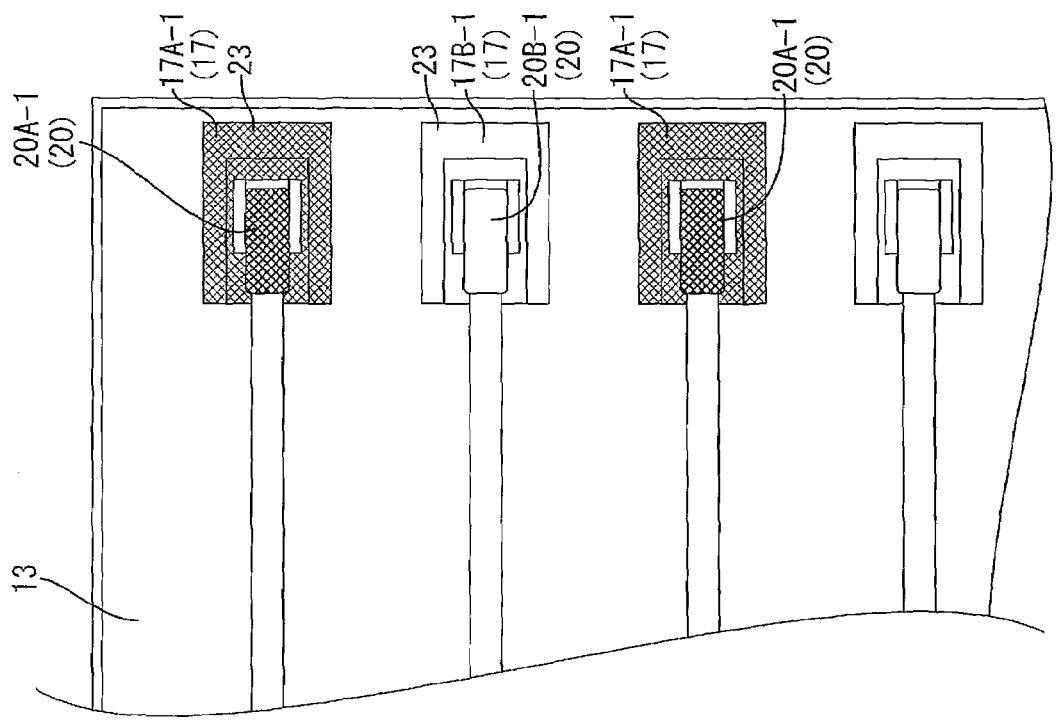
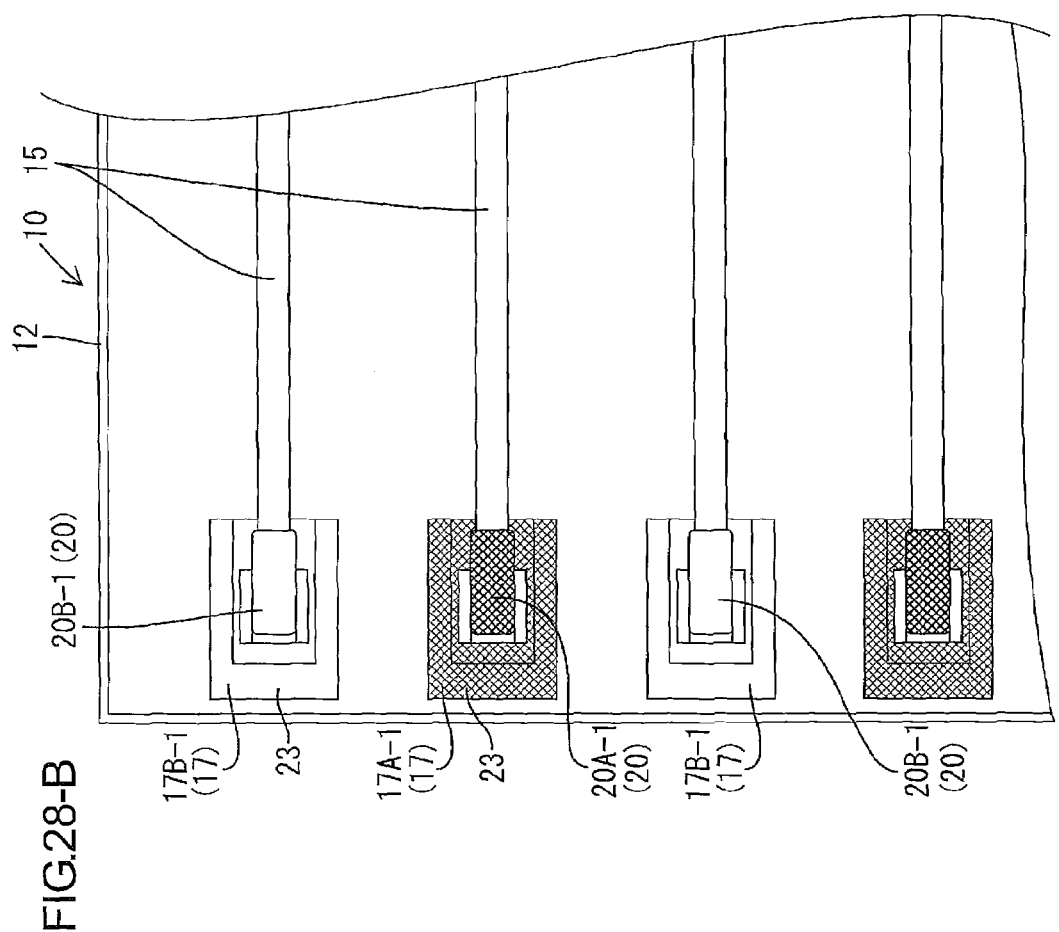
FIG.28-B

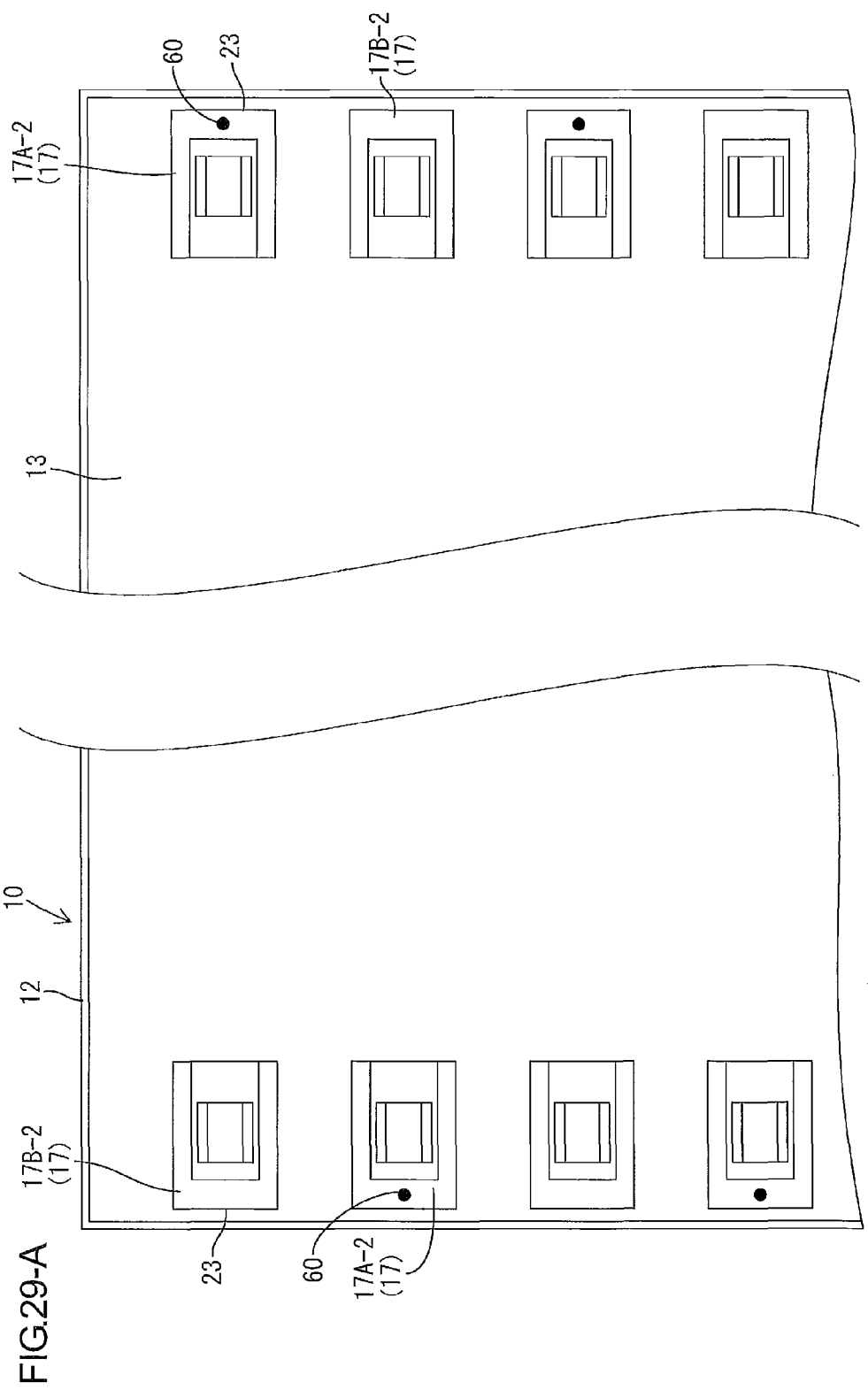

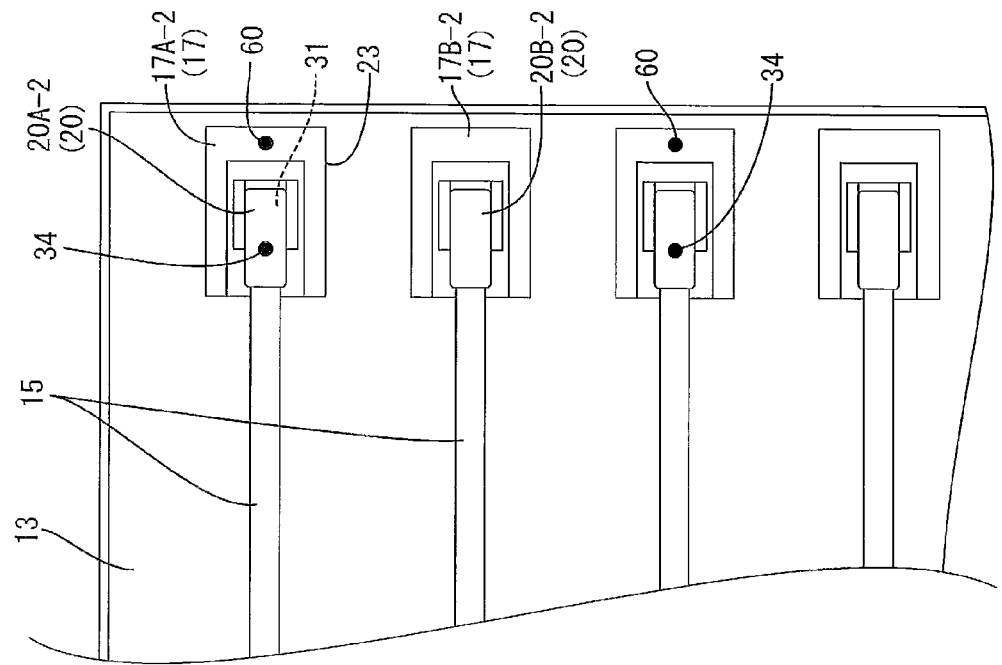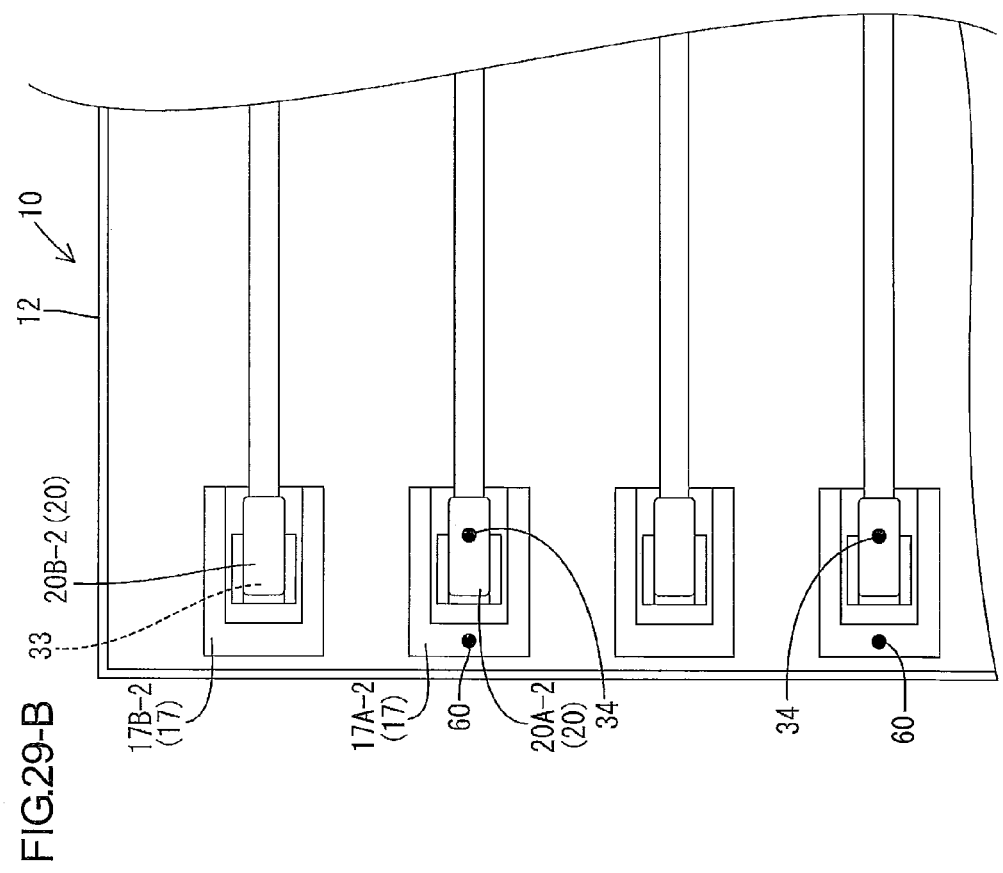

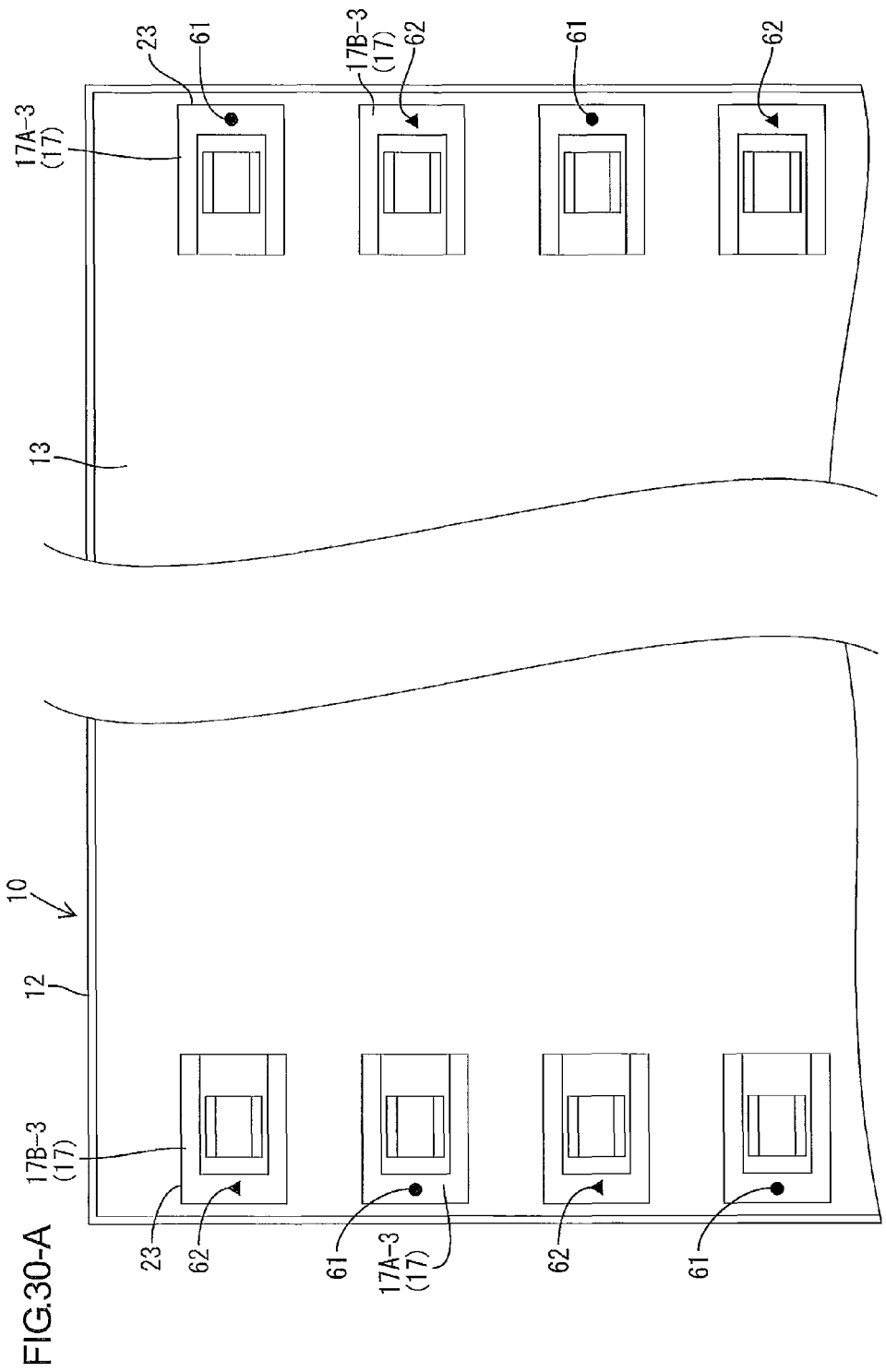

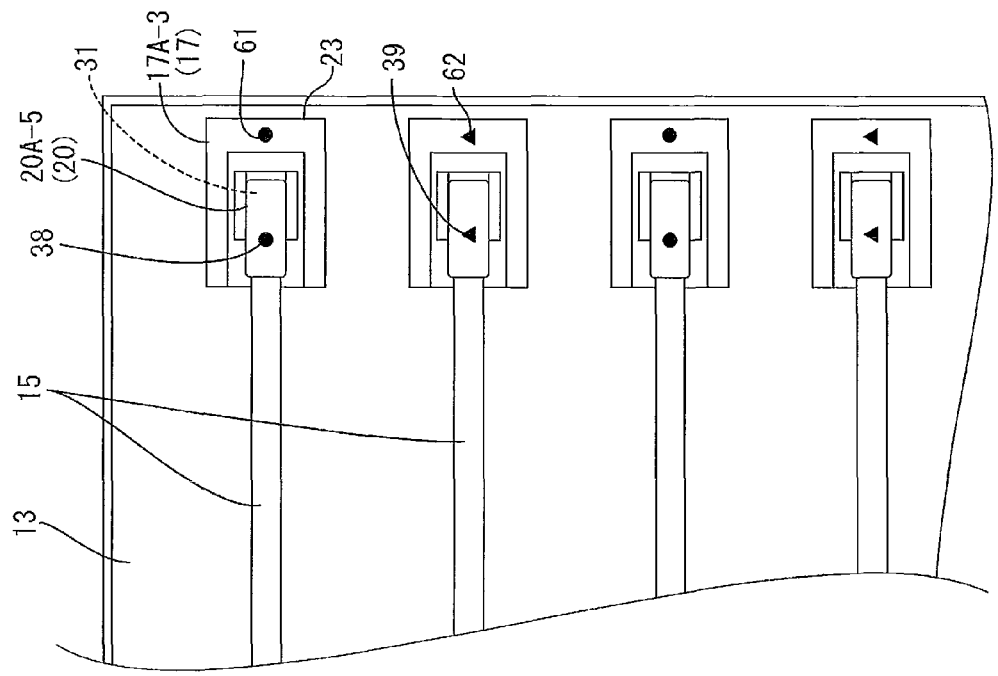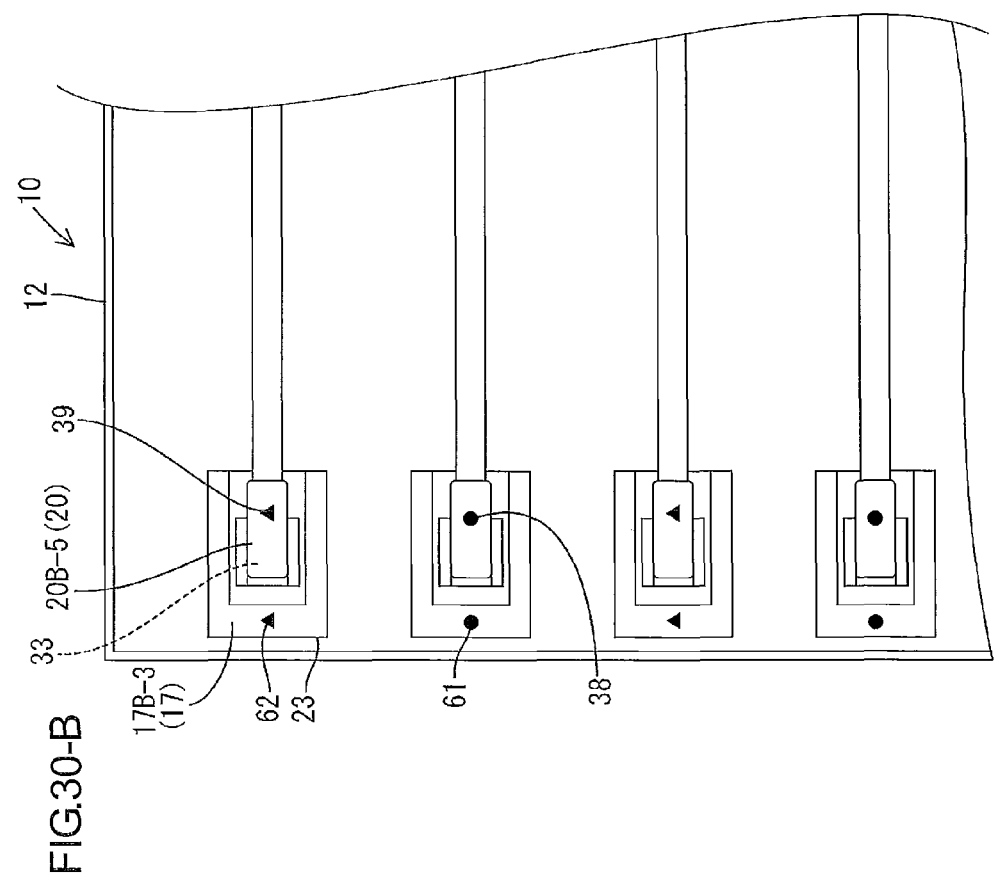
FIG.30-B

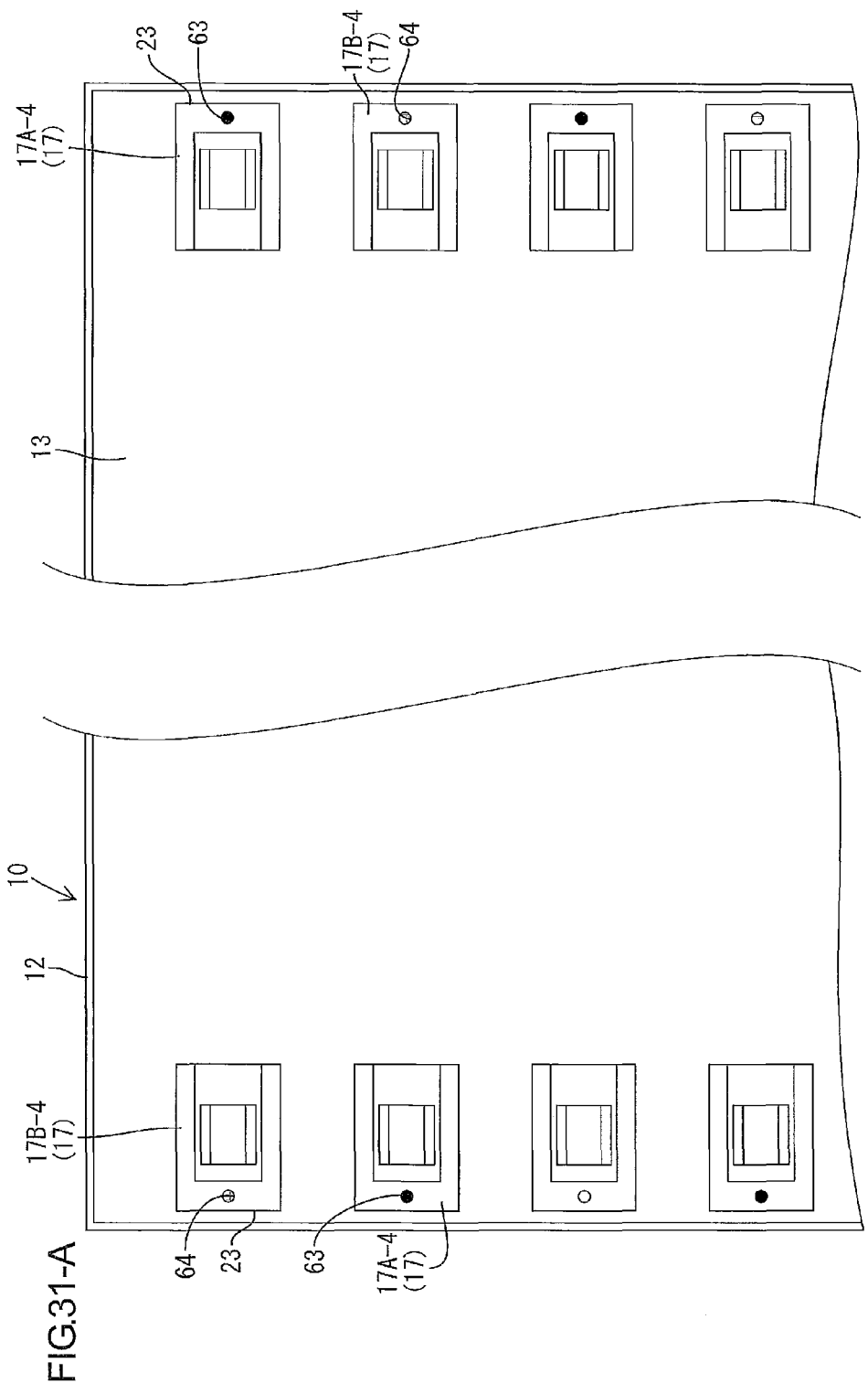

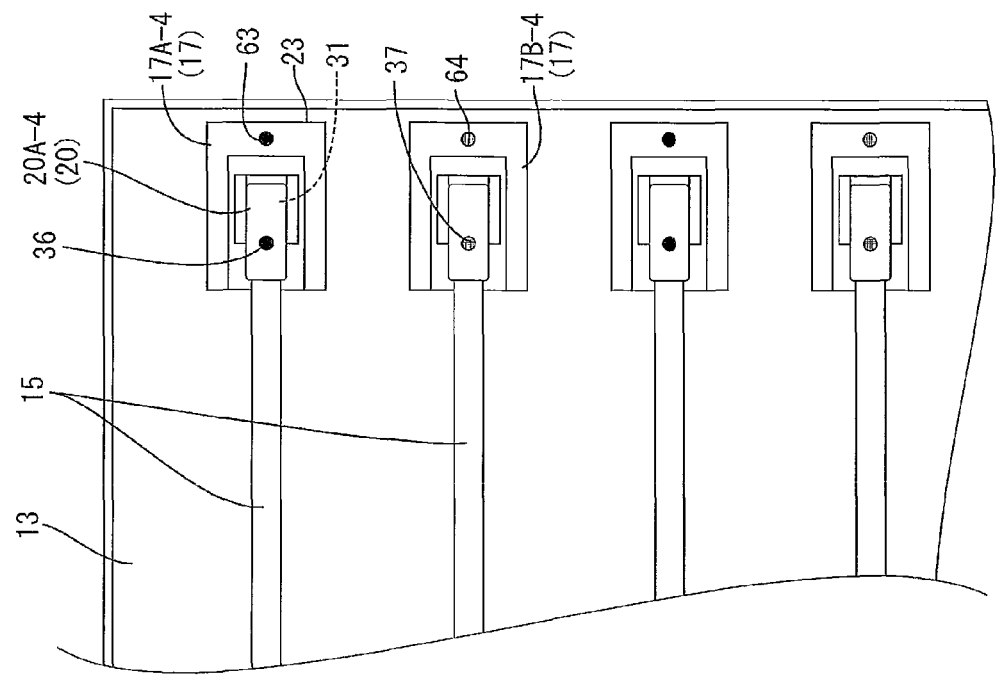
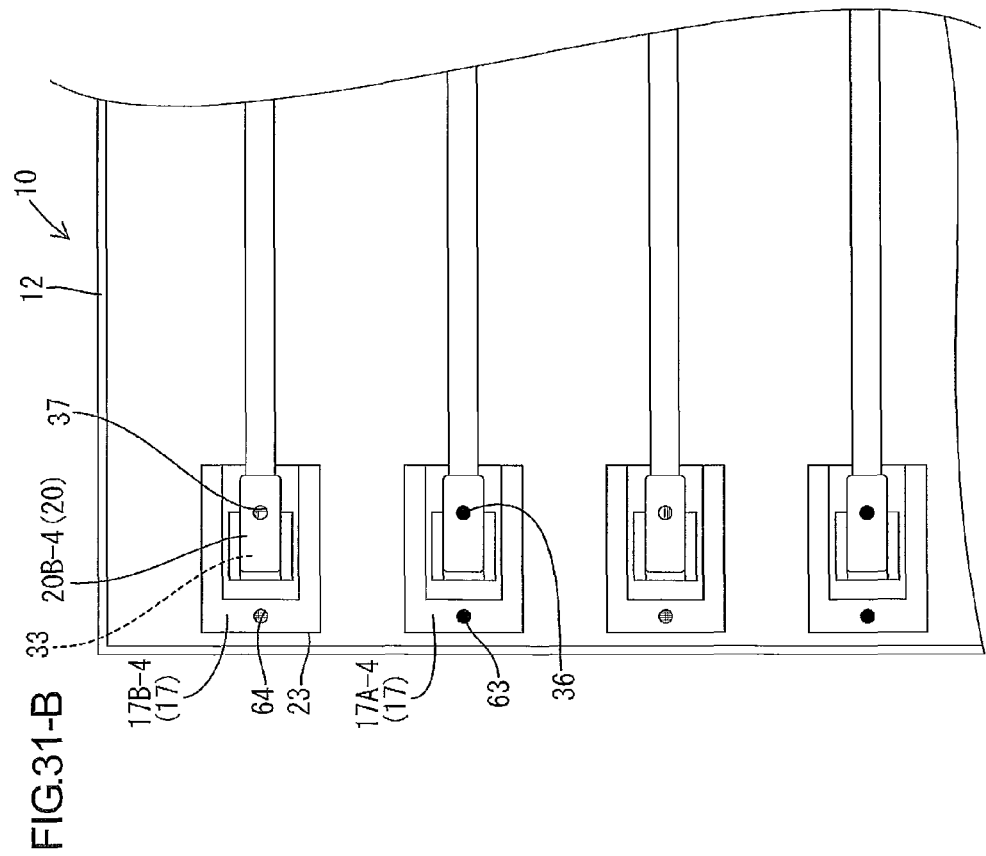
FIG.31-B

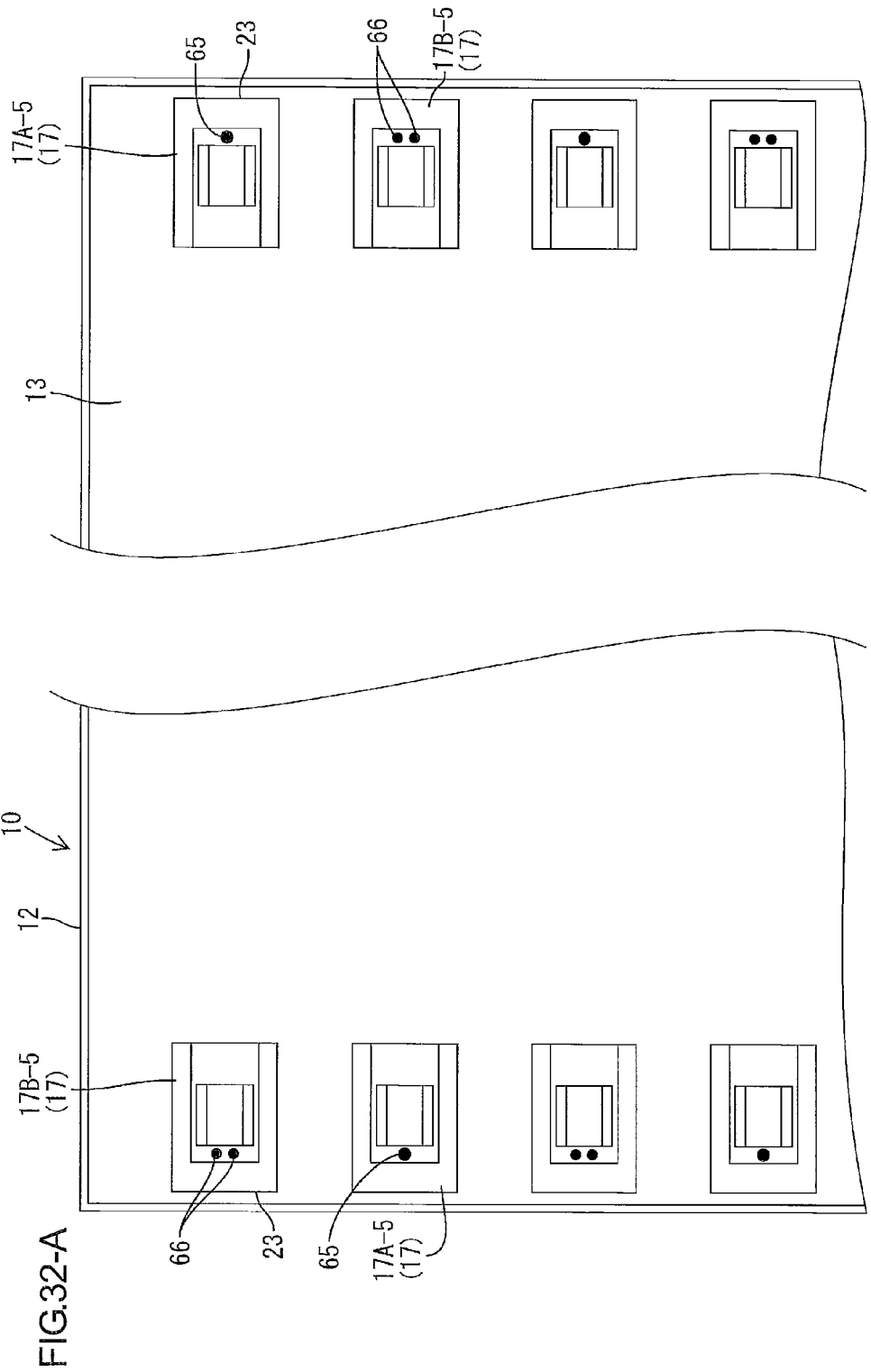

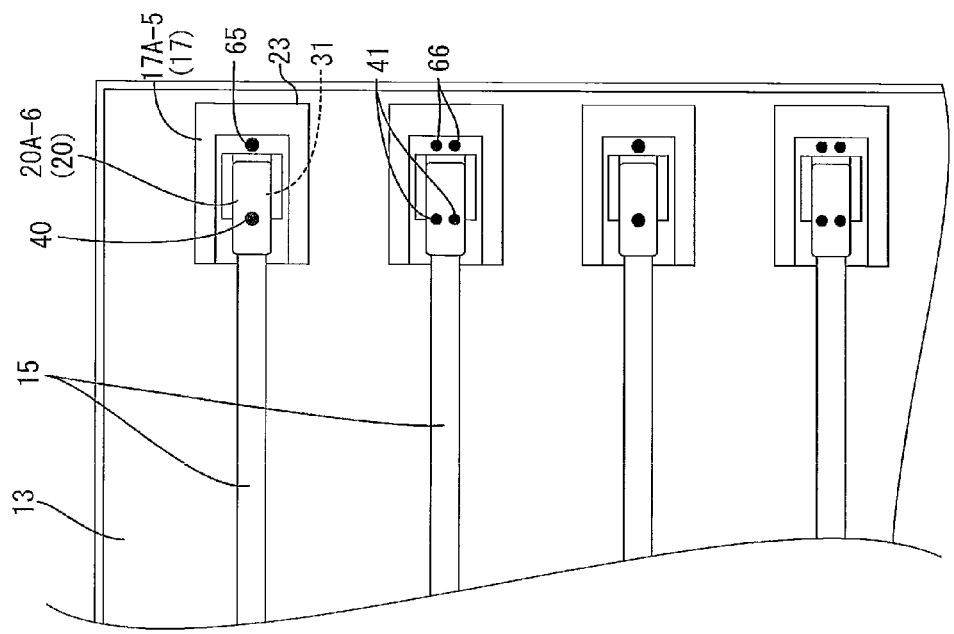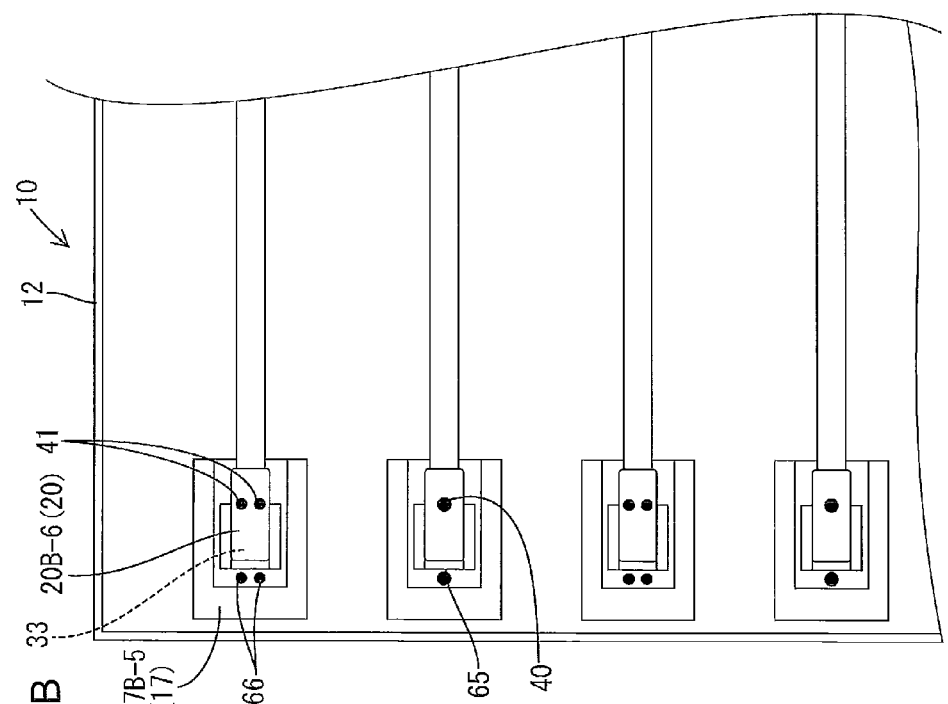

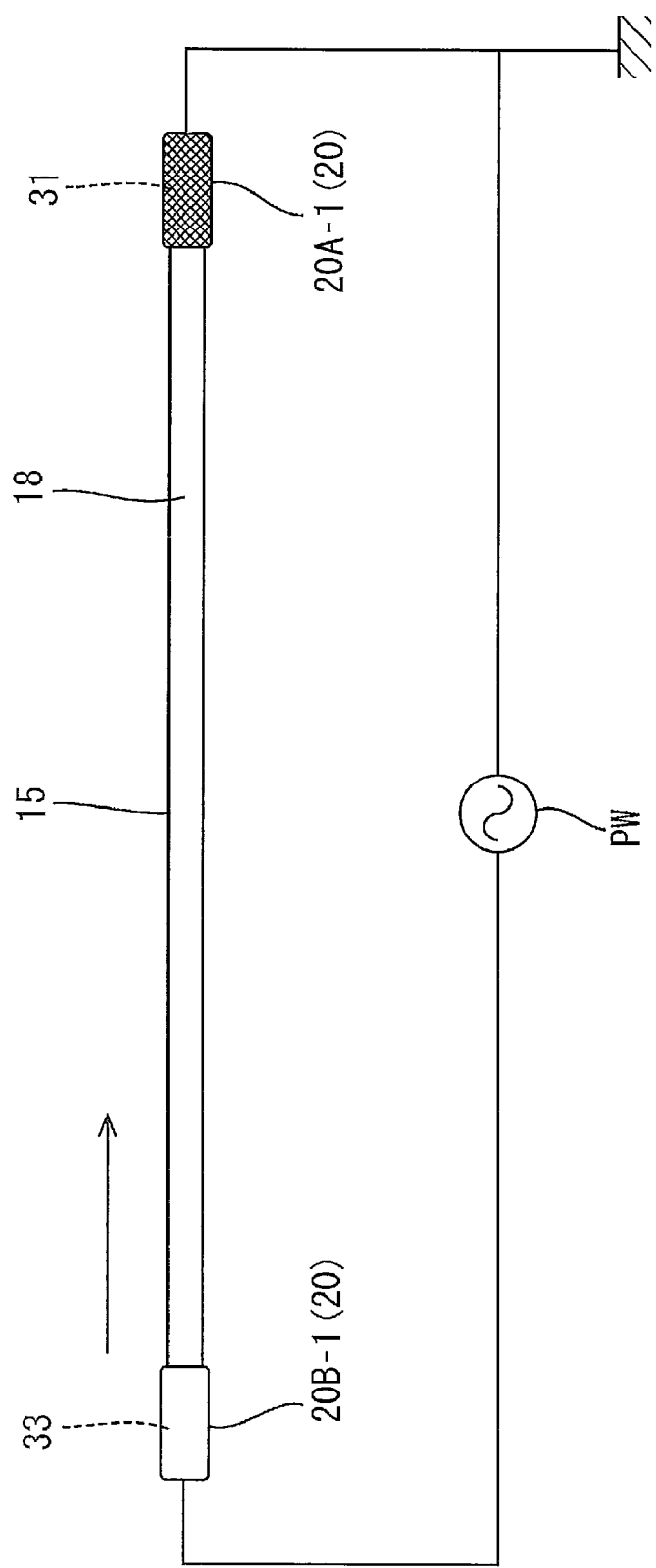

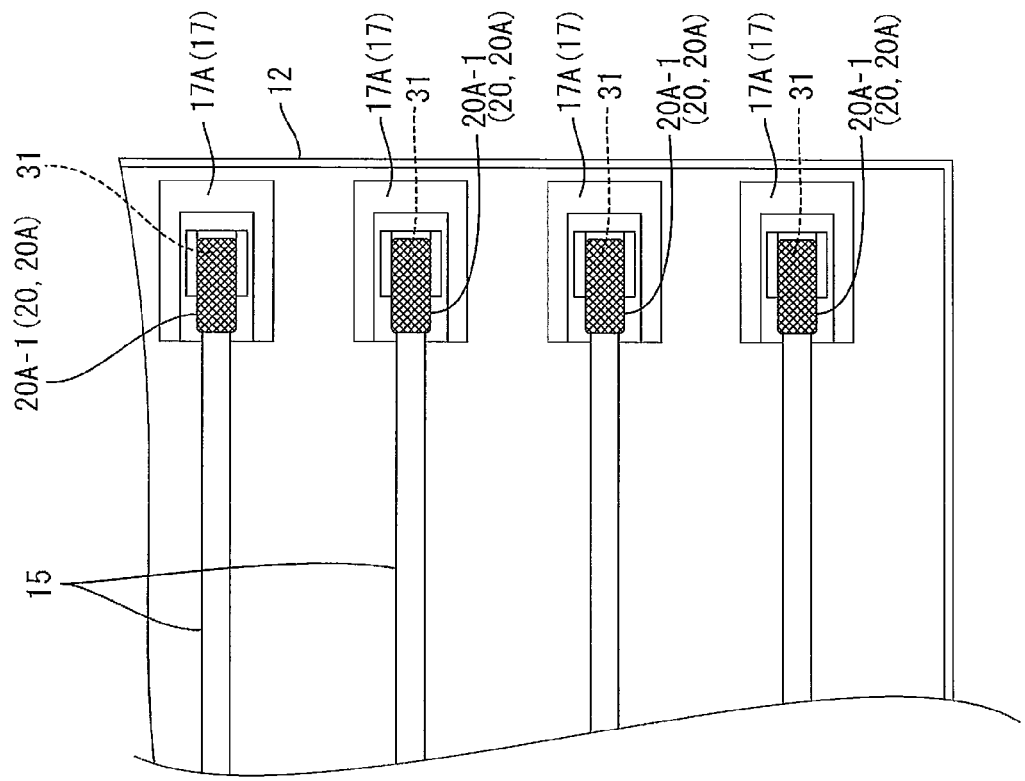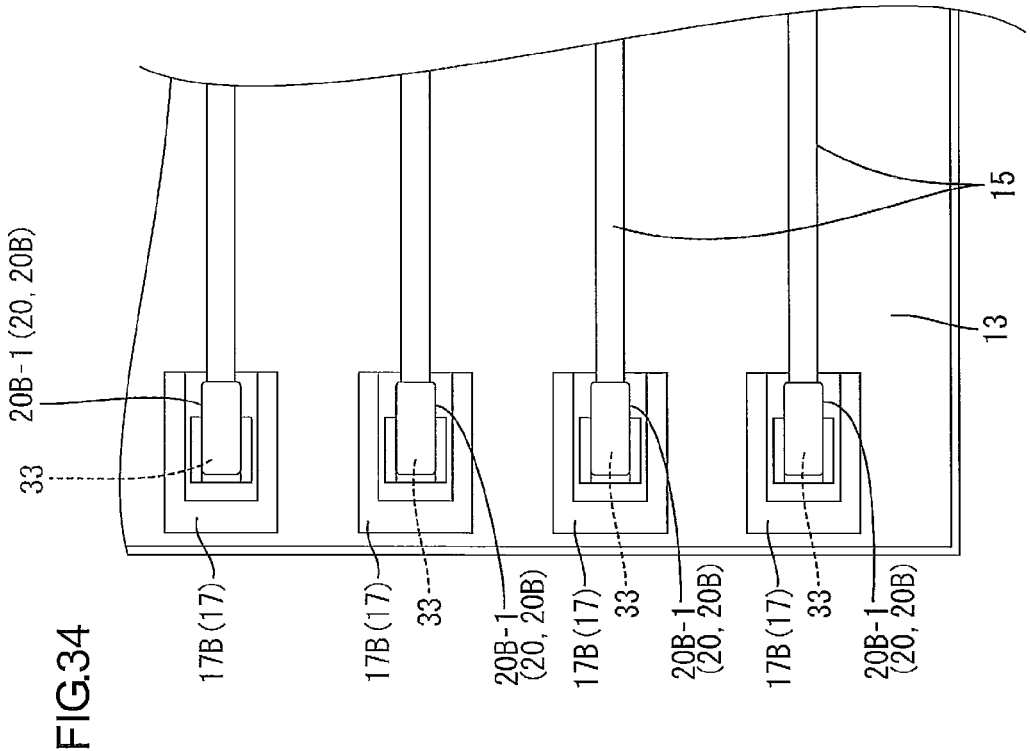
FIG.34

LIGHTING DEVICE, DISPLAY DEVICE AND TELEVISION RECEIVER

TECHNICAL FIELD

The present invention relates to a lighting device, a display device and a television receiver.

BACKGROUND ART

A backlight included in a liquid crystal display device conventionally uses lamps such as cold cathode tubes. A simple explanation of a general method for manufacturing the backlight follows. First, a lamp maker produces cold cathode tubes, and subsequently harnesses to be connected to an inverter board are soldered to lead terminals provided on respective end portions of each cold cathode tube. The resultant structures are packed and transferred to a maker of backlights or a maker of liquid crystal display devices. In the maker of backlights or the maker of liquid crystal display devices, components such as cold cathode tubes are mounted to the chassis of a backlight, and the connectors provided on the above harnesses are plugged into the inverter board.

According to the above manufacturing method, the soldering of harnesses to the lead terminals of each cold cathode tube and/or the insertion of connectors of the harnesses may result in increased operating time or increased cost. In this connection, Patent Document 1 below describes an example of a manufacturing method that enables reduction of soldering to cold cathode tubes. According to the method, ferrules are attached to the glass tube of each cold cathode tube, so as to cover the respective end portions thereof and be connected to electrodes provided therein. On the other hand, connecting terminals connected to the inverter board are provided on the chassis side. The ferrules can be brought into elastic contact with spring portions of the connecting terminals in the course of mounting cold cathode tubes. Thereby, the direct soldering to the cold cathode tubes can be eliminated.

On the other hand, a method described in Patent Document 2 below is known as a manufacturing method of cold cathode tubes. According to the method, while a cylindrical glass tube having openings at both ends is held in the upright position, a solution obtained by dissolving phosphor in a solvent is pulled therein through the opening so as to subsequently run down. Thereby, the phosphor is applied to the inner circumferential surface of the glass tube. Thereafter, one end portion of the glass tube is closed (or primarily sealed) after an electrode is set therein, and then the other end portion is closed (or secondarily sealed) after an electrode is set therein. Thus, cold cathode tubes can be manufactured.

Patent Document 1: JP-A-H7-218729
Patent Document 2: JP-A-H9-17329

DISCLOSURE OF THE INVENTION

Problem to be Solved by the Invention

The phosphor includes a number of different kinds of phosphor particles corresponding to luminescent colors, and each kind of phosphor particles has a different particle diameter or a different specific gravity. Therefore, as a result of applying the phosphor to the inside of a glass tube using gravity as described above, the various kinds of phosphor particles may be distributed nonuniformly along the axial direction. Accordingly, the cold cathode tube may be prone to color unevenness following a specific pattern of variation along its axial direction.

In view of the above, as for a construction including a plurality of parallel-arranged cold cathode tubes as in a direct-light type backlight, it is proposed that cold cathode tubes are alternately mounted so that adjacent cold cathode tubes lie in the opposite orientation to each other. Thereby, the color unevenness of the entire backlight can be canceled out. In the case of a conventional type of cold cathode tubes to which harnesses are soldered, the soldering is performed in a lamp maker by extension of the production line of cold cathode tubes. In this case, the alternate arrangement of cold cathode tubes can be achieved relatively easily, by taking advantage of the cold cathode tubes automatically arranged in the same orientation on the production line. Further, a person of skill can visually distinguish between different orientations of a cold cathode tube, because the shapes of end portions of the glass tube slightly differ between the primarily sealed side and the secondarily sealed side due to manufacturing reasons.

In contrast, in the case of another type of cold cathode tubes having ferrules, it is impossible to mount cold cathode tubes following the production line thereof, and therefore the cold cathode tubes should be alternately arranged while being mounted to a chassis by a maker of backlights or a maker of liquid crystal display devices. In this case, it is difficult to mount cold cathode tubes so as to form alternate arrangement infallibly. Particularly, in the case of cold cathode tubes having ferrules, it is impossible to visually distinguish between different orientations of a cold cathode tube, because both end portions of the glass tube are covered with the ferrules.

In contrast to the above cases, when the primary-seal-side end portion and the secondary-seal-side end portion of each cold cathode tube are constructed to have some characteristics, all the cold cathode tubes may be preferably mounted in the same orientation to a chassis. In this case, it is also impossible to mount cold cathode tubes following the production line thereof, and therefore it is difficult to mount cold cathode tubes in the same orientation infallibly.

SUMMARY OF THE INVENTION

The present invention was made in view of the foregoing circumstances, and an object thereof is to facilitate discrimination of orientations of discharge tubes.

The present invention includes a lighting device that can be provided to include a plurality of discharge tubes and a chassis capable of containing the discharge tubes arranged parallel in an array. Each of the discharge tubes includes a glass tube having a primary-seal-side end portion and a secondary-seal-side end portion. The primary-seal-side end portion forms one of two end portions of the glass tube, while the secondary-seal-side end portion forms the other of the two end portions. The discharge tube further includes a pair of ferrules attached to the primary-seal-side end portion and the secondary-seal-side end portion, respectively, and an identifier arranged to enable discrimination between the primary-seal-side end portion and the secondary-seal-side end portion. According to the construction, the primary-seal-side end portion and the secondary-seal-side end portion of each discharge tube can be distinguished by the identifier, and thereby the discharge tube can be readily mounted in the correct orientation in the chassis.

BRIEF DESCRIPTION OF THE DRAWINGS

FIG. 1 is an exploded view showing the overview of a television receiver according to an embodiment 1 of the present invention;

FIG. 12-A is a plan view of a cold cathode tube according to an example 1 of the embodiment 1;

FIG. 12-B is a plan view of a chassis to which cold cathode tubes according to the example 1 of the embodiment 1 are mounted;

FIG. 13-A is a plan view of a cold cathode tube according to an example 2 of the embodiment 1;

FIG. 13-B is a plan view of a chassis to which cold cathode tubes according to the example 2 of the embodiment 1 are mounted;

FIG. 14-A is a plan view of a cold cathode tube according to an example 3 of the embodiment 1;

FIG. 14-B is a plan view of a chassis to which cold cathode tubes according to the example 3 of the embodiment 1 are mounted;

FIG. 15-A is a plan view of a cold cathode tube according to an example 4 of the embodiment 1;

FIG. 15-B is a plan view of a chassis to which cold cathode tubes according to the example 4 of the embodiment 1 are mounted;

FIG. 16-A is a plan view of a cold cathode tube according to an example 5 of the embodiment 1;

FIG. 16-B is a plan view of a chassis to which cold cathode tubes according to the example 5 of the embodiment 1 are mounted;

FIG. 17-A is a plan view of a cold cathode tube according to an example 6 of the embodiment 1;

FIG. 17-B is a plan view of a chassis to which cold cathode tubes according to the example 6 of the embodiment 1 are mounted;

FIG. 18-A is a plan view of a cold cathode tube according to an example 7 of the embodiment 1;

FIG. 18-B is a plan view of a chassis to which cold cathode tubes according to the example 7 of the embodiment 1 are mounted;

FIG. 19-A is a plan view of a cold cathode tube according to an example 8 of the embodiment 1;

FIG. 19-B is a plan view of a chassis to which cold cathode tubes according to the example 8 of the embodiment 1 are mounted;

FIG. 20-A is a plan view of a cold cathode tube according to an example 9 of the embodiment 1;

FIG. 20-B is a plan view of a chassis to which cold cathode tubes according to the example 9 of the embodiment 1 are mounted;

FIG. 21-A is a plan view of a chassis that includes a reflective sheet according to an example 1 of an embodiment 2;

FIG. 21-B is a plan view showing when cold cathode tubes are mounted to the chassis that includes the reflective sheet according to the example 1 of the embodiment 2;

FIG. 22-A is a plan view of a chassis that includes a reflective sheet according to an example 2 of the embodiment 2;

FIG. 22-B is a plan view showing when cold cathode tubes are mounted to the chassis that includes the reflective sheet according to the example 2 of the embodiment 2;

FIG. 23-A is a plan view of a chassis that includes a reflective sheet according to an example 3 of the embodiment 2;

FIG. 23-B is a plan view showing when cold cathode tubes are mounted to the chassis that includes the reflective sheet according to the example 3 of the embodiment 2;

FIG. 24-A is a plan view of a chassis that includes a reflective sheet according to an example 4 of the embodiment 2;

FIG. 24-B is a plan view showing when cold cathode tubes are mounted to the chassis that includes the reflective sheet according to the example 4 of the embodiment 2;

FIG. 25-A is a plan view of a chassis that includes a reflective sheet according to an example 5 of the embodiment 2;

FIG. 25-B is a plan view showing when cold cathode tubes are mounted to the chassis that includes the reflective sheet according to the example 5 of the embodiment 2;

FIG. 26-A is a plan view of a chassis that includes a reflective sheet according to an example 6 of the embodiment 2;

FIG. 26-B is a plan view showing when cold cathode tubes are mounted to the chassis that includes the reflective sheet according to the example 6 of the embodiment 2;

FIG. 27-A is a plan view of a chassis that includes a reflective sheet according to an example 7 of the embodiment 2;

FIG. 27-B is a plan view showing when cold cathode tubes are mounted to the chassis that includes the reflective sheet according to the example 7 of the embodiment 2;

FIG. 28-A is a plan view of a chassis that includes connectors according to an example 1 of an embodiment 3;

FIG. 28-B is a plan view showing when cold cathode tubes are mounted to the chassis that includes the connectors according to the example 1 of the embodiment 3;

FIG. 29-A is a plan view of a chassis that includes connectors according to an example 2 of the embodiment 3;

FIG. 29-B is a plan view showing when cold cathode tubes are mounted to the chassis that includes the connectors according to the example 2 of the embodiment 3;

FIG. 30-A is a plan view of a chassis that includes connectors according to an example 3 of the embodiment 3;

FIG. 30-B is a plan view showing when cold cathode tubes are mounted to the chassis that includes the connectors according to the example 3 of the embodiment 3;

FIG. 31-A is a plan view of a chassis that includes connectors according to an example 4 of the embodiment 3;

FIG. 31-B is a plan view showing when cold cathode tubes are mounted to the chassis that includes the connectors according to the example 4 of the embodiment 3;

FIG. 32-A is a plan view of a chassis that includes connectors according to an example 5 of the embodiment 3;

FIG. 32-B is a plan view showing when cold cathode tubes are mounted to the chassis that includes the connectors according to the example 5 of the embodiment 3;

FIG. 33 is a schematic view showing a lighting circuit for a cold cathode tube according to an embodiment 4;

FIG. 34 is a plan view of a chassis to which cold cathode tubes are mounted according to an example 1 of the embodiment 4;

BEST MODE FOR CARRYING OUT THE INVENTION

Embodiment 1

An embodiment 1 according to the present invention will be explained with reference to FIGS. 1 through 20-B. In the embodiment 1, cold cathode tubes 15 as discharge tubes, a backlight 10 as a lighting device, a liquid crystal display device D as a display device will be illustrated.

Figure 2:
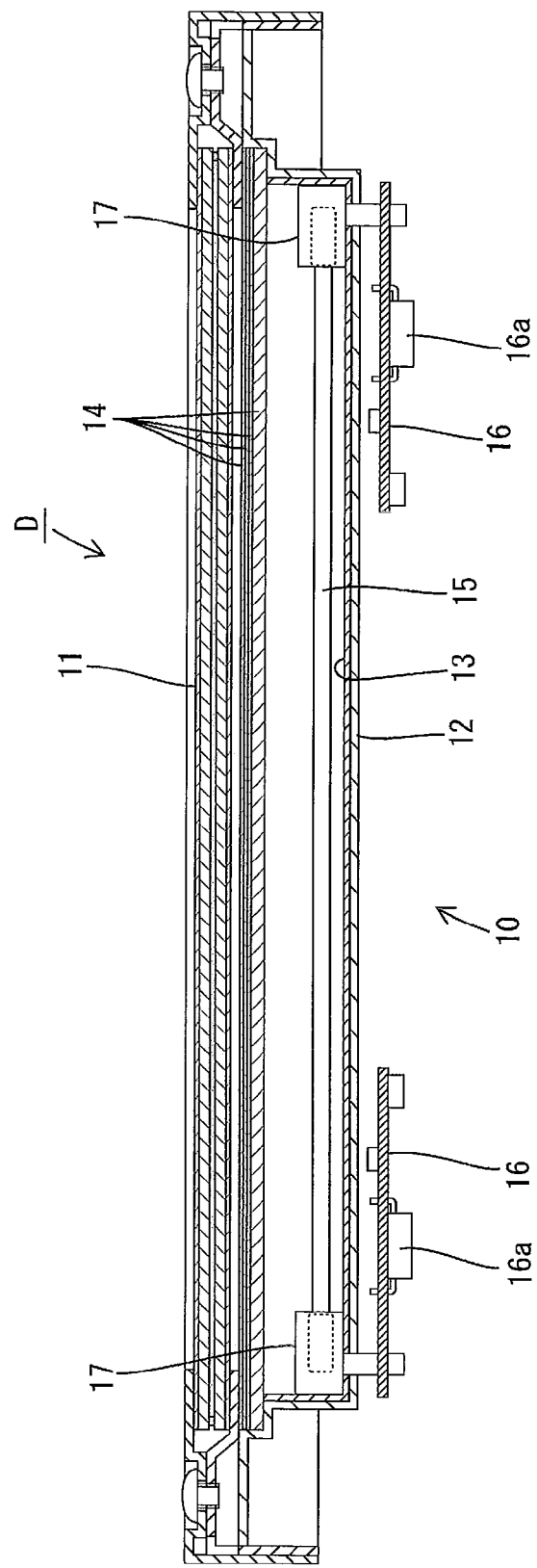
FIG. 2 is a sectional view showing the overview of a liquid crystal display device.

The liquid crystal display device D forms a horizontally-long rectangular shape as a whole, which includes a liquid crystal panel 11 as a display panel and a backlight 10 as an external light source (or a lighting device) for the liquid crystal panel 11, as shown in FIG. 2. The liquid crystal panel 11 is disposed on the front side of the backlight 10, so that the backlight 10 can illuminate the liquid crystal panel 11 from the back side. The liquid crystal display device D can be applied to a television receiver TV. As shown in FIG. 1, the television receiver TV includes the liquid crystal display device D, and front and back cabinets Ca and Cb capable of holding the liquid crystal display device D therebetween. Further included are a power source P, a tuner T and a stand S.

The liquid crystal panel 11 has a well-known construction, in which the gap between a transparent TFT substrate and a transparent CF substrate is filled with liquid crystal as a material with an optical property that changes with applied voltage. TFTs (Thin Film Transistors), as switching elements connected to source wiring lines and gate wiring lines running at right angles to each other, are provided on the TFT substrate. A color filter, on which pixels having three primary colors, i.e., Red (R), Green (G) and Blue (B), are arranged in a matrix, is provided on the CF substrate. Further, on each of the substrates, a polarizing plate is attached to its surface on the opposite side of the liquid crystal side.

Figure 3:
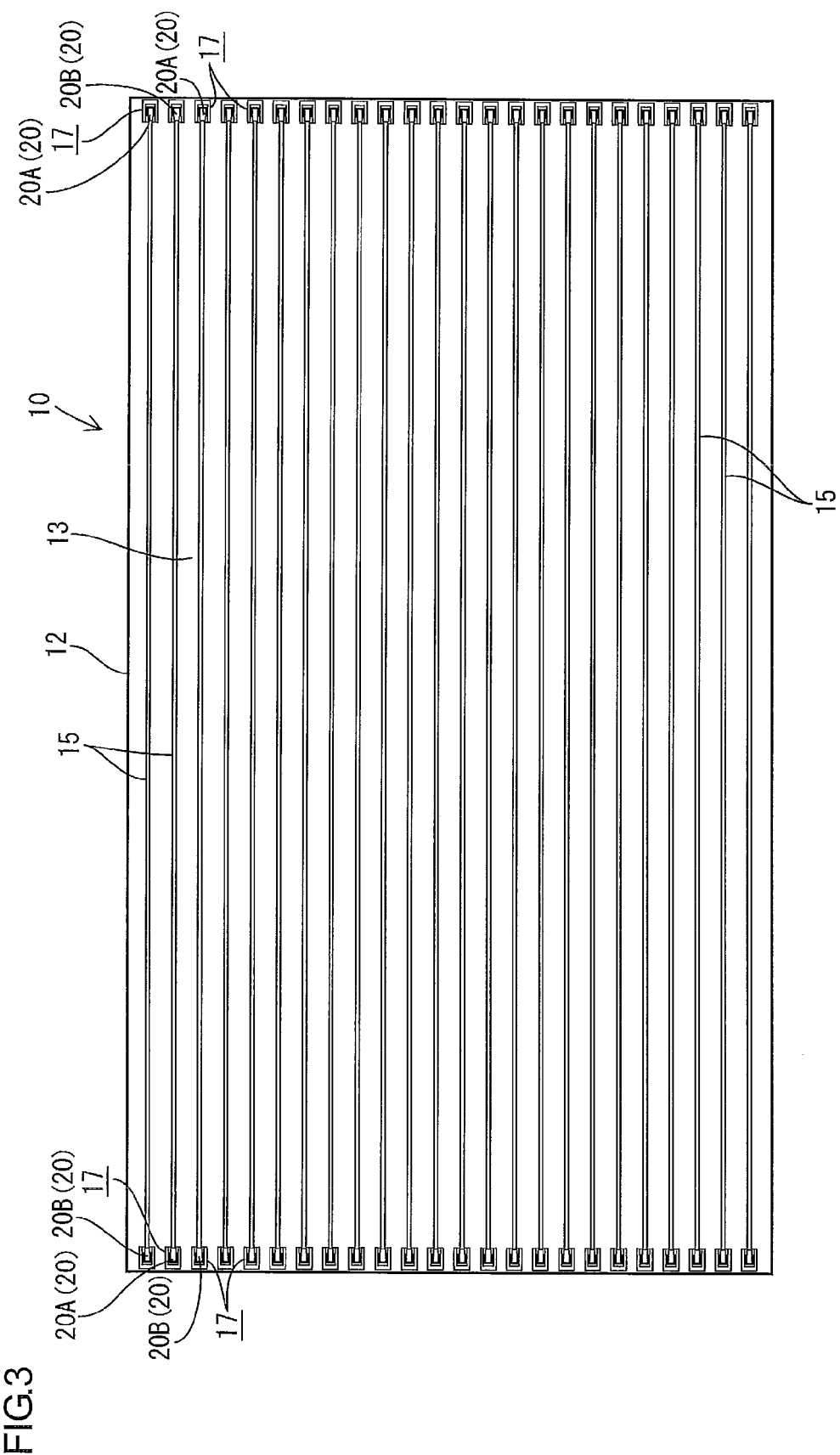
FIG. 3 is a plan view of the chassis of a backlight.

The backlight 10 is a so-called direct-light type, which includes a chassis 12 having an opening on its front side (or upper side in FIG. 2), a reflective sheet 13 with which the chassis 12 is lined, a plurality of optical members 14 arranged to cover the opening of the chassis 12, and a plurality of cold cathode tubes 15 contained in the chassis 12, as shown in FIGS. 2 and 3. Further included are power circuit boards 16 mounted to the back side of the chassis 12 and a plurality of connectors 17 provided for connecting the cold cathode tubes 15 to the power circuits of the power circuit boards 16.

The chassis 12 is made of metal, and forms a substantially box-like shape with open front that has a rectangular shape when viewed planarly. A stepped portion is formed on its opening edge so as to be capable of supporting the optical members 14. Alternatively, the stepped portion may be eliminated, and receiving members (not shown) separately provided for supporting the optical members 14 may be mounted to the chassis 12. The reflective sheet 13 is made of synthetic resin, and its surface is colored white or the like so as to have superior reflexibility. It is laid in the chassis 12 so as to cover almost the entire area of the inner surface. The reflective sheet 13 can guide the lights from the cold cathode tubes 15 to the opening side of the chassis 12. The optical members 14 are made of translucent synthetic resin so as to be capable of light transmission, and are arranged between the liquid crystal panel 11 and the cold cathode tubes 15. The optical members 14 include a diffuser plate, a diffusing sheet, a lens sheet and a brightness enhancement sheet, in this order from the back side, for example, and are arranged in a stack. The optical members 14 have functions such as a function for converting lights from the cold cathode tubes 15 as linear light sources into flat lights.

Figure 11:
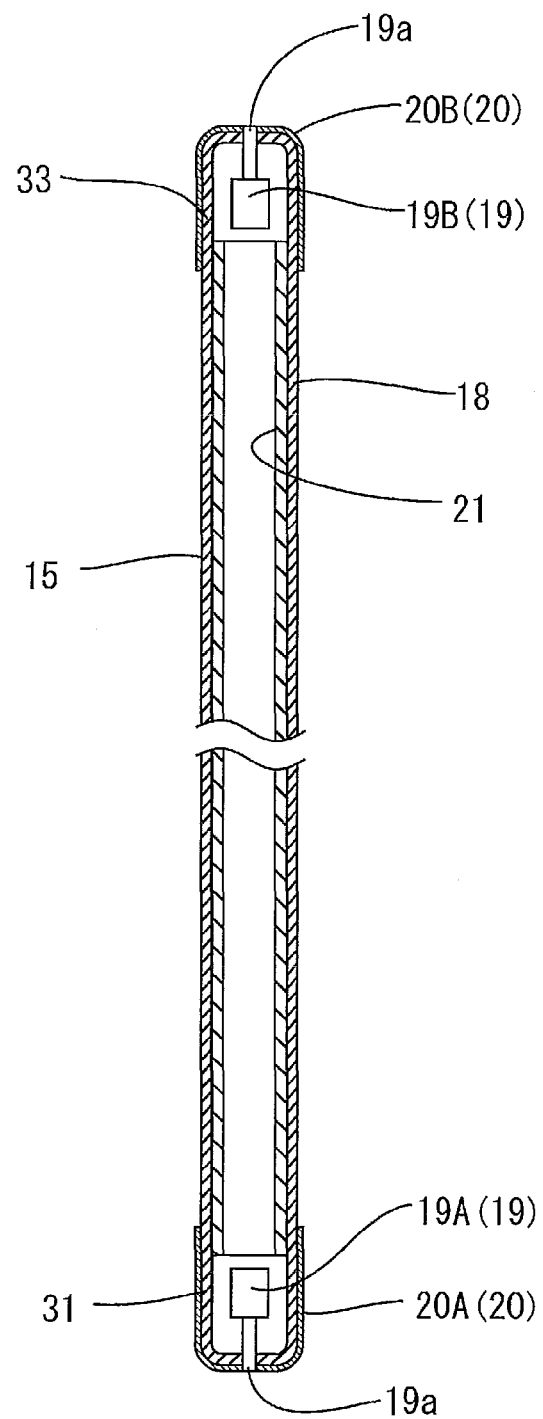
FIG. 11 is a sectional view showing when ferrules are mounted during the manufacturing process of a cold cathode tube.

The cold cathode tubes 15 are mounted in the chassis 12 so that the axial direction thereof conforms with the longitudinal direction of the chassis 12. The plurality of cold cathode tubes 15 are arranged at predetermined intervals so that the axes thereof are parallel to one another. Referring to FIG. 11, each cold cathode tube 15 includes an elongated glass tube 18 having a circular section and sealed end portions, electrodes 19 enclosed in the respective end portions of the glass tube 18, and ferrules 20 attached (or fitted) onto the glass tube 18 so as to cover the respective end portions thereof. The glass tube 18 includes mercury, or the like, encapsulated therein, and phosphor 21 is applied to the inner wall surface thereof. The electrodes 19 and the ferrules 20 are both made of metallic materials having conductivity. The end portions covered with the ferrules 20 form nonluminous parts of the cold cathode tube 15, while the remaining portion or the central portion (i.e., the portion to which the phosphor 21 is applied) forms a luminous part. A lead terminal 19a projects from each electrode 19 so as to be exposed to the outside of the glass tube 18. The lead terminal 19a can be connected to the ferrule 20 so that the electrode 19 and the ferrule 20 are at the same electric potential. The power circuit board 16 includes various electronic components 16a mounted thereon, and further includes a power circuit capable of supplying power to the cold cathode tubes 15.

Figure 4:
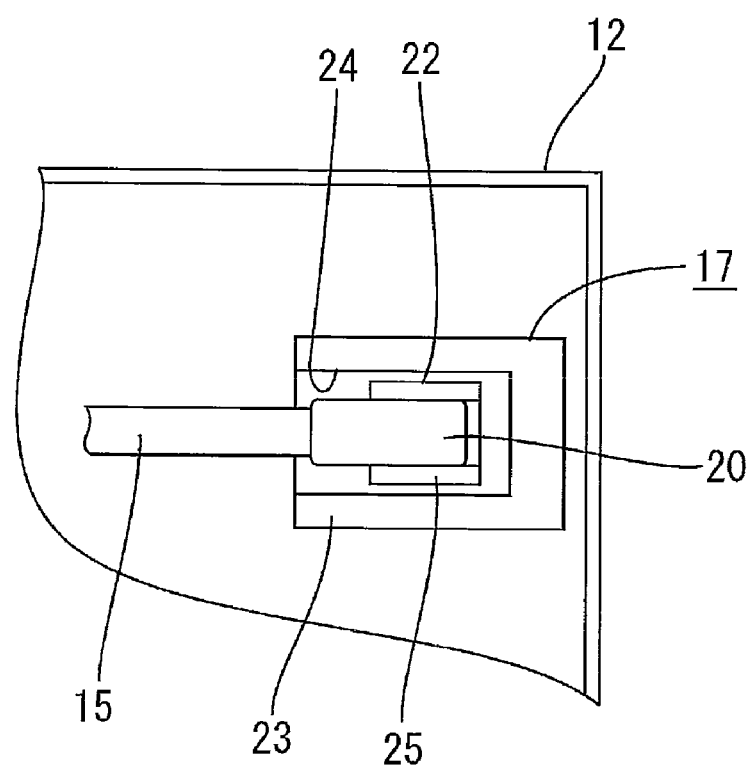
FIG. 4 is an enlarged plan view of connection between a ferrule and a connector.
Figure 5:
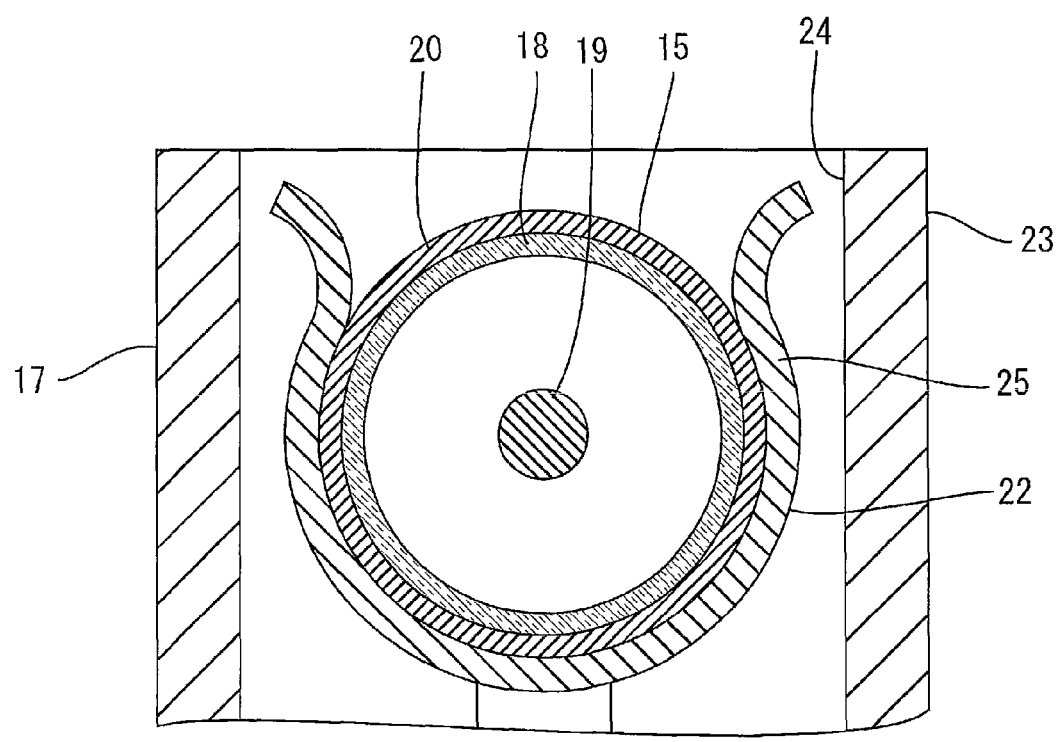
FIG. 5 is a sectional view of connection between a ferrule and a connector.

Referring to FIGS. 2 and 3, the connectors 17 are provided at the longitudinal-directional end positions on the chassis 12. A pair of connectors is provided for each cold cathode tube 15, so as to correspond to the respective ferrules 20 thereof. The connectors 17 are connected, via through holes formed through the chassis 12, to the power circuit boards 16 provided on the back side. Each connector 17 includes a connecting terminal 22 made of metal and capable of electric relay between the ferrule 20 of the cold cathode tube 15 and the power circuit of the power circuit board 16, and further includes a holding member 23 (or a housing) made of synthetic resin and provided for holding the connecting terminal 22. As shown in FIGS. 4 and 5, the holding member 23 forms a substantially block-like shape as a whole, and has an opening section 24 as a front opening. The opening section 24 can contain the end portion of the cold cathode tube 15 that has been fitted therein from the front side. The ferrule 20 of the cold cathode tube 15 when contained in the opening section 24 is exposed to the front side through the opening section 24. The connecting terminal 22 includes an elastic contact part 25 capable of elastic contact with the ferrule 20, which is arranged in the opening section 24 of the holding member 23. The elastic contact part 25 is formed into a two-forked shape with open front (i.e., substantially C-shaped), so as to be capable of opening and closing with elastic deformation. The portion of the connecting terminal 22 that projects to the back side of the chassis 12 is connected, by soldering or the like, to the power circuit board 16, or specifically, to an electrically-conducting path (not shown) of the power circuit.

Figure 6:
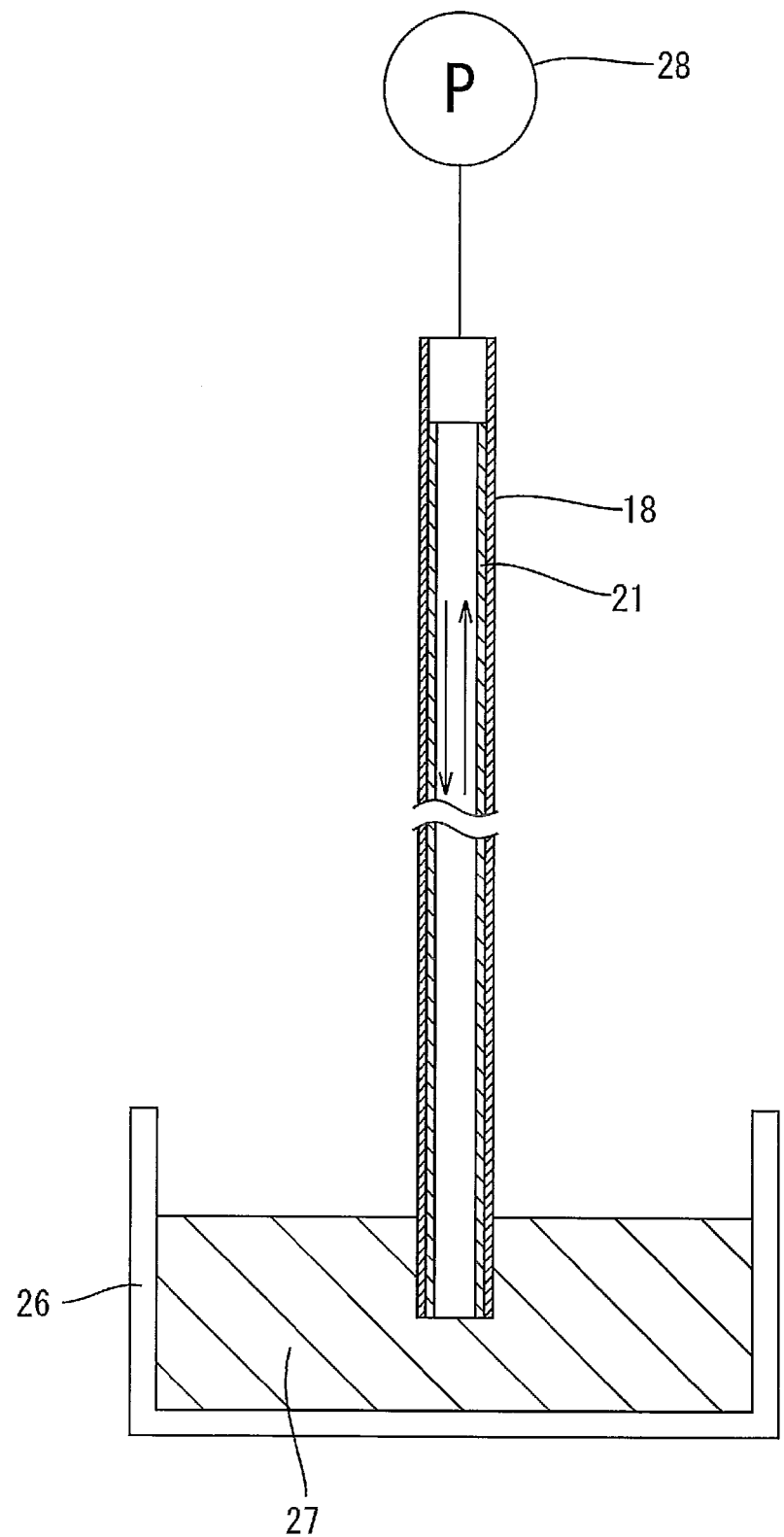
FIG. 6 is a sectional view showing a process of applying phosphor solution to the inside of a glass tube during a manufacturing process of a cold cathode tube.

Next, a method for manufacturing cold cathode tubes 15 and a procedure for assembling a backlight 10 will be explained step by step. First, a lamp maker manufactures cold cathode tubes 15 via the following processes. As shown in FIG. 6, a hollow cylindrically-shaped glass tube 18 having openings at both end portions is held in the upright position (so that its axis substantially conforms with the vertical direction), and the lower end portion thereof vertically positioned on the lower side in the figure is dipped in a phosphor solution 27 (obtained by dissolving phosphor 21 in a solvent and) stored in a bath 26. The phosphor solution 27 is drawn into the glass tube 18 by vacuuming or by a vacuum pump 28 attached to the other vertical-directional end portion or the upper end portion. When the phosphor solution 27 having been drawn into the glass tube 18 has reached a predetermined height, the vacuum is released so that the phosphor solution 27 having been drawn into the glass tube 18 runs down. Thus, the phosphor 21 can be applied to the inner wall surface of the glass tube 18. Thereafter, the phosphor 21 is fixed to the inner wall surface of the glass by drying. The excess phosphor 21 is removed from the lower end side of the glass tube 18.

Hereinafter, when the two electrodes 19 or the two ferrules 20 should be distinguishably designated, the suffix A is attached to the symbol of a primary-seal-side component while the suffix B is attached to the symbol of a secondary-seal-side component. The suffix is omitted when discrimination between the primary seal side and the secondary seal side is not necessary.

Figure 7:
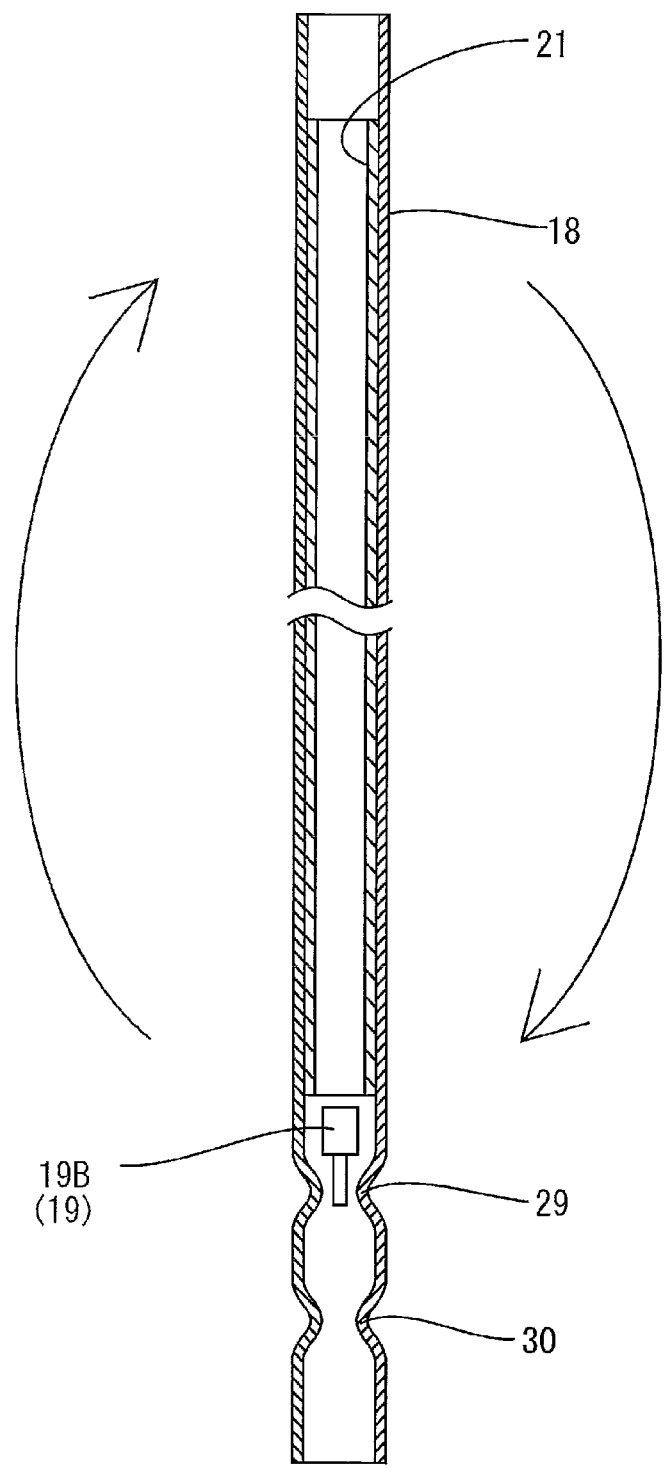
FIG. 7 is a sectional view showing an electrode temporarily locked during the manufacturing process of a cold cathode tube.

Next, referring to FIG. 7, an electrode 19B is put into the lower end portion of the glass tube 18 or into the end portion vertically positioned on the lower side in the figure, and a first narrow portion 29 is formed on the glass tube 18 by thermal processing in order to temporarily lock the electrode 19B. Further, a second narrow portion 30 of the glass tube 18 is formed below the electrode 19B by thermal processing. Thereafter, the glass tube 18 is inverted as shown by arrowed lines, so that the end portion including the electrode 19B is vertically positioned on the upper side. Next, referring to FIG. 8, an electrode 19A is put into the lower end portion of the glass tube 18, or into the end portion vertically positioned on the lower side in the figure, and the lower end portion is sealed by thermal processing. The lower end portion of the glass tube 18 shown in FIG. 8, which is thus sealed ahead of the upper end portion, is referred to as a primary-seal-side end portion 31.

Figure 8:
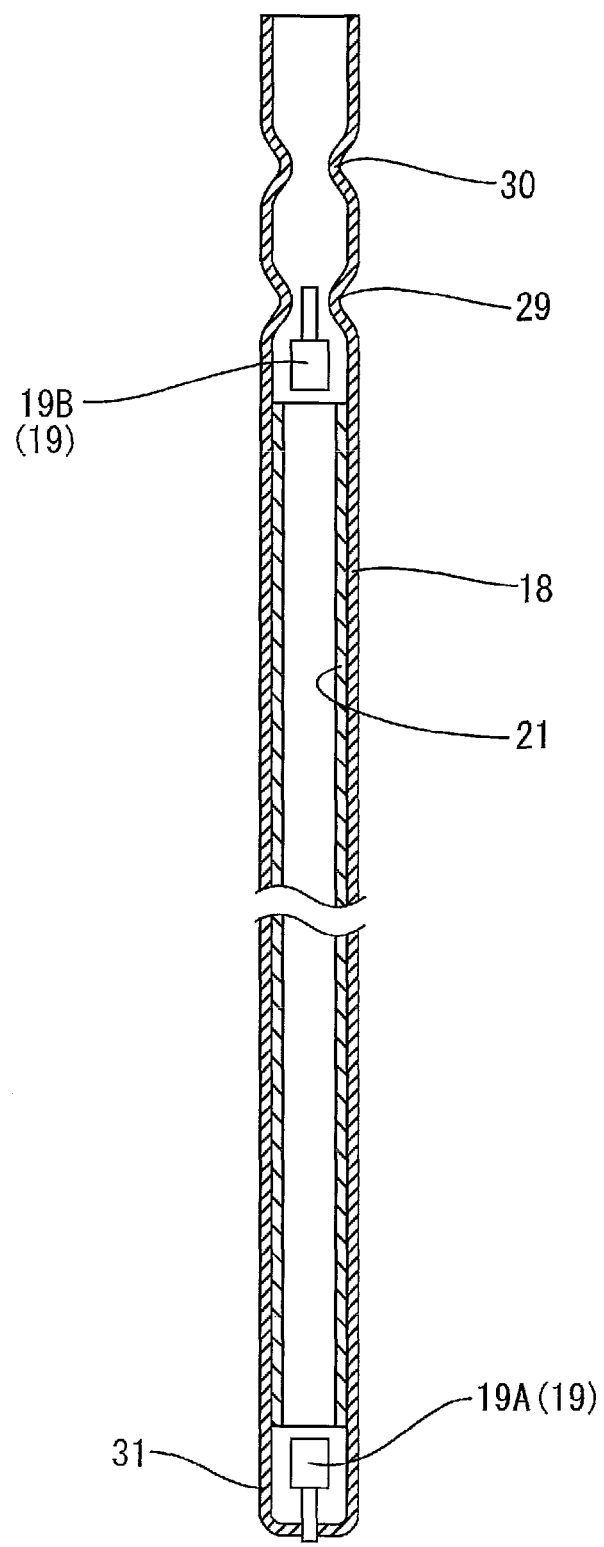
FIG. 8 is a sectional view showing when primary sealing is completed during the manufacturing process of a cold cathode tube.
Figure 9:
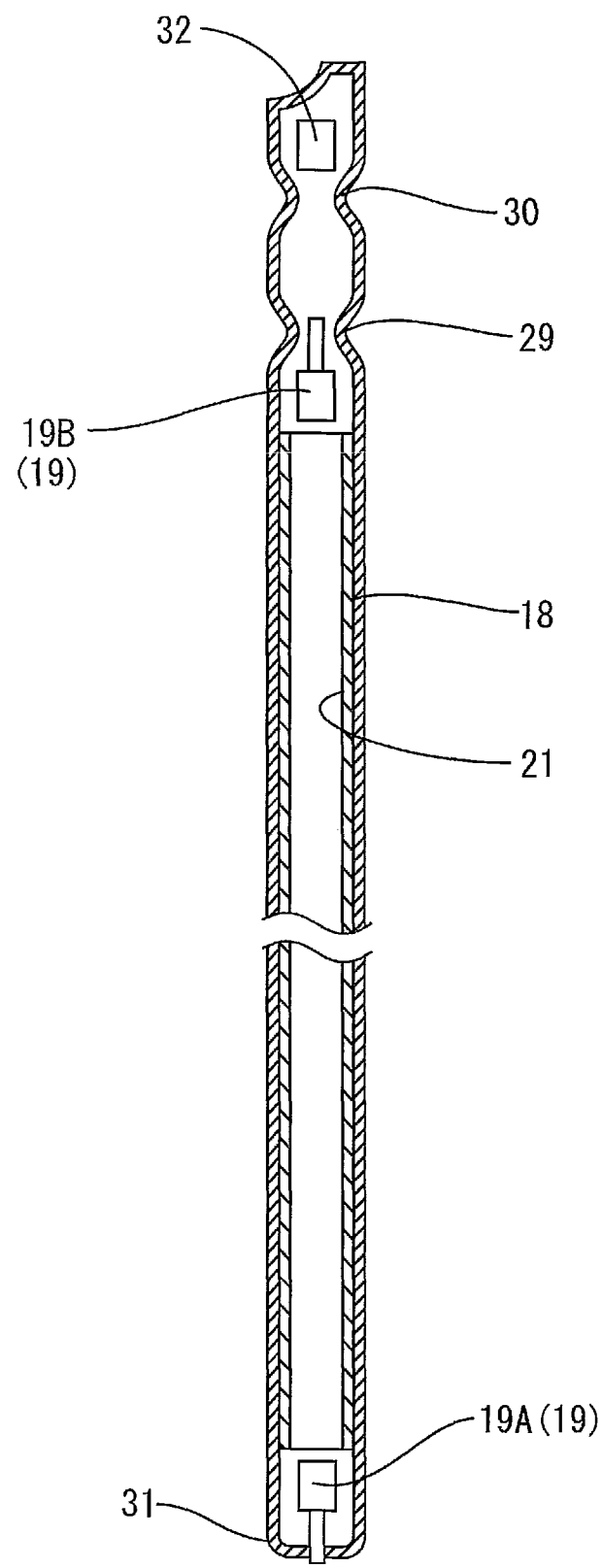
FIG. 9 is a sectional view showing when a getter material is set during the manufacturing process of a cold cathode tube.
Figure 10:
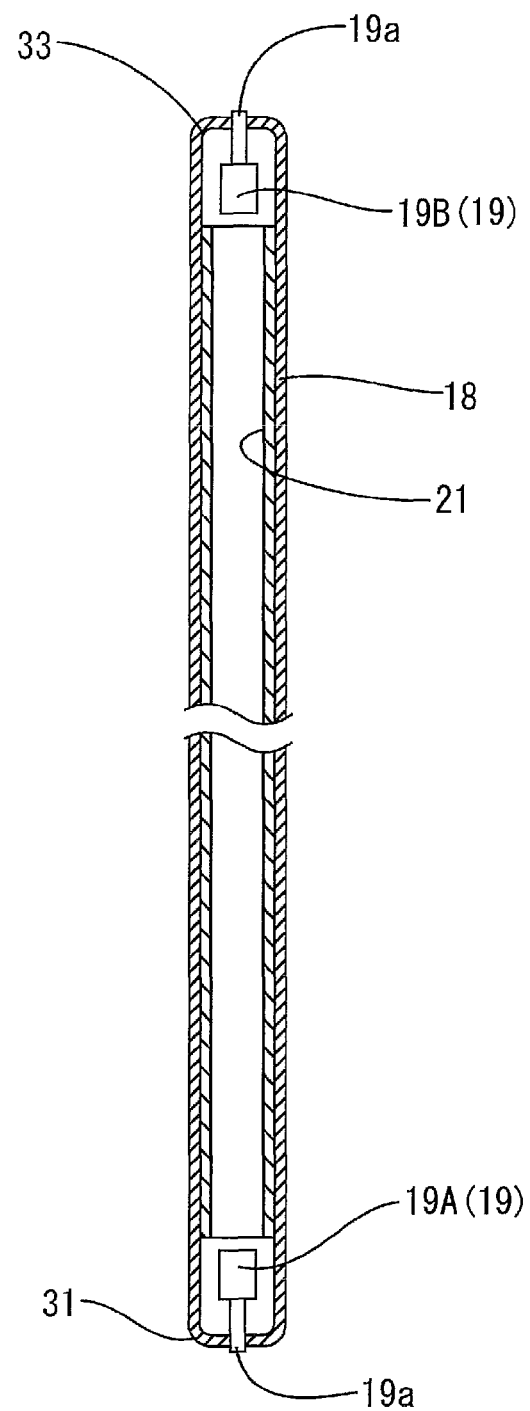
FIG. 10 is a sectional view showing when secondary sealing is completed during the manufacturing process of a cold cathode tube.

A getter material 32 including mercury is set in the upper end portion of the glass tube 18, or in the end portion vertically positioned on the upper side in FIG. 8, through the opening thereof. The getter material 32 can be supported on the second narrow portion 30 so as to be positioned above the electrode 19B, as shown in FIG. 9. The entire glass tube 18 is heated while the air is let out of the glass tube 18, so that the impurity gas can be eliminated. Subsequently, the opening of the glass tube 18, positioned on the upper end in the figure, is sealed by thermal processing. Next, the getter material 32 is heated by high-frequency induction, so that the mercury included in the getter material 32 is extracted. The extracted mercury is forced to reach below the electrode 19B. Then, referring to FIG. 10, the glass tube 18 is sealed at the first narrow portion 29 by thermal processing (so that the lead terminal 19*a* is exposed to the outside), and the getter material 32 and the like are removed. The upper end portion of the glass tube 18 shown in FIG. 10 is referred to as a secondary-seal-side end portion 33. Subsequently, as shown in FIG. 11, ferrules 20A, 20B are fitted onto the primary-seal-side end portion 31 and the secondary-seal-side end portion 33 of the glass tube 18, respectively, and are fixed to have contact with respective lead terminals 19*a*. Thus, cold cathode tubes 15 can be manufactured. The glass tubes 18 are automatically arranged in the same orientation on the production line.

A maker of backlights or a maker of liquid crystal display devices manufactures a backlight 10 via the following processes. As shown in FIGS. 2 and 3, a reflective sheet 13 is laid in a chassis 12. Thereafter, connectors 17 are mounted on the front side of the chassis 12, while power circuit boards 16 are mounted on the back side. The connectors 17 are connected to the power circuit boards 16. Then, cold cathode tubes 15, which have been transferred from the lamp maker, are mounted in the chassis 12. In the course of mounting, in response to entrance of the ferrule 20 of each end portion of a cold cathode tube 15 into the opening section 24 of the connector 17, the elastic contact part 25 deforms elastically and temporarily so as to widen its opening during passage of the ferrule 20 through the opening of the elastic contact part 25. The elastic contact part 25 thereafter closes or is restored when the ferrule 20 has reached a proper depth. Consequently, the ferrule 20 is held by the elastic contact part 25 having elastic contact therewith (See FIG. 5). Then, the power from the power circuit of the power circuit board 16 can be supplied to the cold cathode tubes 15. Thereafter, optical members 14 are sequentially mounted on the opening edge of the chassis 12 so as to form a stack. Thus, the backlight 10 can be manufactured.

Note that the phosphor 21 applied to the cold cathode tubes 15 includes a number of different kinds of phosphor particles corresponding to luminescent colors such as R, G and B, and each kind of phosphor particles has a different particle diameter or a different specific gravity. In this context, the application of the phosphor 21 during the above manufacturing process of cold cathode tubes 15 is achieved using gravity as described above. Therefore, the various kinds of applied phosphor particles may be prone to nonuniform distribution, and consequently each cold cathode tube 15 may be subject to color unevenness following a specific pattern of variation along its axial direction. The same pattern of color variation can be found on all the manufactured cold cathode tubes 15, because the color unevenness is due to the manufacturing process. In view of this, the cold cathode tubes 15 are alternately mounted in the chassis 12 as shown in FIG. 3, so that adjacent cold cathode tubes 15 lie in the opposite orientation to each other. In this arrangement, the primary-seal-side end portion 31 of a cold cathode tube 15 is located adjacent to the secondary-seal-side end portion 33 of the adjacent cold cathode tube 15. Thereby, the color unevenness of the entire backlight 10 may be canceled out when the cold cathode tubes 15 are lighted. Note that connectors 17 to be connected to ferrules 20A of primary-seal-side end portions 31 and connectors 17 to be connected to ferrules 20B of secondary-seal-side end portions 33 should be alternately arranged along the short-side direction of the chassis 12 (i.e., a direction perpendicular to the axial direction of the cold cathode tubes 15) in order to achieve the above alternate arrangement of the mounted cold cathode tubes 15.

In contrast to a conventional type of cold cathode tubes 15 to which soldering is performed in a lamp maker, in the case that cold cathode tubes 15 having ferrules 20 are used as in the present embodiment, it is impossible to mount cold cathode tubes 15 following the production line thereof. Therefore, it is difficult to mount cold cathode tubes 15 to the chassis 12 so as to achieve the alternate arrangement infallibly. The secondary-seal-side end portion 33 of a glass tube 18 is sealed after the temporal lock processing for the glass tube 18 during the manufacturing process, and therefore slightly differs from the primary-seal-side end portion 31 in outer shape. However, in the case of this type of cold cathode tubes 15, ferrules 20 are fitted onto both end portions thereof, and therefore it is impossible to distinguish between the primary-seal-side end portion 31 and the secondary-seal-side end portion 33 by appearance.

For this reason, in the present embodiment, identifiers are provided on the ferrules 20 in order to enable discrimination of orientations of cold cathode tubes 15 at the time of mounting of the cold cathode tubes 15 to the chassis 12. The ferrules 20 thus having identifiers are to be mounted to glass tubes 18 during the manufacturing process of cold cathode tubes 15 as described above, and therefore can be infallibly mounted to the correct end portions of glass tubes 18 by taking advantage of the glass tubes 18 automatically arranged in the same orientation on the production line of the cold cathode tubes 15. The identifiers are provided so that the primary-seal-side end portion 31 and the secondary-seal-side end portion 33 of a glass tube 18 can be distinguished visually or by image processing using an imaging device. The followings may be cited as operative examples. Hereinafter, when ferrules 20 shown in an example should be distinguished from those of the other examples, the example number is attached as a suffix to the symbol of the ferrule. The suffix is omitted when discrimination among examples is not necessary.

Example 1

In the example 1, referring to FIG. 12-A, a ferrule 20A-1 to be attached to a primary-seal-side end portion 31 and a ferrule 20B-1 to be attached to a secondary-seal-side end portion 33 are provided so that the entire surfaces (or outer surfaces) thereof differ in color from each other. Specifically, the ferrules 20A-1, 20B-1 of different colors can be achieved by using different materials, respectively, such as gold and silver, or copper and aluminum. Alternatively, one of the ferrule 20A-1 for primary-seal-side end portion 31 and the ferrule 20B-1 for secondary-seal-side end portion 33 may be coated with metal such as tin so as to have a different color from the other. Further, the surfaces of both ferrules 20A-1 and 20B-1 may be coated with metals of different colors (such as gold and silver or copper and tin). If the surfaces of ferrules 20A-1 and 20B-1 are thus finished or coated with metals having conductivity, their connection to connecting terminals 22 through contact may be provided with improved conductivity. In the case that the coating is thus applied, both ferrules 20A-1 and 20B-1 may be formed of the same material. However, different materials may be used even in this case.

The cold cathode tubes 15 thus constructed can be mounted in the chassis 12 as follows, for example. After mounting of the first cold cathode tube 15, the predetermined mounting orientation of a cold cathode tube 15 to be mounted next can be known visually from the ferrules 20A-1 and 20B-1 of the already-mounted cold cathode tube 15. The cold cathode tube 15 is mounted so that its actual orientation conforms with the predetermined mounting orientation. In this way, the ferrules 20A-1 and 20B-1 of different colors are alternately arranged along the short-side direction of the chassis 12. Consequently, adjacent cold cathode tubes 15 can be infallibly arranged in the opposite orientation to each other, as shown in FIG. 12-B. After the mounting, the ferrules 20A-1 and 20B-1 are exposed to the front side through the opening sections 24 of the connectors 17. Thereby, the orientations of the cold cathode tubes 15 can be readily inspected and verified after the mounting, by checking the ferrules 20A-1 and 20B-1 with the eye of an inspector from the front side or by processing images taken by an imaging device such as a camera of an inspection apparatus.

Example 2

In the example 2, referring to FIG. 13-A, a mark 34 is solely provided on one of two ferrules 20A-2 and 20B-2, i.e., on a ferrule 20A-2 to be attached to a primary-seal-side end portion 31. The mark 34 is formed by application of a colored coating material such as paint to the outer circumferential surface of the ferrule 20A-2 for primary-seal-side end portion 31. The mark 34 forms a round shape, and differs in color from the ferrule 20A-2. The color of the mark 34 can be set to the complementary color of the color of the ferrule 20A-2, for example, so that the contrast may be increased resulting in improved visibility of the mark 34. At the time of mounting to the chassis 12, a ferrule 20A-2 having a mark 34 and a ferrule 20B-2 not having a mark 34 are alternately arranged along the short-side direction of the chassis 12, as shown in FIG. 13-B. Consequently, adjacent cold cathode tubes 15 can be infallibly arranged in the opposite orientation to each other. The redundant explanations for the other constructions and operational effects similar to those of the above example 1 will be omitted.

Contrary to the present example, a mark 34 may be solely provided on a ferrule 20B-2 for secondary-seal-side end portion 33, as a matter of course. The shape and/or color of the mark 34, the size thereof relative to the ferrule 20, and the like, are not limited to those shown in the figure, but rather may be suitably changed. The application of the mark 34 can be achieved manually or by printing using a printing apparatus.

Example 3

In the example 3, a mark 35 is provided to have a shape modified from the above example 2. Referring to FIGS. 14-A and 14-B, the mark 35 has a closed-looped annular shape, which is provided on a ferrule 20A-3 for primary-seal-side end portion 31 so as to extend over its entire circumference. Specifically, the mark 35 is formed by application of a colored coating material such as paint to the outer circumferential surface of the ferrule 20A-3. Both side edges thereof extend straight along a direction perpendicular to the axial direction of the cold cathode tube 15, and the width thereof is set to be constant over the entire area. According to the construction, the mark 35 is consistently visible regardless of at what angle the cold cathode tube 15 is located around its axis. Thus, the visibility can be extremely improved. The mark 35 is formed in a different color from that of the ferrule 20, so that the contrast may be increased, as in the above example 2. The mounting to the chassis 12 can be achieved in a similar manner to the above example 2. The redundant explanations for the other constructions and operational effects similar to those of the above examples will be omitted.

Contrary to the present example, a mark 35 may be solely provided on a ferrule 20B-3 for secondary-seal-side end portion 33, as a matter of course. Further, the mark 35 may be formed into another shape, e.g., an open annular shape not extending over the entire circumference of the ferrule 20A-3, such as a C-shape. Alternatively, it may be formed into a helical shape that is an open annular shape extending over the entire circumference of the ferrule 20A-3.

Example 4

In the example 4, referring to FIG. 15-A, marks 36, 37 are provided on two respective ferrules 20A-4, 20B-4. Specifically, the mark 36 provided on the ferrule 20A-4 for primary-seal-side end portion 31 and the mark 37 provided on the ferrule 20B-4 for secondary-seal-side end portion 33 have the same shape (e.g., a round shape), but differ in color from each other. The color of each mark 36, 37 also differs from that of the corresponding ferrule 20A-4, 20B-4. For example, the colors of the marks 36, 37 may be set to be complementary to each other, so that the contrast is increased resulting in further facilitation of discrimination. Each mark 36, 37 can be formed by application of a colored coating material such as paint to the outer circumferential surface of the ferrule 20A-4, 20B-4. When cold cathode tubes 15 thus constructed are mounted to a chassis 12, ferrules 20A-4, 20B-4 having marks 36, 37 of different colors are alternately arranged along the short-side direction of the chassis 12, as shown in FIG. 15-B. Consequently, adjacent cold cathode tubes 15 can be infallibly arranged in the opposite orientation to each other. The redundant explanations for the other constructions and operational effects similar to those of the above examples will be omitted.

Example 5

In the example 5, two marks 38, 39 having different shapes are provided, contrary to the above example 4. Specifically, referring to FIGS. 16-A and 16-B, the mark 38 provided on a ferrule 20A-5 for primary-seal-side end portion 31 has a round shape, while the mark 39 provided on a ferrule 20B-5 for secondary-seal-side end portion 33 has a triangular shape. Each mark 38, 39 can be formed by application of a colored coating material such as paint to the outer circumferential surface of the ferrule 20A-5, 20B-5, as in the above example 4. The present example 5 may further introduce the above example 4, so that the marks 38, 39 also differ in color from each other. The shapes of the marks 38, 39 are not limited to the round shape and the triangular shape, but rather may be suitably changed. Alternatively, the marks 38, 39 may have the same shape (e.g., both a round shape), but differ in size from each other. Further, they may differ in both shape and size from each other. The redundant explanations for the other constructions and operational effects similar to those of the above examples will be omitted.

Example 6

In the example 6, referring to FIGS. 17-A and 17-B, marks 40, 41 provided on two respective ferrules 20A-6, 20B-6 each includes a different number of dots. Specifically, the mark 40 provided on a ferrule 20A-6 for primary-seal-side end portion 31 includes one dot, while the mark 41 provided on a ferrule 20B-6 for secondary-seal-side end portion 33 includes two dots. The dots of marks 40, 41 have the same shape (e.g., a round shape), and may be formed by application of a colored coating material such as paint of the same color. The present example 6 may further introduce the above examples 4 and 5, so that the dots of the marks 40, 41 differ in color and/or shape from each other. The shapes of dots of the marks 40, 41 are not limited to the round shape, but rather may be suitably changed. Further, the sizes thereof, or the like, may be changed. The redundant explanations for the other constructions and operational effects similar to those of the above examples will be omitted.

Example 7

In the example 7, marks 42, 43 having annular shapes as shown in the above example 2 are provided on two respective ferrules 20A-7, 20B-7. Specifically, the mark 42 provided on a ferrule 20A-7 for primary-seal-side end portion 31 and the mark 43 provided on a ferrule 20B-7 for secondary-seal-side end portion 33 have the same shape, but differ in color from each other, as shown in FIGS. 18-A and 18-B. The colors of the marks 42, 43 may be set to be complementary to each other, for example, so that the contrast is increased resulting in further facilitation of discrimination. Each mark 42, 43 can be formed by application of a colored coating material such as paint to the outer circumferential surface of the ferrule 20A-7, 20B-7. The color of each mark 42, 43 differs from that of the corresponding ferrule 20A-7, 20B-7. The shape and/or size of each mark 42, 43 may be suitably changed. The redundant explanations for the other constructions and operational effects similar to those of the above examples will be omitted.

Example 8

In the example 8, referring to FIGS. 19-A and 19-B, annular marks 44, 45 are provided on two respective ferrules 20A-8, 20B-8, so as to differ in shape from each other. Specifically, the mark 45 provided on a ferrule 20B-8 for secondary-seal-side end portion 33 is larger in width than the mark 44 provided on a ferrule 20A-8 for primary-seal-side end portion 31, and its side edges are saw-toothed. Thus, the two differ in shape and size from each other. The marks 44, 45 can be formed by application of a colored coating material such as paint to the ferrules 20A-8, 20B-8. The present example 8 may further introduce the above example 7, so that the marks 44, 45 differ also in color from each other. The shapes and/or sizes of the marks 44, 45 may be suitably changed, so that the two differ solely in shape, or alternatively, differ solely in size. The redundant explanations for the other constructions and operational effects similar to those of the above examples will be omitted.

Example 9

In the example 9, referring to FIGS. 20-A and 20-B, annular marks 46, 47 are provided on two respective ferrules 20A-9, 20B-9, so as to differ in the number of rings included therein from each other. Specifically, the mark 46 provided on a ferrule 20A-9 for primary-seal-side end portion 31 includes one ring, while the mark 47 provided on a ferrule 20B-9 for secondary-seal-side end portion 33 includes two rings. The rings of the marks 46, 47 are the same in shape, and may be formed by application of a colored coating material such as paint of the same color. The present example 9 may further introduce the above examples 7 and 8, so that the rings differ also in color and/or shape. The shapes and sizes of rings of the marks 46, 47 may be suitably changed. The redundant explanations for the other constructions and operational effects similar to those of the above examples will be omitted.

As explained above, according to the present embodiment, as for a cold cathode tube 15 having ferrules 20 fitted onto the primary-seal-side end portion 31 and the secondary-seal-side end portion 33 of its glass tube 18, an identifier is provided to enable discrimination between the primary-seal-side end portion 31 and the secondary-seal-side end portion 33. Thereby, the orientation of the cold cathode tube 15 can be easily known at the time of mounting to the chassis 12 of a backlight 10. Consequently, the cold cathode tubes 15 can be alternately mounted in the chassis 12 so that adjacent cold cathode tubes are infallibly arranged in the opposite orientation. Thus, the backlight 10 with reduced color unevenness can be provided. The identifier is provided on the ferrule 20 that is a nonluminous part of the cold cathode tube 15. Therefore, the identifier will not interfere with light emitted within the glass tube 18.

In the case of an identifier provided as the color of one ferrule 20 differing from the color of the other ferrule 20, the primary-seal-side end portion 31 and the secondary-seal-side end portion 33 can be readily distinguished, for example, with the eye. The two ferrules 20 of different colors can be achieved by different materials, which does not require extra processing for ferrules 20 and is low in cost. Alternatively, the two ferrules 20 of different colors can be achieved by coating one of the ferrules 20 or by coating both ferrules 20 with different materials, which enables shared ferrules 20 made of the same material resulting in low cost.

In the case of an identifier provided as a mark 34-47 formed on at least one of two ferrules 20, the orientation of the cold cathode tube 15 can be readily known by visually checking the mark 34-47. Further, the mark 35, 42-47 may be formed to extend over the entire circumference of the ferrule 20, which enables confirmation of the mark 35, 42-47 from any angle, for example, with the eye. Thus, the discrimination can be further facilitated.

In the case of a mark 34, 35 provided solely on one of two ferrules 20, the objectives can be achieved at low cost, compared to providing those on both sides, for example. On the other hand, in the case of marks 36-47 provided on both ferrules 20, the discrimination can be further facilitated, compared to providing that on one side, for example.

The opening section 24 is provided on each connector 17 so that the identifier on the cold cathode tube 15 can be exposed therethrough to the outside. According to the construction, the identifier can be confirmed through the opening section 24, for example, with the eye, even when the cold cathode tube 15 is contained in the chassis 12 so as to be connected to the connectors 17. Thus, the orientation of the cold cathode tube 15 can be confirmed after the mounting.

Embodiment 2

An embodiment 2 of the present invention will be explained with reference to FIGS. 21-A to 27-B. In the present embodiment 2, chassis-side identifiers are further provided on the side of the chassis 12 of a backlight 10 that contains cold cathode tubes 15 as in the embodiment 1, or specifically, provided on the reflective sheet 13. In the present embodiment 2, the redundant explanations for the constructions and operational effects similar to those of the above embodiment 1 will be omitted. Hereinafter, when two connectors 17 should be distinguishably designated, the suffix A is attached to the symbol of a connector corresponding to a primary-seal-side end portion 31 while the suffix B is attached to the symbol of a connector corresponding to a secondary-seal-side end portion 33. The suffix is omitted when discrimination between the primary seal side and the secondary seal side is not necessary.

On the reflective sheet 13 of the present embodiment 2, a mark is provided as a chassis-side identifier, which corresponds to the identifier that is provided for discrimination between the primary-seal-side end portion 31 and the secondary-seal-side end portion 33 of each cold cathode tube 15 in the above embodiment 1. The mark is provided so that a connector 17A corresponding to the primary-seal-side end portion 31 of each cold cathode tube 15 can be visually distinguished from a connector 17B corresponding to the secondary-seal-side end portion 33. The followings may be cited as operative examples. Hereinafter, when the reflective sheet shown in an example should be distinguished from that of the other examples, the example number is attached as a suffix to the symbol of the reflective sheet. The suffix is omitted when discrimination among examples is not necessary.

Example 1

In the example 1, referring to FIG. 21-A, a plurality of marks 48 as holes are formed on the reflective sheet 13-1 so as to correspond to the connectors 17A to be connected to the primary-seal-side end portions 31 of cold cathode tubes 15. The connectors 17A to be connected to the primary-seal-side end portions 31 and the connectors 17B to be connected to the secondary-seal-side end portions 33 are alternately arranged along the short-side direction of the chassis 12 (i.e., a direction perpendicular to the axial direction of the cold cathode tubes 15), as in the embodiment 1. In the construction, the marks 48 are provided on the long-side-directional end portions of the reflective sheet 13-1 so as to form a zigzag arrangement. The distance between marks 48 adjacently arranged along the short side is about double the distance between the cold cathode tubes 15 or between the connectors 17A, 17B.

Each mark 48 is provided as a round hole that is formed through the reflective sheet 13-1 so that the inner surface of the chassis 12 is directly visible through the hole of the mark 48. Each mark 48 is arranged adjacent to a connector 17A to be connected to a primary-seal-side end portion 31, so as to be positioned at the inner side thereof on the reflective sheet 13-1 (or be displaced therefrom to the side of the opposite connector 17 (i.e., a connector 17B to be connected to a secondary-seal-side end portion 33)). The mark 48 is formed to be smaller than the outer diameter of a glass tube 18, and is arranged to face the back side of the glass tube 18 when the cold cathode tube 15 is mounted. The mark 48 can be readily formed by punching using a predefined die during a manufacturing process of the reflective sheet 13-1, and therefore a distinctive cost advantage can be provided. The shape, size, and the like, of the mark 48 can be suitably changed.

Next, a procedure for mounting cold cathode tubes 15, shown in the example 2 of the embodiment 1, to the backlight 10 having the above-described reflective sheet 13-1 will be explained. The mark 34 provided on the cold cathode tube 15 side in the example 2 of the embodiment 1 has substantially the same shape (e.g., round shape) as the mark 48 provided on the reflective sheet 13-1 of the present example. When each cold cathode tube 15 is mounted in the chassis 12, referring to FIG. 21-B, the cold cathode tube 15 is oriented so that the mark 34 (or identifier) provided on the ferrule 20A-2 for the primary-seal-side end portion 31 corresponds to the mark 48 (or chassis-side identifier) provided as a hole on the reflective sheet 13-1. In this way, a worker can mount cold cathode tubes 15 by a simple rule, so as to match the mark 34 of the cold cathode tube 15 side with the mark 48 of the chassis 12 side to which the cold cathode tube 15 is mounted. Consequently, the operational efficiency can be improved. Further, the mark 48 on the reflective sheet 13-1 and the mark 34 on the cold cathode tube 15 have substantially the same shape so that the visibility can be improved. Thereby, adjacent cold cathode tubes 15 can be infallibly arranged in the opposite orientation to each other.

The marks 34 on the mounted cold cathode tubes 15 have no adverse effect on display quality, and therefore are provided to be visible from the opening side of the chassis 12 through the opening sections 24 of connectors 17. In contrast, the marks 48 on the reflective sheet 13-1 may have an adverse effect on display quality, and therefore the entire areas thereof are hidden behind the cold cathode tubes 15 so as to be less visible from the opening side of the chassis 12. According to the construction, confirmation of orientations of the cold cathode tubes 15 is possible after the mounting thereof, and the marks 48 as holes provided on the reflective sheet 13-1 do not cause reduction in display quality. The cold cathode tubes 15 may be mounted by another rule opposite to the rule of the present example, so that the mark 34 of the cold cathode tube 15 side is arranged on the opposite side of the mark 48 of the chassis 12 side. The cold cathode tubes 15 shown in the other examples of the embodiment 1 than the example 2 may be used for the backlight 10 having the reflective sheet 13-1 of the present example 1 of the embodiment 2, as a matter of course.

Example 2

In the example 2, referring to FIG. 22-A, marks 49, 50 as holes of different shapes are provided on the reflective sheet 13-2 so as to correspond to two respective connectors 17A, 17B. Specifically, the mark 49 corresponding to a connector 17A to be connected to a primary-seal-side end portion 31 has a round shape, while the mark 50 corresponding to a connector 17B to be connected to a secondary-seal-side end portion 33 has a triangular shape. Accordingly, the round marks 49 for primary-seal-side end portions 31 and the triangular marks 50 for secondary-seal-side end portions 33 are alternately arranged along the short-side direction of the reflective sheet 13-2. Each mark 49, 50 is formed through the reflective sheet 13-2 as in the above example 1, and is arranged adjacent to the corresponding connector 17 so as to be positioned at the inner side thereof on the reflective sheet 13-2 (or be displaced therefrom to the side of the opposite connector 17). Each mark 49, 50 is formed to be smaller than the outer diameter of a glass tube 18, and is arranged to face the back side of the glass tube 18 when the cold cathode tube 15 is mounted.

A procedure for mounting cold cathode tubes 15, shown in the example 5 of the embodiment 1, to the backlight 10 having the above-described reflective sheet 13-2 will be explained. On each cold cathode tube 15 of the example 5 of the embodiment 1, a round mark 38 is provided on a ferrule 20A-5 for the primary-seal-side end portion 31, while a triangular mark 39 is provided on a ferrule 20B-5 for the secondary-seal-side end portion 33. When each cold cathode tube 15 is mounted in the chassis 12, referring to FIG. 22-B, the cold cathode tube 15 is oriented so that the round mark 38 provided on the ferrule 20A-5 for the primary-seal-side end portion 31 corresponds to the round mark 49 provided on the reflective sheet 13-2 while the triangular mark 39 provided on the ferrule 20B-5 for the secondary-seal-side end portion 33 corresponds to the triangular mark 50 provided on the reflective sheet 13-2. In this way, a worker can mount cold cathode tubes 15 by a simple rule, so as to match the shapes of the marks 38, 39 with the shapes of the marks 49, 50. Consequently, the operational efficiency can be significantly improved, and adjacent cold cathode tubes 15 can be infallibly arranged in the opposite orientation to each other. The redundant explanations for the other constructions and operational effects similar to those of the above example 1 will be omitted. The cold cathode tubes 15 shown in the other examples of the embodiment 1 than the example 5 may be used for the backlight 10 having the reflective sheet 13-2 of the present example 2 of the embodiment 2, as a matter of course.

Example 3

In the example 3, referring to FIG. 23-A, marks 51, 52 formed of different numbers of holes are provided on the reflective sheet 13-3 so as to correspond to two respective connectors 17A, 17B. Specifically, the mark 51 corresponding to a connector 17A to be connected to a primary-seal-side end portion 31 is formed of one hole, while the mark 52 corresponding to a connector 17B to be connected to a secondary-seal-side end portion 33 is formed of two holes. The two holes of the mark 52, 52 corresponding to the secondary-seal-side end portion 33 are arranged along the short-side direction of the reflective sheet 13-3. The one-hole marks 51 for primary-seal-side end portions 31 and the two-hole marks 52 for secondary-seal-side end portions 33 are alternately arranged along the short-side direction of the reflective sheet 13-3. Each mark 51, 52 is formed through the reflective sheet 13-3 as in the above example 1, and is arranged adjacent to the corresponding connector 17A, 17B so as to be positioned at the inner side thereof on the reflective sheet 13-3 (or be displaced therefrom to the side of the opposite connector 17). Each mark 51, 52 is arranged to face the back side of the mounted cold cathode tube 15.

A procedure for mounting cold cathode tubes 15, shown in the example 6 of the embodiment 1, to the backlight 10 having the above-described reflective sheet 13-3 will be explained. On each cold cathode tube 15 of the example 6 of the embodiment 1, a mark 40 including one dot is provided on a ferrule 20A-6 for the primary-seal-side end portion 31, while a mark 41 including two dots is provided on a ferrule 20B-6 for the secondary-seal-side end portion 33. When each cold cathode tube 15 is mounted in the chassis 12, referring to FIG. 23-B, the cold cathode tube 15 is oriented so that the one-dot mark 40 provided on the ferrule 20A-6 for the primary-seal-side end portion 31 corresponds to the one-hole mark 51 provided on the reflective sheet 13-3 while the two-dot mark 41 provided on the ferrule 20B-6 for the secondary-seal-side end portion 33 corresponds to the two-hole mark 52 provided on the reflective sheet 13-3. In this way, the mounting can be achieved by a simple rule, so that the numbers of dots of the marks 40, 41 are matched with the numbers of holes of the marks 51, 52. Thus, adjacent cold cathode tubes 15 can be arranged in the opposite orientation to each other, readily and infallibly. The redundant explanations for the other constructions and operational effects similar to those of the above examples will be omitted. The cold cathode tubes 15 shown in the other examples of the embodiment 1 than the example 6 may be used for the backlight 10 having the reflective sheet 13-3 of the present example 3 of the embodiment 2, as a matter of course.

Example 4

In the example 4, marks 53 are formed on the reflective sheet 13-4 by application of a colored coating material. Specifically, referring to FIG. 24-A, the marks 53 are provided by application of a colored coating material such as paint to the inner surface of the reflective sheet 13-4 (i.e., the surface facing the cold cathode tube 15 side). Each mark 53 is positioned to correspond to a connector 17A to be connected to a primary-seal-side end portion 31, as in the above example 1. The shape and/or arrangement position of the mark 53 are similar to those of the example 1, and therefore the detailed explanation will be omitted. The color of the mark 53 may be set to black, for example, and thereby it can contrast sharply with the highly-reflective white surface of the reflective sheet 13-4 so as to have improved visibility.

Contrary to the present example, a mark 53 may be solely provided on the side of a connector 17B for secondary-seal-side end portion 33, as a matter of course. The shape, color, size, and the like, of the mark 53 are not limited to those shown in the figure, but rather may be suitably changed. The application of the mark 53 can be achieved manually or by printing using a printing apparatus.

Next, a procedure for mounting cold cathode tubes 15, shown in the example 2 of the embodiment 1, to the backlight 10 having the above-described reflective sheet 13-4 will be explained. The mark 34 provided on the cold cathode tube 15 side in the example 2 of the embodiment 1 has substantially the same shape (e.g., round shape) and the same color as the mark 53 provided on the reflective sheet 13-4 of the present example. When each cold cathode tube 15 is mounted in the chassis 12, referring to FIG. 24-B, the cold cathode tube 15 is oriented so that the mark 34 provided on the ferrule 20A-2 for the primary-seal-side end portion 31 corresponds to the mark 53 provided on the reflective sheet 13-4. The operational efficiency can be improved due to the mark 53 on the reflective sheet 13-4 and the mark 34 on the cold cathode tube 15 having substantially the same shape and the same color. Consequently, adjacent cold cathode tubes 15 can be infallibly arranged in the opposite orientation to each other. The redundant explanations for the other constructions and operational effects similar to those of the above examples will be omitted. The cold cathode tubes 15 shown in the other examples of the embodiment 1 than the example 2 may be used for the backlight 10 having the reflective sheet 13-4 of the present example 4 of the embodiment 2, as a matter of course.

Example 5

In the example 5, referring to FIG. 25-A, marks 54, 55 of different colors are formed on the reflective sheet 13-5 by application of colored coating materials, so as to correspond to two respective connectors 17A, 17B. Specifically, the mark 54 corresponding to a connector 17A to be connected to a primary-seal-side end portion 31 is formed in black color, while the mark 55 corresponding to a connector 17B to be connected to a secondary-seal-side end portion 33 is formed in red color, for example. The marks 54, 55 of different colors are alternately arranged along the short-side direction of the reflective sheet 13-5. The marks 54, 55 have the same shape (e.g., round shape). The arrangement positions of the marks 54, 55 are similar to those of the above example 2, and therefore the detailed explanation will be omitted.

A procedure for mounting cold cathode tubes 15, shown in the example 4 of the embodiment 1, to the backlight 10 having the above-described reflective sheet 13-5 will be explained. On each cold cathode tube 15 of the example 4 of the embodiment 1, the mark 36 provided on the ferrule 20A-4 for the primary-seal-side end portion 31 and the mark 37 provided on the ferrule 20B-4 for the secondary-seal-side end portion 33 are formed in different colors, e.g., black color and red color, from each other. When each cold cathode tube 15 is mounted in the chassis 12, referring to FIG. 25-B, the cold cathode tube 15 is oriented so that the colors of the marks 36, 37 provided on the ferrules 20A-4, 20B-4 correspond to the colors of the marks 54, 55 provided on the reflective sheet 13-5. Thus, adjacent cold cathode tubes 15 can be infallibly arranged in the opposite orientation to each other. The redundant explanations for the other constructions and operational effects similar to those of the above examples will be omitted. The cold cathode tubes 15 shown in the other examples of the embodiment 1 than the example 4 may be used for the backlight 10 having the reflective sheet 13-5 of the present example 5 of the embodiment 2, as a matter of course.

Example 6

In the example 6, referring to FIG. 26-A, marks 56, 57 having different shapes are formed on the reflective sheet 13-6 by application of a colored coating material, so as to correspond to two respective connectors 17A, 17B. The marks 56, 57 are formed in the same color as each other. The shapes and/or arrangement positions of the marks 56, 57 are similar to those of the above example 2, and therefore the detailed explanation will be omitted.

When each cold cathode tube 15, shown in the example 5 of the embodiment 1, is mounted to the backlight 10 having the above-described reflective sheet 13-6, referring to FIG. 26-B, the shapes of the marks 38, 39 provided on the ferrules 20A-5, 20B-5 are matched with the shapes of the marks 56, 57 provided on the reflective sheet 13-6. Thus, adjacent cold cathode tubes 15 can be infallibly arranged in the opposite orientation to each other. The redundant explanations for the other constructions and operational effects similar to those of the above examples will be omitted. The cold cathode tubes 15 shown in the other examples of the embodiment 1 than the example 5 may be used for the backlight 10 having the reflective sheet 13-6 of the present example 6 of the embodiment 2, as a matter of course. The present example 6 may be combined with the example 5, so that the marks 56, 57 differ in color as well as in shape.

Example 7

In the example 7, referring to FIG. 27-A, marks 58, 59 each including a different number of dots are formed on the reflective sheet 13-7 by application of a colored coating material, so as to correspond to two respective connectors 17A, 17B. The marks 58, 59 are formed in the same color as each other. The numbers, shapes and arrangement positions of dots of the marks 58, 59 are similar to those of the above example 3, and therefore the detailed explanation will be omitted.

When each cold cathode tube 15, shown in the example 6 of the embodiment 1, is mounted to the backlight 10 having the above-described reflective sheet 13-7, referring to FIG. 27-B, the numbers of dots of the marks 40, 41 provided on the ferrules 20A-6, 20B-6 are matched with the numbers of dots of the marks 58, 59 provided on the reflective sheet 13-7. Thus, adjacent cold cathode tubes 15 can be infallibly arranged in the opposite orientation to each other. The redundant explanations for the other constructions and operational effects similar to those of the above examples will be omitted. The cold cathode tubes 15 shown in the other examples of the embodiment 1 than the example 6 may be used for the backlight 10 having the reflective sheet 13-7 of the present example 7 of the embodiment 2, as a matter of course. The present example 7 may be combined with the examples 5 and 6, so that the marks 58, 59 differ in color and/or shape as well as in the number of dots.

As explained above, according to the present embodiment, chassis-side identifiers are provided on the chassis 12 side so as to correspond to the identifiers provided on the cold cathode tubes 15, and thereby each cold cathode tube 15 can be infallibly mounted in the correct orientation.

The marks 48-59 as chassis-side identifiers are provided on the reflective sheet 13 mounted to the chassis 12. According to the construction, the objectives can be achieved at low cost, compared to providing chassis-side identifiers individually on respective connectors 17, for example. Further, in the case of the marks 48-52 provided as holes formed through the reflective sheet 13, the cost for providing the marks 48-52 can be extremely reduced to low. On the other hand, in the case of the marks 53-59 provided by application of colored coating materials to the reflective sheet 13, the visibility of the marks 53-59 can be improved.

The marks 48-59 are arranged on the back side of the cold cathode tubes 15 contained in the chassis 12. When the cold cathode tubes 15 are mounted, the marks 48-59 are thus hidden behind the cold cathode tubes 15 so as to be less visible, which can prevent reduction in display quality.

In the case that the mark 48, 53 corresponding to one of the primary-seal-side end portion 31 and the secondary-seal-side end portion 33 is solely provided on the reflective sheet 13, the objectives can be achieved at low cost, compared to providing those on both sides. On the contrary, in the case that the marks 49-52, 54-59 respectively corresponding to the primary-seal-side end portion 31 and the secondary-seal-side end portion 33 are provided on the reflective sheet 13, the discrimination can be further facilitated, compared to providing that on one side.

Embodiment 3

An embodiment 3 of the present invention will be explained with reference to FIGS. 28-A to 32-B. In the present embodiment 3, chassis-side identifiers are provided on the side of the chassis 12 of a backlight 10 that contains cold cathode tubes 15 as in the embodiment 1, or specifically, provided on connectors 17. In the present embodiment 3, the redundant explanations for the constructions and operational effects similar to those of the above embodiments 1 and 2 will be omitted. Hereinafter, when two connectors 17 should be distinguishably designated, the suffix A is attached to the symbol of a connector corresponding to a primary-seal-side end portion 31 while the suffix B is attached to the symbol of a connector corresponding to a secondary-seal-side end portion 33. The suffix is omitted when discrimination between the primary seal side and the secondary seal side is not necessary.

In the present embodiment 3, the chassis-side identifiers are provided on the connectors 17, so that the connector 17A corresponding to the primary-seal-side end portion 31 of each cold cathode tube 15 shown in the above embodiment 1 and the connector 17B corresponding to the secondary-seal-side end portion 33 can be distinguished visually or by image processing using an imaging device. The followings may be cited as operative examples. Hereinafter, when the connectors 17 shown in an example should be distinguished from those of the other examples, the example number is attached as a suffix to the symbol of the connector. The suffix is omitted when discrimination among examples is not necessary.

Example 1

In the example 1, referring to FIG. 28-A, a connector 17A-1 to be connected to a primary-seal-side end portion 31 and a connector 17B-1 to be connected to a secondary-seal-side end portion 33 are provided so that the entire surfaces (or outer surfaces) thereof differ in color from each other. Specifically, synthetic resin materials of different colors are used for the holding members 23 of two respective connectors 17A-1, 17B-1. For example, the holding member 23 of a connector 17A-1 to be connected to a primary-seal-side end portion 31 is formed of a synthetic resin material of black color, while the holding member 23 of a connector 17B-1 to be connected to a secondary-seal-side end portion 33 is formed of a synthetic resin material of white color. Alternatively, the different colors can be achieved by application of a colored coating material to the entire surface of at least one of a connector 17A-1 for primary-seal-side end portion 31 and a connector 17B-1 for secondary-seal-side end portion 33. In the case that the coating is thus applied, the holding members 23 of both connectors 17A-1 and 17B-1 may be formed of the same material. However, different materials may be used even in this case.

Next, a procedure for mounting cold cathode tubes 15, shown in the example 1 of the embodiment 1, to the backlight 10 having the above-described connectors 17A-1, 17B-1 will be explained. In the example 1 of the embodiment 1, the ferrules 20A-1, 20B-1 of each cold cathode tube 15 differ in color from each other. When each cold cathode tube 15 is mounted in the chassis 12, referring to FIG. 28-B, the colors of the ferrules 20A-1, 20B-1 of the cold cathode tube 15 are matched with the colors of the connectors 17A-1, 17B-1. Thereby, adjacent cold cathode tubes 15 can be infallibly arranged in the opposite orientation to each other.

The orientations of cold cathode tubes 15 can be readily inspected and verified after the mounting, by checking the ferrules 20A-1, 20B-1 of cold cathode tubes 15 and the holding members 23 of connectors 17A-1, 17B-1 with the eye of an inspector from the front side or by processing images taken by an imaging device such as a camera of an inspection apparatus. The cold cathode tubes 15 shown in the other examples of the embodiment 1 than the example 1 may be used for the backlight 10 having the connectors 17A-1, 17B-1 of the present example 1 of the embodiment 3, as a matter of course.

Example 2

In the example 2, referring to FIG. 29-A, a mark 60 is solely provided on one of two connectors 17A-2 and 17B-2, i.e., provided on a connector 17A-2 to be connected to a primary-seal-side end portion 31. The mark 60 is formed by application of a colored coating material such as paint to the outer surface of the holding member 23 of the connector 17A-2. The mark 60 has a round shape, and differs in color from the surface of the holding member 23. The color of the mark 60 can be set to the complementary color of the color of the holding member 23, for example, so that the contrast may be increased resulting in improved visibility of the mark 60. Contrary to the present example, a mark 60 may be solely provided on a connector 17B-2 to be connected to a secondary-seal-side end portion 33, as a matter of course. The shape, color, size, and the like, of the mark 60 are not limited to those shown in the figure, but rather may be suitably changed. The application of the mark 60 can be achieved manually or by printing using a printing apparatus.

Next, a procedure for mounting cold cathode tubes 15, shown in the example 2 of the embodiment 1, to the backlight 10 having the above-described connectors 17A-2, 17B-2 will be explained. The mark 34 provided on the cold cathode tube 15 side in the example 2 of the embodiment 1 has substantially the same shape (e.g., round shape) as the mark 60 provided on the connector 17A-2 of the present example. When each cold cathode tube 15 is mounted in the chassis 12, referring to FIG. 29-B, the cold cathode tube 15 is oriented so that the mark 34 provided on the ferrule 20A-2 for the primary-seal-side end portion 31 corresponds to the mark 60 provided on the connector 17A-2. In this way, a worker can mount cold cathode tubes 15 by a simple rule, so as to match the mark 34 provided on the cold cathode tube 15 with the mark 60 provided on the connector 17A-2 that is on the chassis 12 side to which the cold cathode tube 15 is mounted. Consequently, the operational efficiency can be improved. Further, the mark 60 on the connector 17A-2 and the mark 34 on the cold cathode tube 15 have substantially the same shape. Thereby, the operational efficiency can be further improved, and adjacent cold cathode tubes 15 can be infallibly arranged in the opposite orientation to each other. The redundant explanations for the other constructions and operational effects similar to those of the above example 1 will be omitted. The cold cathode tubes 15 shown in the other examples of the embodiment 1 than the example 2 may be used for the backlight 10 having the connectors 17A-2, 17B-2 of the present example 2 of the embodiment 3, as a matter of course.

Example 3

In the example 3, referring to FIG. 30-A, marks 61, 62 having different shapes are provided on two respective connectors 17A-3, 17B-3. Specifically, the mark 61 provided on the holding member 23 of a connector 17A-3 to be connected to a primary-seal-side end portion 31 has a round shape, while the mark 62 provided on the holding member 23 of a connector 17B-3 to be connected to a secondary-seal-side end portion 33 has a triangular shape. Accordingly, in the chassis 12, the connectors 17A-3 having round marks 61 and the connectors 17B-3 having triangular marks 62 are alternately arranged along the short-side direction of the chassis 12. Each mark 61, 62 can be formed by application of a colored coating material such as paint to the surface of a holding member 23. Each mark 61, 62 is arranged on a holding member 23, so as to be adjacently positioned at the outer side of the opening section 24 (or be displaced therefrom to the opposite side of the opposite connector 17). The actual shapes, sizes, or the like, of the marks 61, 62 may be suitably changed.

A procedure for mounting cold cathode tubes 15, shown in the example 5 of the embodiment 1, to the backlight 10 having the above-described connectors 17A-3, 17B-3 will be explained. On each cold cathode tube 15 of the example 5 of the embodiment 1, a round mark 38 is provided on a ferrule 20A-5 for the primary-seal-side end portion 31, while a triangular mark 39 is provided on a ferrule 20B-5 for the secondary-seal-side end portion 33. When each cold cathode tube 15 is mounted in the chassis 12, referring to FIG. 30-B, the cold cathode tube 15 is oriented so that the round mark 38 provided on the ferrule 20A-5 for the primary-seal-side end portion 31 corresponds to the round mark 61 provided on the connector 17A-3 while the triangular mark 39 provided on the ferrule 20B-5 for the secondary-seal-side end portion 33 corresponds to the triangular mark 62 provided on the connector 17B-3. In this way, a worker can mount cold cathode tubes 15 by a simple rule, so as to match the shapes of the marks 38, 39 with the shapes of the marks 61, 62. Consequently, the operational efficiency can be significantly improved, and adjacent cold cathode tubes 15 can be infallibly arranged in the opposite orientation to each other. The redundant explanations for the other constructions and operational effects similar to those of the above examples will be omitted. The cold cathode tubes 15 shown in the other examples of the embodiment 1 than the example 5 may be used for the backlight 10 having the connectors 17A-3, 17B-3 of the present example 3 of the embodiment 3, as a matter of course.

Example 4

In the example 4, referring to FIG. 31-A, marks 63, 64 of different colors are formed on two respective connectors 17A-4, 17B-4. Specifically, a mark 63 of black color is provided on the holding member 23 of a connector 17A-4 to be connected to a primary-seal-side end portion 31, while a mark 64 of red color is provided on the holding member 23 of a connector 17B-4 to be connected to a secondary-seal-side end portion 33, for example. Accordingly, in the chassis 12, the connectors 17A-4 having black marks 63 and the connectors 17B-4 having red marks 64 are alternately arranged along the short-side direction of the chassis 12. Each mark 63, 64 can be formed by application of a colored coating material such as paint to the surface of a holding member 23. The two marks 63, 64 have the same shape (e.g., round shape). The arrangement positions of the marks 63, 64 are similar to those of the above example 3. The actual colors, shapes, sizes, and the like, of the marks 63, 64 may be suitably changed.

A procedure for mounting cold cathode tubes 15, shown in the example 4 of the embodiment 1, to the backlight 10 having the above-described connectors 17A-4, 17B-4 will be explained. On each cold cathode tube 15 of the example 4 of the embodiment 1, the mark 36 provided on the ferrule 20A-4 for the primary-seal-side end portion 31 and the mark 37 provided on the ferrule 20B-4 for the secondary-seal-side end portion 33 are formed in different colors, e.g., black color and red color, from each other. When each cold cathode tube 15 is mounted in the chassis 12, referring to FIG. 31-B, the cold cathode tube 15 is oriented so that the colors of the marks 36, 37 provided on the ferrules 20A-4, 20B-4 correspond to the colors of the marks 63, 64 provided on the connectors 17A-4, 17B-4. Thereby, adjacent cold cathode tubes 15 can be infallibly arranged in the opposite orientation to each other. The redundant explanations for the other constructions and operational effects similar to those of the above examples will be omitted. The cold cathode tubes 15 shown in the other examples of the embodiment 1 than the example 4 may be used for the backlight 10 having the connectors 17A-4, 17B-4 of the present example 4 of the embodiment 3, as a matter of course. The present example 4 may be combined with the example 3, so that the marks differ in shape as well as in color.

Example 5

In the example 5, referring to FIG. 32-A, marks 65, 66 each including a different number of dots are provided on two respective connectors 17A-5, 17B-5. Specifically, a mark 65 including one dot is provided on the holding member 23 of a connector 17A-5 to be connected to a primary-seal-side end portion 31, while a mark 66 including two dots is provided on the holding member 23 of a connector 17B-5 to be connected to a secondary-seal-side end portion 33. The two dots of the mark 66 on the connector 17B-5 to be connected to a secondary-seal-side end portion 33 are arranged along the short-side direction of the chassis 12. In the chassis 12, the connectors 17A-5 having one-dot marks 65 and the connectors 17B-5 having two-dot marks 66 are alternately arranged along the short-side direction of the chassis 12. The arrangement positions of the marks 65, 66 are similar to those of the above example 4. The actual colors, shapes, sizes, and the like, of dots of the marks 65, 66 may be suitably changed.

A procedure for mounting cold cathode tubes 15, shown in the example 6 of the embodiment 1, to the backlight 10 having the above-described connectors 17A-5, 17B-5 will be explained. In the example 6 of the embodiment 1, a mark 40 including one dot is provided on a ferrule 20A-6 for primary-seal-side end portion 31, while a mark 41 including two dots is provided on a ferrule 20B-6 for secondary-seal-side end portion 33. When each cold cathode tube 15 is mounted in the chassis 12, referring to FIG. 32-B, the cold cathode tube 15 is oriented so that the one-dot mark 40 provided on the ferrule 20A-6 for the primary-seal-side end portion 31 corresponds to the one-dot mark 65 provided on the connector 17A-5 while the two-dot mark 41 provided on the ferrule 20B-6 for the secondary-seal-side end portion 33 corresponds to the two-dot mark 66 provided on the connector 17B-5. Thereby, adjacent cold cathode tubes 15 can be infallibly arranged in the opposite orientation to each other. The redundant explanations for the other constructions and operational effects similar to those of the above examples will be omitted. The cold cathode tubes 15 shown in the other examples of the embodiment 1 than the example 6 may be used for the backlight 10 having the connectors 17A-5, 17B-5 of the present example 5 of the embodiment 3, as a matter of course. The present example 5 may be combined with the examples 3 and 4, so that the marks 65,66 differ in color and/or shape as well as in the number of dots.

As explained above, according to the present embodiment, chassis-side identifiers corresponding to the identifiers on the cold cathode tubes 15 are provided on the connectors 17 arranged for connecting ferrules 20 to the power circuit. Thereby, each cold cathode tube 15 can be infallibly mounted in the correct orientation. The connectors 17 are provided to project from the reflective sheet 13 to the near side along the mounting direction of a cold cathode tube 15 (i.e., to the front side), and therefore the chassis-side identifiers are more visible at the time of mounting.

The chassis-side identifiers are provided on the holding members 23 of connectors 17, which facilitates provision of the chassis-side identifiers, for example, compared to providing chassis-side identifiers on connecting terminals 22 which are smaller and more complex in shape than the holding members 23.

In the case of a chassis-side identifier provided as the color of one holding member 23 differing from the color of the other holding member 23, the two holding members 23 can be readily distinguished with the eye. The two holding members 23 of different colors can be achieved by different materials, which does not require extra processing such as coating for holding members 23 and is low in cost.

The chassis-side identifiers, provided as marks 60-66 on the holding members 23, also facilitate the discrimination. The marks 60-66 can be formed by application of colored coating materials to the holding members 23, which enables shared holding members 23 having the same shape resulting in low cost, compared to providing marks as different outer shapes of the holding members 23, for example.

In the case of a mark 60 provided solely on one of two holding members 23, the objectives can be achieved at low cost, compared to providing those on both sides. On the contrary, in the case of marks 61-66 provided on both holding members 23, the discrimination can be further facilitated, compared to providing that on one side.

The opening section 24 is provided on each holding member 23 so that the identifier on the cold cathode tube 15 can be exposed therethrough to the outside. Therefore, both the identifier on the cold cathode tube 15 and the chassis-side identifier on the connector 17 can be confirmed from the outside, for example, with the eye. Thus, the orientation of the cold cathode tube 15 can be readily confirmed after the mounting.

Embodiment 4

An embodiment 4 of the present invention will be explained with reference to FIGS. 33 to 36. In the present embodiment 4, the orientations of cold cathode tubes 15 mounted to the chassis 12 are modified from the embodiment 1. In the present embodiment 4, the redundant explanations for the constructions and operational effects similar to those of the above embodiments 1 to 3 will be omitted.

As explained in the above embodiment 1, each cold cathode tube 15 may be subject to color unevenness including variation along its axial direction. There is also another problem than the color unevenness. Specifically, it is related to a manufacturing process of a cold cathode tube 15, in which a getter material 32 including mercury is put into the secondary-seal-side end portion 33 before secondary sealing of the secondary-seal-side end portion 33, and the mercury is extracted by high-frequency heating of the getter material 32 (See FIG. 9). The mercury extracted from the getter material 32 is dispersed into the glass tube 18. The resultant concentration thereof has a tendency to be high at the secondary-seal-side end portion 33 side closer to the getter material 32 and be low at the primary-seal-side end portion 31 side far from the getter material 32. Thus, the concentration of the mercury may be unevenly distributed to have variation along the axial direction of the cold cathode tube 15. When the concentration distribution of the mercury in the cold cathode tube 15 includes a significant variation, problems may arise, such as reduced luminescent efficiency or shortened life of the cold cathode tube 15.

In view of the above problems, in the present embodiment, the inventor of the present application modified, from the above embodiment 1, the orientations of cold cathode tubes 15 mounted to the chassis 12 of a backlight 10, based on the following findings. When a cold cathode tube 15 connected to the power source PW (inverter transformer) of the power circuit board 16 is lighted, a high voltage is applied to one of two end portions thereof while a low voltage is applied to the other end portion. The end portion of the cold cathode tube 15 being subjected to the high voltage has a relatively high temperature, while the end portion being subjected to the low voltage has a relatively low temperature. On the other hand, vaporized mercury in a given space has a tendency to transfer from the high-temperature side to the low-temperature side in response to uneven temperature distribution in the space.

The inventor of the present application focused on these points, and accordingly, in the present embodiment, each cold cathode tube 15 is connected to the power source PW so that the primary-seal-side end portion 31 is at the low-voltage side while the secondary-seal-side end portion 33 is at the high-voltage side, as shown in FIG. 33. When the cold cathode tube 15 thus connected is lighted, a low voltage is applied to the primary-seal-side end portion 31 while a high voltage is applied to the secondary-seal-side end portion 33. At the time, the primary-seal-side end portion 31 has a relatively low temperature, while the secondary-seal-side end portion 33 has a relatively high temperature. Therefore, the vaporized mercury in the cold cathode tube 15 will transfer from the secondary-seal-side end portion 33 to the primary-seal-side end portion 31 during the lighting, as shown by the arrowed line in FIG. 33. Thus, during the lighting, the mercury moves from the secondary-seal-side end portion 33 having a relatively high concentration, to the primary-seal-side end portion 31 having a relatively low concentration. Consequently, the mercury is uniformly spread in the cold cathode tube 15. In this way, the uniform concentration distribution of mercury can be achieved in the cold cathode tube 15, which enables higher luminescent efficiency and longer life of the cold cathode tube 15. In FIG. 33, the cold cathode tube 15 of the example 1 of the embodiment 1 is shown for illustrative purposes. However, the cold cathode tubes 15 shown in the other examples 2 to 9 may be used, as a matter of course.

On one of the long-side-directional end portions of the chassis 12 of the backlight 10, the connectors 17B connected to the high voltage side of the above power circuit board 16 having the power source PW are arranged along the short-side direction of the chassis 12. On the other end portion, the connectors 17A connected to the low voltage side of the power circuit board 16 are arranged along the short-side direction. When each cold cathode tube 15 is mounted in the chassis 12, the primary-seal-side end portion 31 is connected to a low-voltage-side connector 17A while the secondary-seal-side end portion 33 is connected to a high-voltage-side connector 17B. Thus, all the cold cathode tubes are mounted in the same orientation. In order to secure this arrangement, identifiers provided on ferrules 20 of cold cathode tubes 15 can be used. The followings may be cited as operative examples.

Example 1

In the example 1, a procedure for mounting cold cathode tubes 15, shown in the example 1 of the embodiment 1, in the chassis 12 will be shown. Referring to FIG. 34, connectors 17A, 17B are provided in the chassis 12 so that the connectors 17B arranged vertically (or along the short-side direction of the chassis 12) in the end portion, shown on the left side of the figure, are provided as high-voltage-side connectors while the connectors 17A arranged vertically in the end portion, shown on the right side of the figure, are provided as low-voltage-side connectors. On the other hand, a ferrule 20A-1 attached to the primary-seal-side end portion 31 of each cold cathode tube 15 and a ferrule 20B-1 attached to the secondary-seal-side end portion 33 thereof differ in color of the entire surface from each other.

When each cold cathode tube 15 is mounted in the chassis 12, a worker visually checks the colors of two ferrules 20A-1, 20B-1, and orients the cold cathode tube so that the ferrule 20B-1 attached on the secondary-seal-side end portion 33 is on the left side of FIG. 34 while the ferrule 20A-1 attached on the primary-seal-side end portion 31 is on the right side of the figure. The cold cathode tube 15 is thus oriented and mounted, and consequently the ferrule 20B-1 attached on the secondary-seal-side end portion 33 is connected to a high-voltage-side connector 17B while the ferrule 20A-1 attached on the primary-seal-side end portion 31 is connected to a low-voltage-side connector 17A. As a result of thus mounting the cold cathode tubes 15, the ferrules 20A-1 or 20B-1 having the same color are arranged in a line or vertically in the figure. In this way, all the cold cathode tubes 15 can be infallibly mounted in the same orientation.

The cold cathode tubes 15 shown in the other examples 2 to 9 of the embodiment 1 may be also applied in a similar manner. In this case, the marks 34-47 provided on the ferrules 20 are visually checked, and the cold cathode tubes 15 are mounted so that the same marks 34-47 are arranged in a line along the short-side direction of the chassis 12. Thus, the cold cathode tubes 15 can be infallibly mounted in the same orientation.

Example 2

Figure 35:
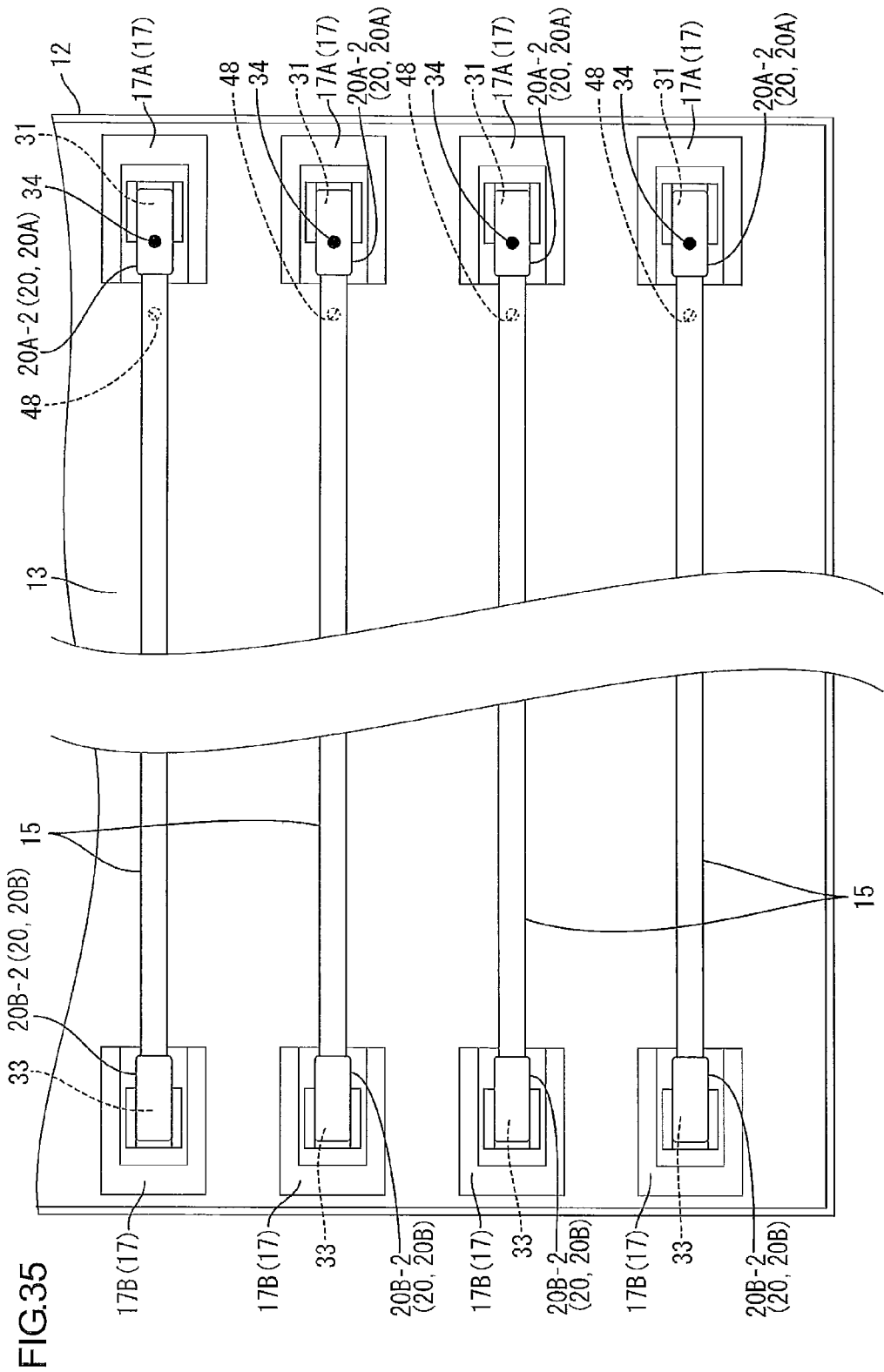
FIG. 35 is a plan view of a chassis to which cold cathode tubes are mounted according to an example 2 of the embodiment 4.

In the example 2, a procedure for mounting cold cathode tubes 15, shown in the example 2 of the embodiment 1, in a chassis 12 having a reflective sheet 13 that includes marks 48 provided thereon, will be shown. The connectors 17A, 17B are provided in the chassis 12 so as to form the same arrangement as the above example 1. Referring to FIG. 35, the marks 48 (or chassis-side identifiers) similar to those shown in the example 1 of the embodiment 2 are formed as round holes on the reflective sheet 13, so as to be positioned adjacent to respective low-voltage-side connectors 17A. The marks 48 are arranged in a line along the short-side direction of the chassis 12. On the other hand, a mark 34 is provided solely on one of two ferrules 20A-2, 20B-2 of each cold cathode tube 15, i.e., on the ferrule 20A-2 attached to the primary-seal-side end portion 31.

When each cold cathode tube 15 is mounted in the chassis 12, a worker orients the cold cathode tube 15 so that the mark 34 on the ferrule 20A-2 and the mark 48 on the reflective sheet 13 are on the same side (i.e., on the right side in FIG. 35). The cold cathode tube 15 is thus oriented and mounted, and consequently the ferrule 20A-2 attached on the primary-seal-side end portion 31 is connected to a low-voltage-side connector 17A while the ferrule 20B-2 attached on the secondary-seal-side end portion 33 is connected to a high-voltage-side connector 17B. As a result of thus mounting cold cathode tubes 15, the marks 34 are arranged in a line or vertically in the figure. In this way, all the cold cathode tubes 15 can be infallibly mounted in the same orientation.

The cold cathode tubes 15 shown in the other examples 1 and 3 to 9 of the embodiment 1 and/or the reflective sheet 13 (or chassis 12) having marks as in the other examples 2 to 7 of the embodiment 2 may be also applied in a similar manner.

Example 3

Figure 36:
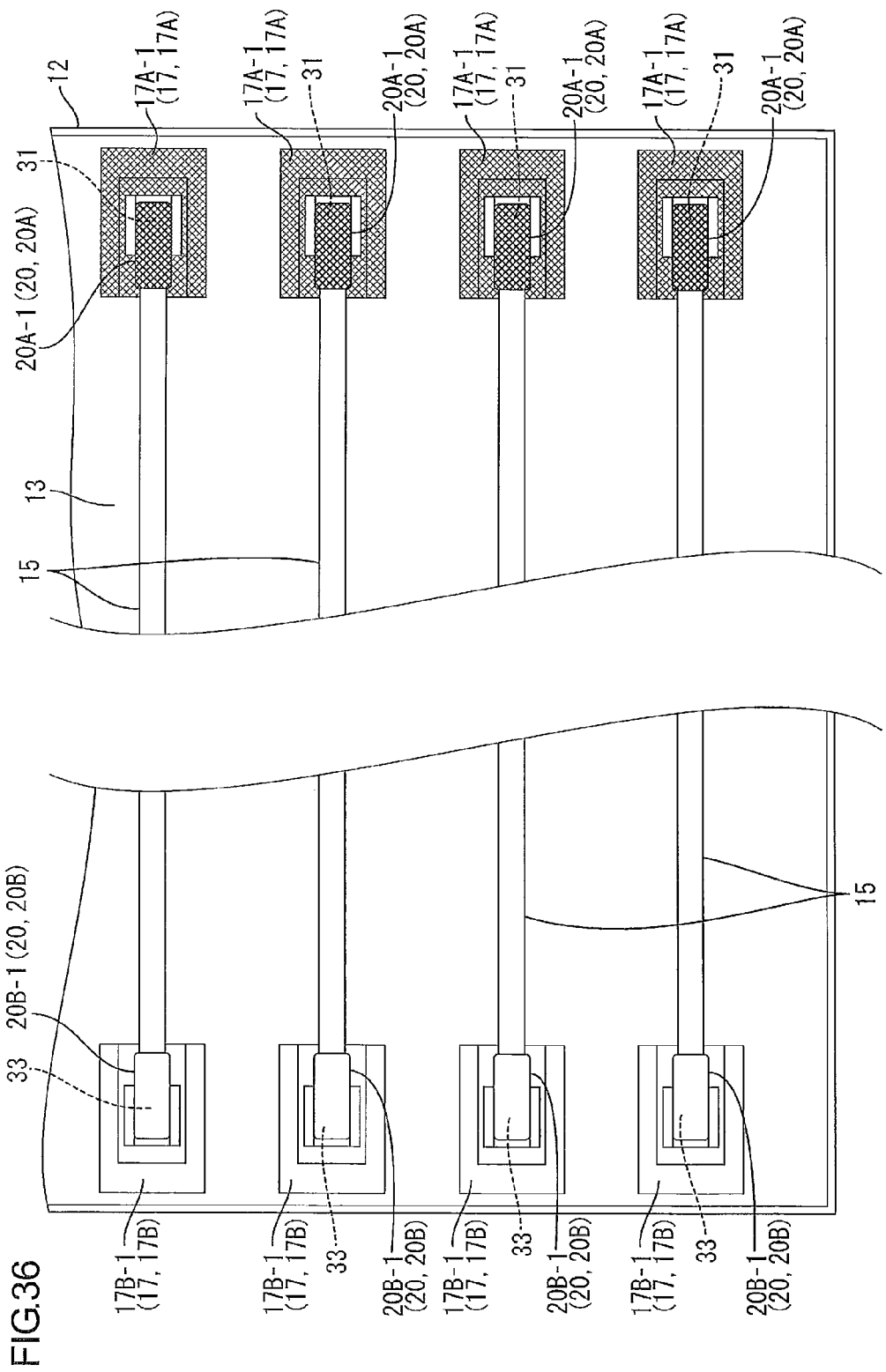
FIG. 36 is a plan view of a chassis to which cold cathode tubes are mounted according to an example 3 of the embodiment 4.

In the example 3, a procedure for mounting cold cathode tubes 15, shown in the example 1 of the embodiment 1, in a chassis 12 that includes connectors 17A-1, 17B-1 shown in the example 1 of the embodiment 3, will be shown. Referring to FIG. 36, the connectors 17A-1, 17B-1 are provided so that the high-voltage-side connectors 17B-1 and the low-voltage-side connectors 17A-1 differ in color of the entire surface from each other. The high-voltage-side connectors 17B-1 are arranged along the short-side direction of the chassis 12 and on the left side of the figure, while the low-voltage-side connectors 17A-1 are arranged along the short-side direction and on the right side of the figure. Accordingly, the connectors 17A-1 on the right side of the figure and the connectors 17B-1 on the left side of the figure differ in color from each other, and the connectors 17A-1 or 17B-1 having the same color are arranged in a line along the short-side direction of the chassis 12. On the other hand, the ferrule 20A-1 attached to the primary-seal-side end portion 31 of each cold cathode tube 15 and the ferrule 20B-1 attached to the secondary-seal-side end portion 33 thereof differ in color of the entire surface from each other.

When each cold cathode tube 15 is mounted in the chassis 12, a worker visually checks the colors of two ferrules 20A-1, 20B-1 and the colors of two connectors 17A-1, 17B-1 to be used for current mounting. Thereby, the ferrule 20B-1 attached on the secondary-seal-side end portion 33 is matched with the high-voltage-side connector 17B-1, while the ferrule 20A-1 attached on the primary-seal-side end portion 31 is matched with the low-voltage-side connector 17A-1. The cold cathode tube 15 is thus held and mounted, and consequently the ferrule 20B-1 attached on the secondary-seal-side end portion 33 is connected to the high-voltage-side connector 17B-1 while the ferrule 20A-1 attached on the primary-seal-side end portion 31 is connected to the low-voltage-side connector 17A-1. As a result of thus mounting cold cathode tubes 15, the ferrules 20A-1 or 20B-1 having the same color are arranged in a line or vertically in the figure. In this way, all the cold cathode tubes 15 can be infallibly mounted in the same orientation. If the color of the ferrule 20B-2 attached to the secondary-seal-side end portion 33 and the color of the high-voltage-side connector 17B-1 are set to the same color or similar colors, they are more visible to the worker and thereby the operational efficiency can be improved. Similarly, the color of the ferrule 20A-1 attached to the primary-seal-side end portion 31 and the color of the low-voltage-side connector 17A-1 may be set to the same color or similar colors.

The cold cathode tubes 15 shown in the other examples 2 to 9 of the embodiment 1 and/or the connectors 17 shown in the other examples 2 to 5 of the embodiment 3 may be also applied in a similar manner. Further, the reflective sheet 13 having marks as in the examples 1 to 7 of the embodiment 2 may be applied in combination with the present example.

As explained above, according to the present embodiment, the cold cathode tubes 15 are arranged so that end portions adjacently arranged along the array direction thereof both correspond to the primary-seal-side end portion 31 or both correspond to the secondary-seal-side end portion 33. Therefore, the present embodiment meets the case where cold cathode tubes 15 are preferably mounted in the same orientation to the chassis 12 due to some characteristics of the primary-seal-side end portion 31 and the secondary-seal-side end portion 33.

The connectors 17 for connecting the ferrules 20 of cold cathode tubes 15 to the power source PW capable of supplying power to the cold cathode tubes 15 are arranged on the chassis 12, so as to correspond two-to-one with the cold cathode tubes 15. The two connectors 17 include a high-voltage-side connector 17B arranged on one side and a low-voltage-side connector 17A arranged on the other side. The connectors 17 adjacently arranged along the array direction of the cold cathode tubes 15 both correspond to the high-voltage-side connector 17B or both correspond to the low-voltage-side connectors 17A. The ferrules 20B attached to the secondary-seal-side end portions 33 are connected to the high-voltage-side connectors 17B, while the ferrules 20A attached to the primary-seal-side end portions 31 are connected to the low-voltage-side connectors 17A. When each cold cathode tube 15 is lighted, the secondary-seal-side end portion 33 having the ferrule 20B connected to the high-voltage-side connector 17B has a higher temperature than that of the primary-seal-side end portion 31 having the ferrule 20A connected to the low-voltage-side connector 17A. Therefore, the mercury in the glass tube 18 transfers from the secondary-seal-side end portion 33 to the primary-seal-side end portion 31. Thereby, the uniform concentration distribution of mercury can be achieved during lighting, even when the cold cathode tube 15 has nonuniform concentration distribution of mercury including variation along the axial direction thereof due to the manufacturing method.

Other Embodiments

The present invention is not limited to the embodiments explained in the above description made with reference to the drawings. The following embodiments may be included in the technical scope of the present invention, for example.

(1) The examples described in the above embodiment 1 can be adequately combined to form modifications. Specifically, the example 1 may be combined with any of the examples 2 to 9, so that a mark or marks are provided on one or both of ferrules made of different materials.

(2) The above embodiments 2 and 3 may be combined, so that chassis-side identifiers are provided on both the reflective sheet and the connectors. The actual combination can be arbitrarily selected from combinations of the examples.

(3) In the above embodiment 1, the identifier provided on a ferrule of a cold cathode tube is shown for illustrative purposes. However, an identifier may be provided (e.g., as application of a colored coating material) on a portion of the glass tube that is not covered with a ferrule, for example. In this case, the identifier is preferably provided on a nonluminous part of the glass tube.

(4) In the above embodiment 1, the identifiers are provided as different materials of ferrules or application of a colored coating material to ferrules. However, identifiers may be provided as different outer shapes of ferrules, for example, by forming a concave or convex portion on a ferrule by die stamping, or by forming a through hole on a ferrule.

(5) In the above embodiments 2 and 3, the chassis-side identifiers are provided on the reflective sheet or the connectors. However, chassis-side identifiers may be provided on another component (e.g., the chassis) included in the backlight.

(6) In the above embodiment 2, the marks are positioned to be hidden behind the cold cathode tubes. However, the present invention includes marks which are positioned so that the whole or a part of each mark is exposed without being hidden behind the cold cathode tubes.

(7) In the above embodiment 3, the chassis-side identifiers are provided as different materials of holding members or as application of a colored coating material to holding members. However, chassis-side identifiers may be provided as different outer shapes of holding members, for example, by forming a concave or convex portion or a hole integrally on the outer surface of a holding member.

(8) In the above embodiment 3, the chassis-side identifiers are provided on the holding members of connectors. However, chassis-side identifiers may be provided on connecting terminals. Specifically, this construction can be achieved by coating the connecting terminals.

(9) In the above embodiments 1 to 3, the backlight is shown for illustrative purposes, in which the cold cathode tubes are alternately mounted in the chassis so that the orientations thereof are reversed for every cold cathode tube. However, the present invention includes a construction, in which the cold cathode tubes are provided so that the orientations thereof are reversed for every two cold cathode tubes, for example. Further, the orientations of the mounted cold cathode tubes can be suitably changed.

(10) In the above embodiments, the cold cathode tubes having electrodes connected to the ferrules are shown for illustrative purposes. However, the present invention includes so-called EEFLs (External Electrode Fluorescent Lamps), on which ferrules are used as external electrodes instead of electrodes in the glass tubes.

(11) In the above embodiments, the cold cathode tubes are shown as discharge tubes for illustrative purposes. However, the present invention can be applied to other types of discharge tubes having ferrules.

(12) In the above embodiments, the liquid crystal display device that uses a liquid crystal panel as a display panel is shown for illustrative purposes. However, the present invention can be applied to a display device that uses another type of display panel.

(13) In the above embodiments, the television receiver having a tuner is shown for illustrative purposes. However, the present invention can be applied to a display device that does not include a tuner.

(14) In the above embodiment 4, the cold cathode tubes are mounted in the same orientation so that the ferrules attached to the secondary-seal-side end portions are connected to the high-voltage-side connectors. However, the orientations of the mounted cold cathode tubes may be reversed from the above, when the primary-seal-side end portions and the secondary-seal-side end portions thereof have some characteristics. That is, the present invention includes a construction in which cold cathode tubes are mounted in the same orientation so that the ferrules attached to the primary-seal-side end portions are connected to the high-voltage-side connectors while the ferrules attached to the secondary-seal-side end portions are connected to the low-voltage-side connectors.

(15) In the above embodiment 4, the connectors are provided on the chassis so that connectors adjacently arranged along the array direction of the cold cathode tubes both correspond to the high-voltage-side connector or both correspond to the low-voltage-side connector. However, the arrangement of high-voltage-side connectors and low-voltage-side connectors can be varied, and the cold cathode tubes are mounted in orientations which conform with the varied arrangement of the connectors, in this case.

The invention claimed is:

1. A lighting device comprising:
    a plurality of discharge tubes, each of the discharge tubes including:
        a glass tube having a primary-seal-side end portion and a secondary-seal-side end portion, the primary-seal-side end portion forming one of two end portions of the glass tube, the secondary-seal-side end portion forming the other of the two end portions;
        a pair of ferrules attached to the primary-seal-side end portion and the secondary-seal-side end portion, respectively; and
        an identifier located either on a ferrule or on a nonluminous portion of the glass tube not covered with a ferrule, the identifier indicating at least one of the primary-seal-side end portion and the secondary-seal-side end portion to enable discrimination between the primary-seal-side end portion and the secondary-seal-side end portion; and
    a chassis capable of containing the discharge tubes arranged parallel in an array.

2. A lighting device as in claim 1, wherein the discharge tubes are arranged so that end portions thereof adjacently arranged along an array direction thereof correspond to the primary-seal-side end portion and said the secondary-seal-side end portion, respectively.

3. A lighting device as in claim 1, wherein the discharge tubes are arranged so that end portions thereof adjacently arranged along an array direction thereof both correspond to the primary-seal-side end portion or both correspond to the secondary-seal-side end portion.

4. A lighting device as in claim 3, wherein:
    a pair of connectors for connecting said ferrules of each of the discharge tubes to a power circuit capable of supplying power to the discharge tubes are arranged on the chassis;
    one connector of the pair of connectors is provided as a high-voltage-side connector, and the other connector thereof is provided as a low-voltage-side connector;
    connectors, provided as the pair of connectors for the discharge tubes, are arranged so that the connectors adjacently arranged along the array direction of the discharge tubes both correspond to the high-voltage-side connector or both correspond to the low-voltage-side connector; and
    the ferrule attached to the secondary-seal-side end portion is connected to the high-voltage-side connector, and the ferrule attached to the primary-seal-side end portion is connected to the low-voltage-side connector.

5. A lighting device as in claim 1, wherein a chassis-side identifier is provided on a side of the chassis, so as to correspond to the identifier provided on each of the discharge tubes.

6. A lighting device as in claim 5, wherein:
    a reflective material for reflecting light from the discharge tubes is provided in the chassis; and
    a mark as the chassis-side identifier is provided on the reflective material.

7. A lighting device as in claim 6, wherein the mark is provided as a hole formed through the reflective material.

8. A lighting device as in claim 6, wherein the mark is formed by application of colored paint to the reflective material.

9. A lighting device as claim 6, wherein the mark is arranged on a back side of the discharge tubes contained in the chassis.

10. A lighting device as claim 6, wherein a mark positioned to correspond to one of the primary-seal-side end portion and the secondary-seal-side end portion is solely provided as the mark on the reflective material.

11. A lighting device as in-claim 6, wherein a mark positioned to correspond to each of the primary-seal-side end portion and the secondary-seal-side end portion is provided as the mark on the reflective material.

12. A lighting device as claim 5, wherein:
    a pair of connectors for connecting the ferrules of each of the discharge tubes to a power circuit capable of supplying power to the discharge tubes are arranged on the chassis; and
    the chassis-side identifier is provided on the connectors.

13. A lighting device as in claim 12, wherein:
    each of the connectors includes a connecting terminal capable of contact with corresponding one of the ferrules, and further includes a holding member arranged to hold the connecting terminal; and
    the chassis-side identifier is provided on the holding member.

14. A lighting device as in claim 13, wherein the chassis-side identifier is provided as a color of one holding member provided as the holding member of one of the pair of connectors, which differs from a color of the other holding member provided as the holding member of the other of the pair of connectors.

15. A lighting device as in claim 14, wherein the chassis-side identifier is provided by forming the one holding member using a different material from that of the other holding member.

16. A lighting device as in claim 13, wherein the chassis-side identifier is formed of a mark provided on the holding member.

17. A lighting device as in claim 16, wherein the mark is formed by application of colored paint to the holding member.

18. A lighting device as in claim 16, wherein a mark formed on one of the holding members of the pair of connectors is solely provided as the mark.

19. A lighting device as in claim 16, wherein a mark formed on each of the holding members of the pair of connectors is provided as the mark.

20. A lighting device as in claim 1, wherein:
    a pair of connectors for connecting the ferrules of each of the discharge tubes to a power circuit capable of supplying power to the discharge tubes are arranged on the chassis; and
    an opening section is provided on each of the connectors so that the identifier on each of the discharge tubes is exposed therethrough to the outside.

21. A display device comprising:
    a lighting device as in claim 1; and
    a display panel arranged on a front side of the lighting device.

22. A display device in claim 21, wherein the display panel is a liquid crystal panel that includes a pair of substrates and liquid crystal sealed therebetween.

23. A television receiver comprising a display device as in claim 21.

* * * * *